US011974327B2

(12) United States Patent
Park et al.

(10) Patent No.: US 11,974,327 B2
(45) Date of Patent: Apr. 30, 2024

(54) METHOD AND APPARATUS FOR SIGNALING MULTI-USIM UE BUSY STATUS

(71) Applicant: SHARP KABUSHIKI KAISHA, Sakai (JP)

(72) Inventors: Kenneth James Park, Vancouver, WA (US); Kamel M. Shaheen, Vancouver, WA (US); Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 332 days.

(21) Appl. No.: 17/628,833

(22) PCT Filed: Aug. 7, 2020

(86) PCT No.: PCT/JP2020/030468
§ 371 (c)(1),
(2) Date: Jan. 20, 2022

(87) PCT Pub. No.: WO2021/033586
PCT Pub. Date: Feb. 25, 2021

(65) Prior Publication Data
US 2022/0272761 A1    Aug. 25, 2022

Related U.S. Application Data

(60) Provisional application No. 62/888,310, filed on Aug. 16, 2019.

(51) Int. Cl.
*H04W 76/15* (2018.01)
*H04W 74/0833* (2024.01)
*H04W 76/27* (2018.01)

(52) U.S. Cl.
CPC ....... *H04W 74/0833* (2013.01); *H04W 76/15* (2018.02); *H04W 76/27* (2018.02)

(58) Field of Classification Search
CPC . H04W 74/0833; H04W 76/27; H04W 76/15; H04W 88/06; H04W 68/00
See application file for complete search history.

(56) References Cited

U.S. PATENT DOCUMENTS 9,167,592 B1   10/2015  Hsu et al.
9,288,646 B2    3/2016  Ponukumati et al.
(Continued)

OTHER PUBLICATIONS

3GPP TR 38.874 V16.0.0 (Dec. 2018) 3rd Generation Partnership Project; Technical Specification Group Radio Access Network; NR; Study on Integrated Access and Backhaul; (Release 16).
3GPP TS 23.502 V16.1.1 (Jun. 2019) 3rd Generation Partnership Project; Technical Specification Group Services and System Aspects; Procedures for the 5G System; Stage 2 (Release 16).
(Continued)

*Primary Examiner* — Syed Ali
(74) *Attorney, Agent, or Firm* — ScienBiziP, P.C.

(57) ABSTRACT

A user equipment (UE) for supporting multiple-universal subscriber identity module (multi-USIM) operations among a first base station associated with a first network and a second base station associated with a second network is disclosed. the UE includes one or more non-transitory computer-readable media having computer-executable instructions embodied thereon, and at least one processor coupled to the one or more non-transitory computer-readable media. The processor is configured to execute the computer-executable instructions to transmit, through transmitting circuitry of the UE, a physical random access channel (PRACH) preamble to the second base station associated with the second network. The PRACH preamble indicates to the second base station that the UE is not to begin a connection establishment procedure with the second network.

5 Claims, 41 Drawing Sheets

(56) References Cited

U.S. PATENT DOCUMENTS

| | | |
|---|---|---|
| 9,544,042 B2 | 1/2017 | Li et al. |
| 9,584,994 B2 | 2/2017 | Kompala et al. |
| 10,034,320 B2 | 7/2018 | Shi et al. |
| 2016/0174187 A1 | 6/2016 | Gopala Krishnan et al. |
| 2017/0041976 A1 | 2/2017 | Van et al. |
| 2017/0118761 A1 | 4/2017 | Deshpande |
| 2018/0077728 A1 | 3/2018 | Shi et al. |
| 2018/0160422 A1 | 6/2018 | Pathak et al. |
| 2020/0336891 A1* | 10/2020 | Guo .................. H04W 8/20 |
| 2021/0014934 A1* | 1/2021 | Lovlekar ............ H04W 68/005 |
| 2022/0053448 A1* | 2/2022 | Velev ................. H04W 8/183 |
| 2022/0072175 A1* | 3/2022 | Lovlekar ............ A61L 2/22 |
| 2022/0201648 A1* | 6/2022 | Nord .................. H04W 8/26 |
| 2022/0286993 A1* | 9/2022 | Youn .................. H04W 68/005 |
| 2022/0312368 A1* | 9/2022 | Zhang ................ H04W 8/183 |
| 2022/0312374 A1* | 9/2022 | Ryu ................... H04W 28/0289 |
| 2022/0361133 A1* | 11/2022 | Shaheen ............. H04W 8/20 |
| 2023/0189208 A1* | 6/2023 | Kim ................... H04W 60/00 |
| | | 370/329 |

OTHER PUBLICATIONS

3GPP TS 23.501 V16.1.0 (Jun. 2019) 3rd Generation Partnership Project; Technical Specification Group Services and System Aspects; System Architecture for the 5G System; Stage 2 (Release 16).

3GPP TS 38.331 V15.6.0 (Jun. 2019) 3rd Generation Partnership Project; Technical Specification Group Radio Access Network; NR; Radio Resource Control (RRC) protocol specification (Release 15).

3GPP TS 36.331 V15.6.0 (Jun. 2019) 3rd Generation Partnership Project; Technical Specification Group Radio Access Network; Evolved Universal Terrestrial Radio Access (E-UTRA); Radio Resource Control (RRC); Protocol specification (Release 15).

3GPP TS 36.321 V15.6.0 (Jun. 2019) 3rd Generation Partnership Project; Technical Specification Group Radio Access Network; Evolved Universal Terrestrial Radio Access (E-UTRA); Medium Access Control (MAC) protocol specification (Release 15).

3GPP TS 36.211 V15.6.0 (Jun. 2019) 3rd Generation Partnership Project; Technical Specification Group Radio Access Network; Evolved Universal Terrestrial Radio Access (E-UTRA); Physical channels and modulation (Release 15).

* cited by examiner

FIG. 13

```
-- ASN1START

RACH-ConfigDedicatedBusy ::=        SEQUENCE {
    ra-PreambleIndex                INTEGER (0..63),
    ra-PRACH-MaskIndex              INTEGER (0..15),
    prach-ConfigIndex               INTEGER (0..63),
    prach-FreqOffset                INTEGER (0..94)
}

-- ASN1STOP
```

```
-- ASN1START

RRCConnectionReconfiguration ::=    SEQUENCE {
    rrc-TransactionIdentifier       RRC-TransactionIdentifier,
    criticalExtensions              CHOICE {
        c1                              CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

//other extenstions removed for brevity

RRCConnectionReconfiguration-v16-IEs ::= SEQUENCE {
    rach-ConfigDedicatedBusy        RACH-ConfigDedicatedBusy        OPTIONAL,    -- Need OP
    nonCriticalExtension            SEQUENCE {}                     OPTIONAL
}

//other content removed for brevity

-- ASN1STOP
```

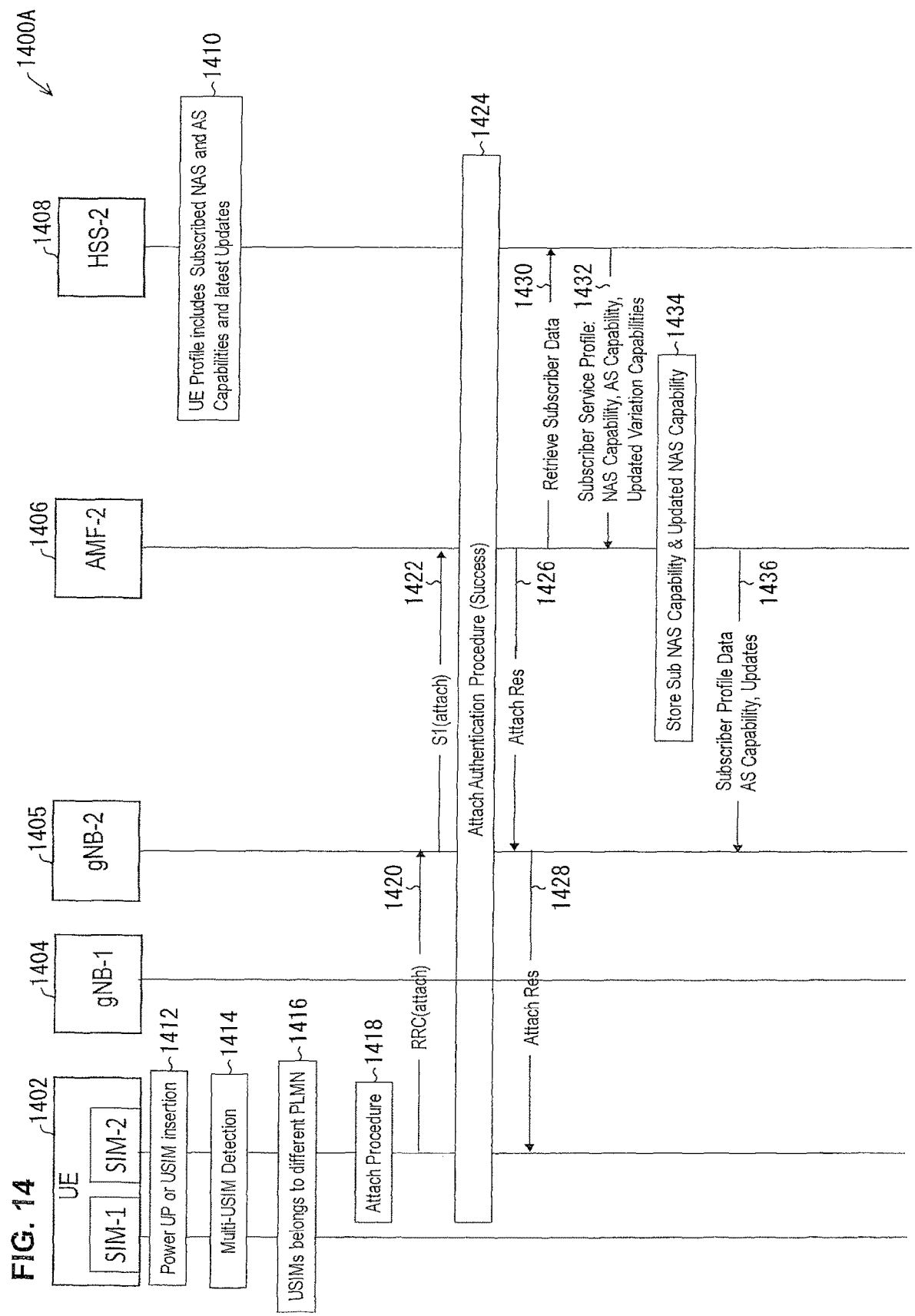

FIG. 16

```
-- ASN1START

RACH-ConfigDedicatedBusy ::=        SEQUENCE {
    ra-PreambleIndex                INTEGER (0..63),
    ra-PRACH-MaskIndex              INTEGER (0..15),
    prach-ConfigIndex               INTEGER (0..63),
    prach-FreqOffset                INTEGER (0..94)
}

-- ASN1STOP
```

```
-- ASN1START

RRCRelease ::=                      SEQUENCE {
    rrc-TransactionIdentifier       RRC-TransactionIdentifier,
    criticalExtensions              CHOICE {
        rrcRelease                      RRCRelease-IEs,
        criticalExtensionsFuture        SEQUENCE {}
    }
}

RRCRelease-IEs ::=                  SEQUENCE {
    redirectedCarrierInfo           RedirectedCarrierInfo       OPTIONAL,   -- Need N
    cellReselectionPriorities       CellReselectionPriorities   OPTIONAL,   -- Need R
    suspendConfig                   SuspendConfig               OPTIONAL,   -- Need R
    deprioritisationReq             SEQUENCE {
        deprioritisationType            ENUMERATED {frequency, nr},
        deprioritisationTimer           ENUMERATED {min5, min10, min15, min30}
    }                                                           OPTIONAL,   -- Need N
    lateNonCriticalExtension        OCTET STRING                OPTIONAL,
    nonCriticalExtension            SEQUENCE{}                  OPTIONAL
}

RedirectedCarrierInfo ::=           CHOICE {
    nr                                  CarrierInfoNR,
    eutra                               RedirectedCarrierInfo-EUTRA,
}

RedirectedCarrierInfo-EUTRA ::=     SEQUENCE {
    eutraFrequency                      ARFCN-ValueEUTRA,
    cnType-r15                          ENUMERATED {epc,fiveGC} OPTIONAL
}
CarrierInfoNR ::=                   SEQUENCE {
    carrierFreq                         ARFCN-ValueNR,
    ssbSubcarrierSpacing                SubcarrierSpacing,
    smtc                                SSB-MTC                 OPTIONAL,   -- Need S
}
SuspendConfig ::=                   SEQUENCE {
    fullI-RNTI                          I-RNTI-Value,
    shortI-RNTI                         ShortI-RNTI-Value,
    ran-PagingCycle                     PagingCycle,
    ran-NotificationAreaInfo            RAN-NotificationAreaInfo    OPTIONAL,   -- Need M
    t380                                PeriodicRNAU-TimerValue     OPTIONAL,   -- Need R
    nextHopChainingCount                NextHopChainingCount,
}
rach-ConfigDedicatedBusy            RACH-ConfigDedicatedBusy    OPTIONAL,   -- Need OP //other content removed for brevity

-- ASN1STOP
```

FIG. 27

```
-- ASN1START

RACH-ConfigDedicatedBusy ::=      SEQUENCE {
    ra-PreambleIndex              INTEGER (0..63)
}

-- ASN1STOP
```

```
-- ASN1START

RRCConnectionReconfiguration ::=    SEQUENCE {
    rrc-TransactionIdentifier       RRC-TransactionIdentifier,
    criticalExtensions              CHOICE {
        c1                              CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

//other extenstions removed for brevity

RRCConnectionReconfiguration-v16-IEs ::= SEQUENCE {
    rach-ConfigDedicatedBusy      RACH-ConfigDedicatedBusy        OPTIONAL,-- Need OP
    nonCriticalExtension          SEQUENCE {}                     OPTIONAL
}

//other content removed for brevity

-- ASN1STOP
```

FIG. 30

```
-- ASN1START

RACH-ConfigDedicatedBusy ::=      SEQUENCE {
    ra-PreambleIndex              INTEGER (0..63)
}

-- ASN1STOP
```

```
-- ASN1START

RRCRelease ::=                    SEQUENCE {
    rrc-TransactionIdentifier     RRC-TransactionIdentifier,
    criticalExtensions            CHOICE {
        rrcRelease                    RRCRelease-IEs,
        criticalExtensionsFuture      SEQUENCE {}
    }
}

RRCRelease-IEs ::=                SEQUENCE {
    redirectedCarrierInfo         RedirectedCarrierInfo       OPTIONAL,   -- Need N
    cellReselectionPriorities     CellReselectionPriorities   OPTIONAL,   -- Need R
    suspendConfig                 SuspendConfig               OPTIONAL,   -- Need R
    deprioritisationReq           SEQUENCE {
        deprioritisationType          ENUMERATED {frequency, nr},
        deprioritisationTimer         ENUMERATED {min5, min10, min15, min30}
    }                                                         OPTIONAL,   -- Need N
    lateNonCriticalExtension      OCTET STRING                OPTIONAL,
    nonCriticalExtension          SEQUENCE{}                  OPTIONAL
}

RedirectedCarrierInfo ::=         CHOICE {
    nr                                CarrierInfoNR,
    eutra                             RedirectedCarrierInfo-EUTRA,
    .
}
RedirectedCarrierInfo-EUTRA ::=   SEQUENCE {
    eutraFrequency                    ARFCN-ValueEUTRA,
    cnType-r15                        ENUMERATED {epc,fiveGC} OPTIONAL
}
CarrierInfoNR ::=                 SEQUENCE {
    carrierFreq                       ARFCN-ValueNR,
    ssbSubcarrierSpacing              SubcarrierSpacing,
    smtc                              SSB-MTC                 OPTIONAL,   -- Need S
    ..
}
SuspendConfig ::=                 SEQUENCE {
    fullI-RNTI                        I-RNTI-Value,
    shortI-RNTI                       ShortI-RNTI-Value,
    ran-PagingCycle                   PagingCycle,
    ran-NotificationAreaInfo          RAN-NotificationAreaInfo OPTIONAL,  -- Need M
    t380                              PeriodicRNAU-TimerValue  OPTIONAL,  -- Need R
    nextHopChainingCount              NextHopChainingCount,
    .
}
rach-ConfigDedicatedBusy          RACH-ConfigDedicatedBusy    OPTIONAL,   -- Need OP //other content removed for brevity

-- ASN1STOP
```

FIG. 41

```
-- ASN1START

RRCConnectionRequest ::=            SEQUENCE {
    criticalExtensions                  CHOICE {
        rrcConnectionRequest-r8             RRCConnectionRequest-r8-IEs,
        rrcConnectionRequest-r15            RRCConnectionRequest-5GC-r15-IEs
    }
}

RRCConnectionRequest-r8-IEs ::=     SEQUENCE {
    ue-Identity                         InitialUE-Identity,
    establishmentCause                  EstablishmentCause,
    spare                               BIT STRING (SIZE (1))
}

RRCConnectionRequest-5GC-r15-IEs ::=  SEQUENCE {
    ue-Identity                         InitialUE-Identity-5GC,
    establishmentCause                  EstablishmentCause-5GC,
    spare                               BIT STRING (SIZE (1))
}

InitialUE-Identity ::=              CHOICE {
    s-TMSI                              S-TMSI,
    randomValue                         BIT STRING (SIZE (40))
}

InitialUE-Identity-5GC ::=          CHOICE {
    ng-5G-S-TMSI-Part1                  BIT STRING (SIZE (40)),
    randomValue                         BIT STRING (SIZE (40))
}

EstablishmentCause ::=              ENUMERATED {
                                        emergency, highPriorityAccess, mt-Access, mo-Signalling,
                                        mo-Data, delayTolerantAccess-v1020, mo-VoiceCall-v1280,
                                        Busy-Bit}

EstablishmentCause-5GC ::=          ENUMERATED {
                                        emergency, highPriorityAccess, mt-Access, mo-Signalling,
                                        mo-Data, mo-VoiceCall, Busy-Bit, spare1}

-- ASN1STOP
```

METHOD AND APPARATUS FOR SIGNALING MULTI-USIM UE BUSY STATUS

TECHNICAL FIELD

The present disclosure generally relates to wireless communications, and more particularly, to systems and methods that enable a multiple-universal subscriber identity module (multi-USIM) user equipment (UE) to inform a network that the UE is or will be busy with another network.

BACKGROUND ART

In wireless communication systems, support for multiple USIM's in a UE is handled in an implementation-specific manner without any support from 3rd Generation Partnership Project (3GPP) specifications, resulting in a variety of implementations and the UE behaviors.

The 3GPP system supports the UEs with multiple USIMs (on the same UICC or on different UICCs) that are registered at the same time. In a multi-USIM device, the USIMs may share common radio and baseband components for transmission and independent radio and baseband components for reception (e.g., the UE is configured with dual Receivers and a single Transmitter). Thus, the multi-USIM device may register in different networks by using a single radio front-end (RF) and base band for transmission in a time-division multiplexing (TDM) manner and receive paging and other signals from separate transmission sources using separate radio front-ends and base bands in a simultaneous manner. The multi-USIM device may thus register with Network-A and/or Network-B, and the networks may be from the same or different Public Land Mobile Networks (PLMNs).

In the next generation (e.g., fifth generation (5G) new radio (NR)) wireless communication networks, a multi-USIM UE is expected to be in Radio Resource Control (RRC) Connected state with only one network at a time, while being able to receive paging, perform signal measurements, or read system information, and determine if it needs to respond to paging requests from other networks. With a single Tx, dual Rx RF platform, the UE may establish and maintain a connection to Network-A using the single Tx and one of the Rx, while simultaneously listen to paging, perform signal measurements, or read system information of the other Network-B on the other Rx, but the UE may not establish a second connection simultaneously with Network-B. Thus, the network(s) needs to be aware of the multi-registration scenario so as to not waste network resources when the UE is busy with one network and the other network wants to establish a connection.

In a 5G NR network, a UE with multiple USIMs may be used for connected mode at the same time. Thus, there is a need for a coordination between the network and the UE. However, USIMs with a dedicated transceiver are not necessarily required to participate in this coordinated effort, as the coordination only applies when there are M USIMs and N in connected mode, where M<N. Otherwise, effectively if M=N, the USIMs would have dedicated transceivers.

In various implementations of the present disclosure, a MUSIM UE may refer to a UE with multiple USIMs selected for use at the same time. All USIMs may be used for idle mode network connection at the same time. A MUSIM UE operates either in a Multi USIM Single Active (MUSA) mode or in a Multi USIM Multi Active (MUMA) mode. A USIM is considered "selected for use" from the perspective of the UE. This does not imply the USIM is in "active" state within the UE.

In various implementations of the present disclosure, the MUSA mode may refer to an operating mode of a MUSIM UE in which at most one USIM may be used for connected mode at any given time.

In various implementations of the present disclosure, the MUMA mode is an operating mode of a MUSIM UE in which multiple USIMs may be used for connected mode at the same time. USIMs with a dedicated transceiver are not included.

For example, when a UE is paged from Network-B while the UE is connected to Network-A, the UE may drop the connection on Network-A and attempt to access Network-B in response to the page from Network-B, if the service paged by Network-B has a higher priority than the service currently being provided by Network-A. Alternately, the UE may disregard the page from Network-B, if the service paged by Network-B has a lower priority than the service currently being provided by Network-A. However, such disregard behavior may cause performance degradations and reductions in overall system capacity, as Network-B may continue to use paging resources in its attempt to establish a connection with the UE, while the UE continues to disregard Network-B's pages. On the network end, Network-B remains ignorant of the UEs' disregard behavior of Network-B's paging (while the UE is busy with its connection to Network-A).

Thus, there is a need in the art for a multi-USIM UE to provide a busy signal to a network while the UE is connected to another network.

SUMMARY OF INVENTION

In one example, a user equipment (UE) for supporting multiple-universal subscriber identity module (multi-USIM) operations among a first base station associated with a first network and a second base station associated with a second network, the UE comprising: one or more non-transitory computer-readable media having computer-executable instructions embodied thereon; at least one processor coupled to the one or more non-transitory computer-readable media, and configured to execute the computer-executable instructions to: transmit, through transmitting circuitry of the UE, a physical random access channel (PRACH) preamble to the second base station associated with the second network; wherein the PRACH preamble indicates to the second base station that the UE is not to begin a connection establishment procedure with the second network.

In one example, a method by a user equipment (UE) supporting multiple-universal subscriber identity module (multi-USIM) operations among a first base station associated with a first network and a second base station associated with a second network, the method comprising: transmitting, by transmitting circuitry of the UE, a physical random access channel (PRACH) preamble to the second base station associated with the second network; wherein the PRACH preamble indicates to the second base station that the UE is not to begin a connection establishment procedure with the second network.

In one example, a base station for communicating with a user equipment (UE) supporting multiple-universal subscriber identity module (multi-USIM) operations among one or more networks, the base station comprising: one or more non-transitory computer-readable media having computer-executable instructions embodied thereon; at least one processor coupled to the one or more non-transitory computer-readable media, and configured to execute the computer-executable instructions to: receive, through receiving circuitry of the base station, a physical random access channel (PRACH) preamble from the UE; wherein the PRACH preamble indicates to the base station that the UE is not to begin a connection establishment procedure with the network associated with the base station.

In one example, a method by a base station for communicating with a user equipment (UE) supporting multiple-universal subscriber identity module (multi-USIM) operations among one or more networks, the method comprising: receiving, through receiving circuitry of the base station, a physical random access channel (PRACH) preamble from the UE; wherein the PRACH preamble indicates to the base station that the UE is not to begin a connection establishment procedure with the network associated with the base station.

BRIEF DESCRIPTION OF DRAWINGS

Implementations of the present technology may now be described, by way of example only, with reference to the attached figures.

FIG. 13 is a diagram illustrating information elements and information messages through which a UE may indicate to a base station that the UE may not respond until further notice according to the first implementation of the "MSG1 Only" method, in accordance with example implementations of the present disclosure.

FIG. 14 is a signaling sequence diagram for schematically illustrating a method of reporting a multi-USIM presence in a UE and capabilities of the multiple USIMs to a wireless communication network through an access registration procedure according to the second implementation of the "MSG1 Only" method, in accordance with example implementations of the present disclosure.

FIG. 16 is a diagram illustrating information elements and information messages through which a UE may indicate to a base station that the UE may not respond until further notice according to the second implementation of the "MSG1 Only" method, in accordance with example implementations of the present disclosure.

FIG. 27 is a diagram illustrating information elements and information messages through which a UE may indicate to a base station that the UE may not respond until further notice according to the first implementation of the "MSG1 and MSG3" method, in accordance with example implementations of the present disclosure.

FIG. 30 is a diagram illustrating information elements and information messages through which a UE may indicate to a base station that the UE may not respond until further notice according to the second implementations of the "MSG1 and MSG3" method, in accordance with example implementations of the present disclosure.

FIG. 41 is a diagram illustrating information elements and information messages through which a UE may indicate to a base station that the UE may not respond until further notice according to the first and second implementations of the "MSG3 Only" method, in accordance with example implementations of the present disclosure.

DESCRIPTION OF EMBODIMENTS

Figure 1:
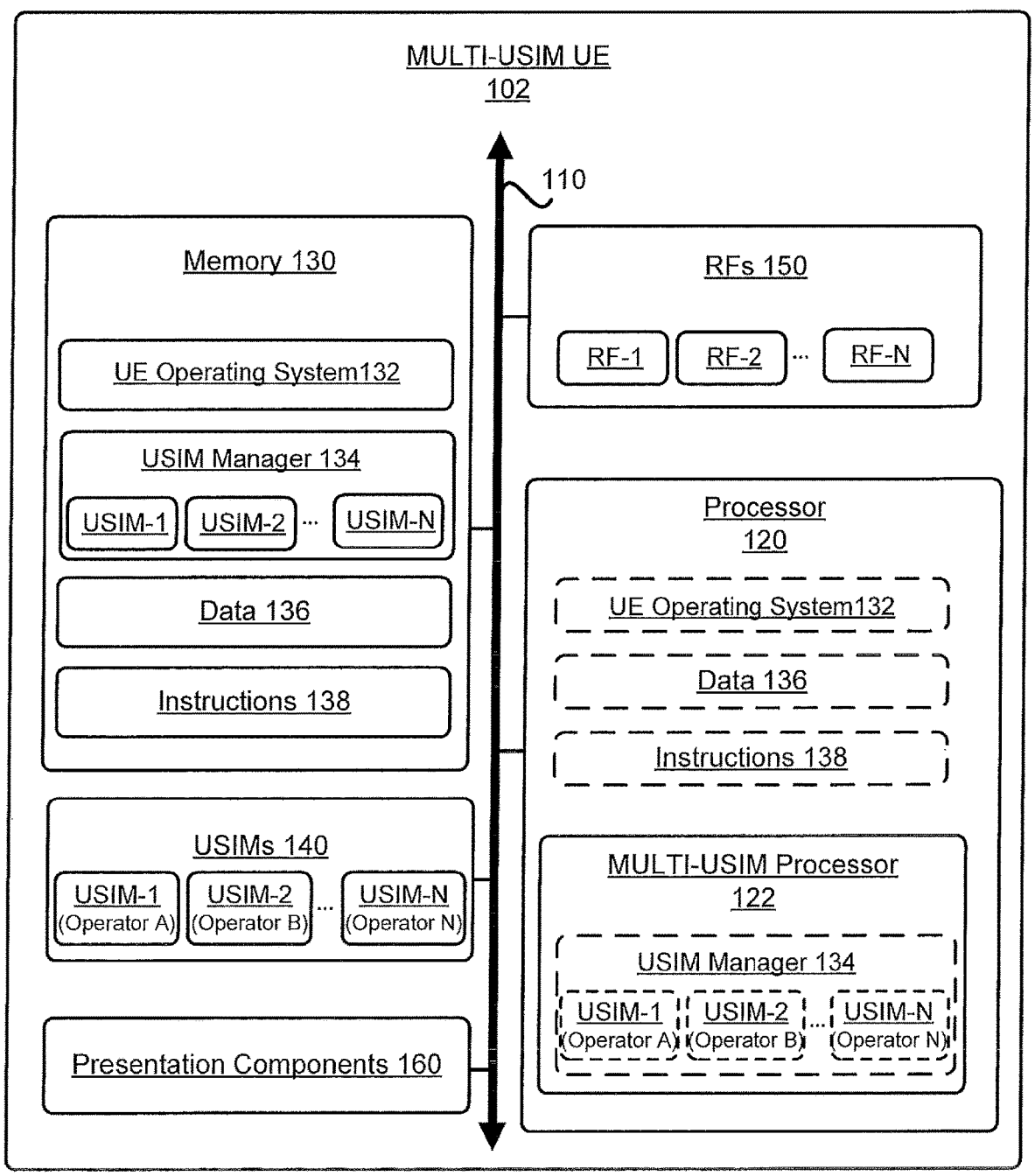
FIG. 1 is a block diagram of a multi-USIM UE supporting the same or different operators, in accordance with various example implementations of the present disclosure.

The 3GPP is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). the UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and mMTC (massive Machine Type Communication) transmission. Also, in NR, single-beam and/or multi-beam operations is considered for downlink and/or uplink transmissions.

In order for the services to use the time/frequency/space resource efficiently, it would be useful to be able to efficiently control uplink transmissions. Therefore, a procedure for efficient control of uplink transmissions should be designed. However, the detailed design of a procedure for uplink transmissions has not been studied yet.

According to the systems and methods described herein, a UE may transmit multiple reference signals (RSs) associated with one or more Transmission Reception Points (TRPs) on a UL antenna port. For example, multiple UL RSs respectively associated with one or more TRPs may be transmitted on a UL antenna port. Namely, there may be one or more UL RSs transmitted per UL antenna port. Also, there may be one or more UL RSs transmitted per TRP.

In an example, one TRP may be associated with one UL antenna port. In another example, one TRP may be associated with multiple UL antenna port(s). In another example, multiple TRP(s) may be associated with multiple UL antenna port(s). In yet another example multiple antenna port(s) may be associated with one UL antenna port. The TRP(s) described herein are assumed to be included in the antenna port(s) for the sake of simple description.

Here, for example, multiple UL RSs transmitted on an UL antenna port may be defined by the same sequence (e.g., a demodulation reference signal sequence, and/or a reference signal sequence). For example, the same sequence may be generated based on a first parameter configured by a higher layer. The first parameter may be associated with a cyclic shift, and/or information associated with a beam index.

Or, multiple UL RSs transmitted on an UL antenna port may be identified by a different sequence. Each of the different signal sequence may be generated based on each of more than one second parameter(s) configured by a higher layer. One second parameter among more than one second parameters may be indicated by DCI. Each of the second parameters may be associated with a cyclic shift, and/or information associated with a beam index.

Also, resource element(s) to which multiple UL RSs transmitted on a UL antenna port are mapped may be defined by the same value of a frequency shift. For example, the same value of the frequency shift may be given by a third parameter configured by a higher layer. The third information may be associated with a beam index.

Alternatively, resource element(s) to which multiple UL RSs transmitted on a UL antenna port are mapped may be identified by different values of a frequency shift. Each of the different values of the frequency shift may be given by each of more than one fourth parameter(s) configured by a higher layer. One fourth parameter among more than one parameters may be indicated by DCI. Each of the fourth parameters may be associated with a beam index.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

The present disclosure provides a method whereby a UE signals to a network that paging messages sent by the network to the UE that are, for example, meant to trigger the UE to begin a connection establishment procedure (e.g., RACH, Random Access Channel) may not be acted upon as anticipated and may not trigger the UE to begin a connection establishment procedure. This signaling is to inform the base station (e.g., a gNB associated to a second network) that the UE is in a specific state (e.g., in this case, busy with a connection to a first network).

In a first example method of the present disclosure, the UE may communicate this state to the base station (e.g., a gNB) by sending the base station a Physical Random Access Channel (PRACH) procedure Message 1 (hereinafter "MSG1") (e.g., a PRACH Preamble) that is generated from a specific value for each of the parameters: ra-PreambleIndex and ra-PRACH-MaskIndex and PRACH-ConfigIndex and prach-FreqOffset (e.g., an n-Tuple, where n=4). When the specific set of values is taken together, that set of values has been assigned an explicit meaning, and the meaning of that set of values is understood by both the UE and the base station. Thus, when the base station receives a MSG1 generated from the n-Tuple assigned to the UE, it indicates to the base station a state (e.g., the UE is busy) of a specific UE. Thus, by receiving the MSG1, the base station may be informed that connection requests to the base station may not be made by the UE, and connection requests by the base station to the UE may not be answered.

In a first instance of the first example method of this disclosure, the UE may already have a connection established with Network-A when the UE detects that Network-B is paging it. In response to the page from Network-B, the UE sends to Network-B a MSG1 that is generated from the n-Tuple that was purposefully preconfigured in the UE by Network-B such that when the UE uses that specific set of values in the n-Tuple to generate and transmit the PRACH MSG1, that the MSG1 may be unique to all other MSG1s generated by the UEs that are attached to the base station via RRC_Inactive state. Thus, the base station may uniquely identify the UE that generated and sent the MSG1 (e.g., the signature of the MSG1 received by the base station and the RF resources used to transport the MSG1 are specific to a unique combination of the values assigned to ra-PreambleIndex and ra-PRACH-MaskIndex and PRACH-ConfigIndex and prach-FreqOffset that are assigned to the UE per the n-Tuple).

In a second instance of the first example method of this disclosure, the UE has determined that it may shortly start a connection with Network-A, and thus prior to establishing a connection with Network-A, the UE sends to Network-B a MSG1 that is generated from the n-Tuple that was purposefully preconfigured in the UE by Network-B such that when the UE uses that specific set of values in the n-Tuple to generate and transmit the MSG1, that MSG1 may be unique to all other MSG1s generated by the UEs that are attached to the gNB via RRC_Inactive state. Thus, the gNB may uniquely identify the UE that generated and sent the MSG1 (e.g., the signature of the MSG1 received by the gNB and the RF resources used to transport the MSG1 are specific to a unique combination of the values assigned to ra-PreambleIndex and ra-PRACH-MaskIndex and PRACH-ConfigIndex and prach-FreqOffset that are assigned to the UE per the n-Tuple).

In either case above, the content of the n-Tuple is used to generate the MSG1, such that specific values for ra-PreambleIndex and ra-PRACH-MaskIndex are used instead of the normal randomly selected ra-PreambleIndex (as per the System Information Block 2 (SIB2) RACH configuration information in RACH-ConfigCommon), or gNB assigned ra-PreambleIndex and ra-PRACH-MaskIndex (per a RACH-ConfigDedicated message per a MobilityControlInfo message). Similarly, a specific PRACH-ConfigIndex is used instead of a normal assigned PRACH-ConfigIndex (as per the SIB2 PRACH configuration information in PRACH-ConfigInfo in SystemInformation-BlockType2 or in a SystemInfomationBlockType2Dedicated).

The n-Tuple may be configured into the UE via a configuration message previously received by the UE from the gNB, or it could have been configured into the UE at the time of manufacturing or at the time of provisioning.

In the case that the n-Tuple is configured into the UE via a configuration message previously received by the UE from the gNB, the UE may have established an RRC connection with the gNB and using that connection indicate to the gNB that the UE is capable of multi-USIM based operations and its multi-USIM capabilities. In response to that multi-USIM capabilities information, the gNB may allocate (e.g., reserve) and send to the UE a specific n-Tuple (e.g., a set of values for ra-PreambleIndex and ra-PRACH-MaskIndex and PRACH-ConfigIndex and prach-FreqOffset) for the UE to use when generating and transporting a MSG1 for the purpose of informing the gNB that connection requests to the gNB may not be made by the UE, and connection requests by the gNB to the UE may not be answered.

In the case that the n-Tuple is pre-configured into the UE at time of manufacturing or provisioning, the UE may have established an RRC connection with the gNB and using that connection indicate to the gNB that the UE is capable of multi-USIM based operations and its multi-USIM capabilities, and the specific n-Tuple (e.g., a set of values for ra-PreambleIndex and ra-PRACH-MaskIndex and PRACH-ConfigIndex and prach-FreqOffset) that the UE may use when generating and transporting a MSG1 for the purpose of informing the gNB that connection requests to the gNB may not be made by the UE, and connection requests by the gNB to the UE may not be answered. In response to that information (e.g., the n-Tuple sent by the UE to the gNB), the gNB may indicate either acceptance or denial of that n-Tuple preconfigured in the UE for use as indicating to the gNB that connection requests to the gNB may not be made by the UE, and connection requests by the gNB to the UE may not be answered. Alternately, the gNB may indicate acceptable of the set by allocating (e.g., reserve) and send to the UE a sub-set of the specific set of (one or two of the 3) n-Tuple for the UE to use when generating and transporting a MSG1 for the purpose of informing the gNB that connection requests to the gNB may not be made by the UE, and connection requests by the gNB to the UE may not be answered. Alternately, the gNB may allocate (e.g., reserve)

and send to the UE a new specific set of (4 of the 4) of the n-Tuple for the UE to use when generating and transporting a MSG1 for the purpose of informing the gNB that connection requests to the gNB may not be made by the UE, and connection requests by the gNB to the UE may not be answered.

When the gNB sends the n-Tuple, the gNB may for example send it to the UE via an RRCConnectionReconfiguration message that contains an information element (IE) X. The IE X contains and the IE ra-PreambleIndex the IE ra-PRACH-MaskIndex and the IE prach-configIndex and prach-FreqOffset. The values assigned to IE ra-PreambleIndex and ra-PRACH-MaskIndex and prach-configIndex and prach-FreqOffset are the values selected by the gNB for the UE to use when generating and transporting a MSG1 for the purpose of informing the gNB that connection requests to the gNB may not be made by the UE, and connection requests by the gNB to the UE may not be answered.

In a second example method of the present disclosure, the UE may communicate its state to the gNB by sending the gNB a RACH procedure MSG1 (e.g., a PRACH Preamble) that is generated from a specific value for ra-PreambleIndex and an associated RRC message (e.g., a PRACH MSG3-RRC Resume Request). The specific ra-PreambleIndex has been assigned an explicit meaning, and the meaning is understood by both the UE and the gNB. Thus, when the gNB receives a MSG1 generated from the specific ra-PreambleIndex, it indicates to the gNB a state (e.g., the UE is busy) of a specific UE. Thus, by receiving the MSG1, the gNB may be informed that connection requests to the gNB may not be made by the UE, and connection requests by the gNB to the UE may not be answered. In addition, by receiving the associated RRC message, the gNB may know exactly the identity of the UE sent the MSG1.

In a first instance of the second example method of this disclosure, the UE may already have a connection established with Network-A when the UE detects that Network-B is paging it. In response to the page from Network-B, the UE sends to Network-B a MSG1 that is generated from the ra-PreambleIndex that was purposefully preconfigured in the UE by Network-B such that when the UE uses that specific value of ra-PreambleIndex to generate and transmit the MSG1, that MSG1 may indicate the UE's state. In addition, the UE sends an associated RRC message (e.g., MSG3) that is associated to the MSG1. Thus, the gNB may uniquely identify the state of the UE that generated and sent the MSG1 (e.g., the signature of the MSG1 received by the gNB is specific to the value assigned to ra-PreambleIndex), and may uniquely identify the UE by the subsequent reception of the associated RRC message.

In a second instance of the second example method of this disclosure, the UE has determined that it may shortly start a connection with Network-A, and thus prior to establishing a connection with Network-A the UE sends to Network-B a MSG1 that is generated from the ra-PreambleIndex that was purposefully preconfigured in the UE by Network-B such that when the UE uses that specific value of ra-PreambleIndex to generate and transmit the MSG1, that MSG1 may indicate the UE's state. In addition, the UE sends an associated RRC message (e.g., MSG3) that is associated to the MSG1. Thus, the gNB may uniquely identify the state of the UE that generated and sent the MSG1 (e.g., the signature of the MSG1 received by the gNB is specific to the value assigned to ra-PreambleIndex), and may uniquely identify the UE by the subsequent reception of the associated RRC message.

In either case above, a specific value for ra-PreambleIndex is used to generate the MSG1, and an RRC message (e.g., MSG3) that is associated to the previously transmitted MSG1 is used by the gNB to uniquely identify the UE.

The specific value for ra-PreambleIndex may be configured into the UE via a configuration message previously received by the UE from the gNB, or it could have been configured into the UE at the time of manufacturing or at the time of provisioning.

In the case that the specific value for ra-PreambleIndex is configured into the UE via a configuration message previously received by the UE from the gNB, the UE may have established an RRC connection with the gNB and using that connection indicate to the gNB that the UE is capable of multi-USIM based operations and its multi-USIM capabilities. In response to that multi-USIM capabilities information, the gNB may allocate (e.g., reserve) and send to the UE a specific value for ra-PreambleIndex for the UE to use when generating and transporting a MSG1 for the purpose of informing the gNB that connection requests to the gNB may not be made by the UE, and connection requests by the gNB to the UE may not be answered.

In the case that the specific values for ra-PreambleIndex is pre-configured into the UE at time of manufacturing or provisioning, the UE may have established an RRC connection with the gNB and using that connection indicate to the gNB that the UE is capable of multi-USIM based operations and its multi-USIM capabilities, and the specific value for ra-PreambleIndex that the UE may use when generating and transporting a MSG1 for the purpose of informing the gNB that connection requests to the gNB may not be made by the UE, and connection requests by the gNB to the UE may not be answered. In response to that information (e.g., the specific value for ra-PreambleIndex sent by the UE to the gNB), the gNB may indicate either acceptance or denial of that specific value for ra-PreambleIndex preconfigured in the UE for use as indicating to the gNB that connection requests to the gNB may not be made by the UE, and connection requests by the gNB to the UE may not be answered. Alternately, the gNB may indicate acceptable of the specific value for ra-PreambleIndex by allocating (e.g., reserve) and send to the UE a specific value for ra-PreambleIndex for the UE to use when generating and transporting a MSG1 for the purpose of informing the gNB that connection requests to the gNB may not be made by the UE, and connection requests by the gNB to the UE may not be answered. Alternately, the gNB may allocate (e.g., reserve) and send to the UE a new specific value for ra-PreambleIndex for the UE to use when generating and transporting a MSG1 for the purpose of informing the gNB that connection requests to the gNB may not be made by the UE, and connection requests by the gNB to the UE may not be answered.

When the gNB sends the specific value for ra-PreambleIndex, the gNB may for example send it to the UE via an RRCConnectionReconfiguration message that contains an information element (IE) X. The IE X contains and the IE ra-PreambleIndex. The values assigned to IE ra-PreambleIndex are selected by the gNB for the UE to use when generating and transporting a MSG1 for the purpose of informing the gNB that connection requests to the gNB may not be made by the UE, and connection requests by the gNB to the UE may not be answered.

Alternately, the specific value for ra-PreambleIndex that indicates the UE is busy, may be broadcast by the gNB via a SIB message.

In a third example method of the present disclosure, the UE may communicate its state to the gNB by sending the gNB an RRC message (e.g., a PRACH MSG3-RRC Resume Request) that includes a new bit (e.g., the Busy-Bit) to indicate that the UE may not respond to paging messages until further notice or time-out. The new bit has been assigned an explicit meaning, and the meaning is understood by both the UE and the gNB. Thus, when the gNB receives an RRC message that includes the Busy-Bit, it indicates that the UE may not respond to paging messages until further notice or time-out.

In a first instance of the third example method of this disclosure, the UE may already have a connection established with Network-A when the UE detects that Network-B is paging it. In response to the page from Network-B, the UE sends to Network-B an RRC message that includes a Busy-Bit to indicate the UE's state. Thus, the gNB may uniquely identify the state of the UE via the Busy-Bit in the RRC message, and the gNB may uniquely identify the UE by the other content of an RRC message (e.g., TMSI).

In a second instance of the third example method of this disclosure, the UE has determined that it may shortly start a connection with Network-A, and thus prior to establishing a connection with Network-A the UE sends to Network-B an RRC message (e.g., a PRACH MSG3) that includes a Busy-Bit to indicate the UE's state. Thus, the gNB may uniquely identify the state of the UE via the Busy-Bit in the RRC message, and the gNB may uniquely identify the UE by the other content of RRC message (e.g., TMSI).

In either case above, an RRC message having a Busy-Bit is used to communicate the state of the UE to the gNB.

FIG. 1 is a block diagram of a multi-USIM UE supporting the same or different operators, in accordance with various example implementations of the present disclosure. As shown in FIG. 1, multi-USIM UE 102 may include processor 120, memory 130, multiple USIMs 140 belonging to different networks/operators, multiple Radio Front-end circuitries (RFs) 150, and one or more presentation components 160. Multi-USIM UE 102 may also include one or more radio frequency spectrum band modules, one or more base station communications modules, one or more network communications modules, and one or more system communications management modules, Input/Output (I/O) ports, I/O components, and power supply (not explicitly shown in FIG. 1). Each of these components may be in communication with each other, directly or indirectly, over one or more buses 110.

In various implementations of the present disclosure, processor 120 (e.g., having processing circuitry) may include an intelligent hardware device, e.g., a Central Processing Unit (CPU), a microcontroller, an ASIC, and etc. Processor 120 may also include memory storage. As illustrated in FIG. 1, processor 120 may be responsible for running the UE operating system 132, and processing data 136 and instructions 138 received from memory 130, information through RFs 150, the base band communications module, and/or the network communications module. Processor 120 may also process information to be sent to RFs 150 for transmission to the network communications module for transmission to a core network. In the present implementation, processor 120 may include multi-USIM processor 122 for processing instructions from USIM manager 134 for one or more of USIMs of multi-USIM UE 102, for example.

As illustrated in FIG. 1, memory 130 may store the UE operating system 132, USIM manager 134, data 136, and computer-readable, computer-executable instructions 138 (e.g., software codes) that are configured to, when executed, cause processor 120 to perform various functions described herein. Alternatively, USIM manager 134 and/or instructions 138 may not be directly executable by processor 120 but be configured to cause multi-USIM UE 102 (e.g., when compiled and executed) to perform various functions described herein.

In various implementation of the present disclosure, memory 130 may include a variety of computer-readable media. Computer-readable media may be any available media that may be accessed by multi-USIM UE 102 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various implementation of the present disclosure, memory 130 may include computer-storage media in the form of volatile and/or non-volatile memory. Memory 130 may be removable, non-removable, or a combination thereof. Example memory includes solid-state memory, hard drives, optical-disc drives, and etc.

As illustrated in FIG. 1, multi-USIM UE 102 may include multiple USIMs 140, such as USIM-1, USIM-2, through USIM-N. USIM-1, USIM-2, through USIM-N may belong to the same or different network/operator (e.g., Public Land Mobile Network (PLMN)). For example, USIM-1, USIM-2, through USIM-N may belong to Operator A, Operator B, through Operator N, respectively. It should be noted that, although USIMs are described in the present implementation and various implementations of the present disclosure, other subscriber identity modules or subscriber identification modules (e.g., SIMs) may also be used.

As shown in FIG. 1, multi-USIM UE 102 may include multiple RFs 150, such as RF-1, RF-2, through RF-N. Each of the RFs 150 may include a transmitter (e.g., transmitting/transmission circuitry) and a receiver (e.g., receiving/reception circuitry). In some implementations of present disclosure, RF-1, RF-2, through RF-N of RFs 150 may respectively correspond to USIM-1, USIM-2, through USIM-N, where USIM-1, USIM-2, through USIM-N may transmit and/or receive data and control channels, for example, through RF-1, RF-2, through RF-N, respectively.

As shown in FIG. 1, multi-USIM UE 102 may include presentation components 160 for presenting data indications to a person or other device. Examples of presentation components 160 may include a display device, speaker, printing component, vibrating component, etc.

Figure 2:
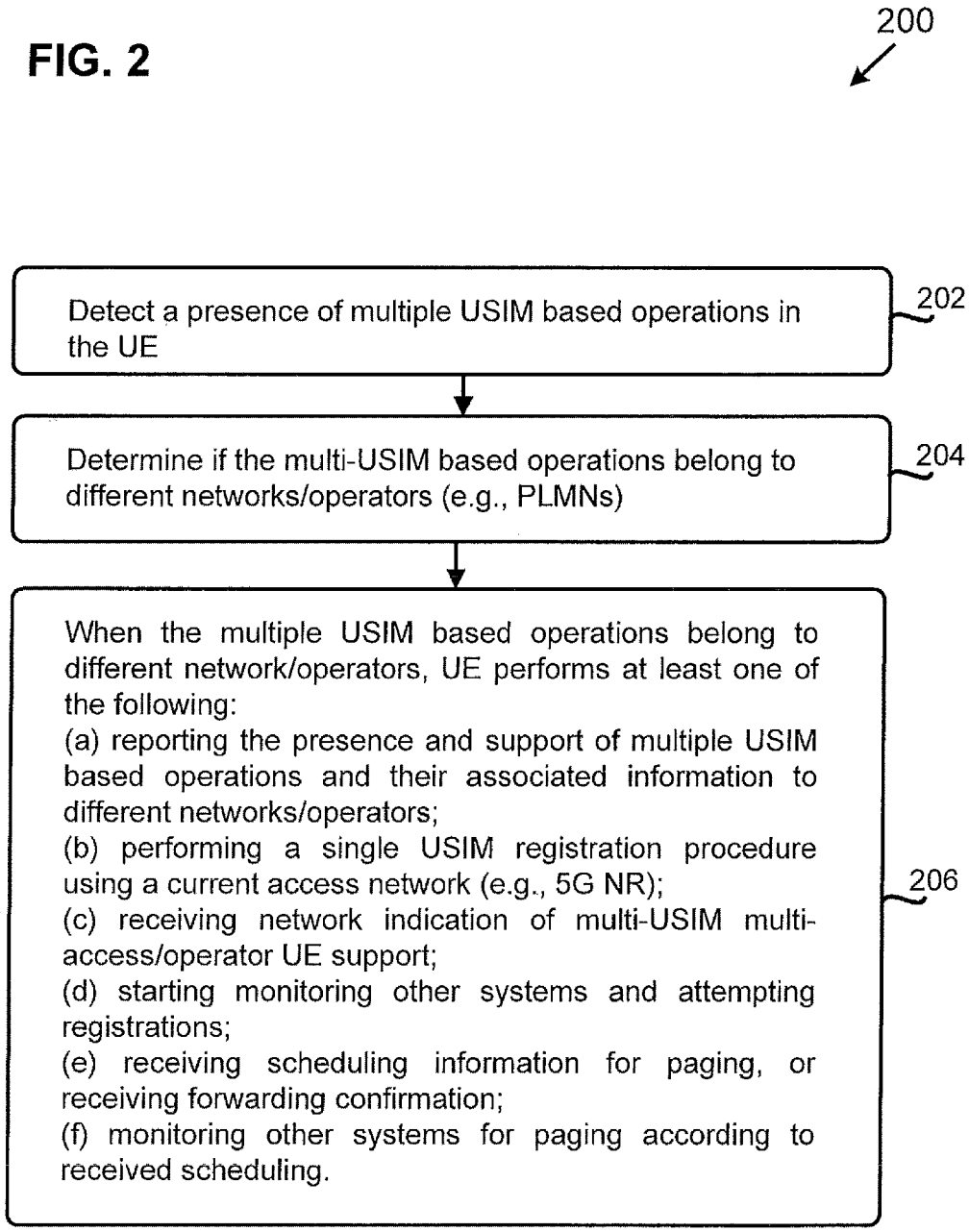
FIG. 2 is a flowchart diagram illustrating a method of a UE for performing multi-USIM registrations in different communication networks, in accordance with example implementations of the present disclosure.

FIG. 2 is a flowchart diagram illustrating a method of a UE for performing multi-USIM registrations in different communication networks, in accordance with example implementations of the present disclosure. As illustrated in FIG. 2, flowchart 200 may include actions 202, 204, and 206. In one implementation, the UE described in flowchart 200 may correspond to multi-USIM UE 102 in FIG. 1.

In action 202, the UE may detect a presence of multiple USIM based operations in the UE. In one implementation, before the UE is powered on, two or more USIMs are inserted into the USIM card slots of the UE, for example. When the UE is powered on, the UE (e.g., through multi-USIM processor 122 and USIM manager 134 in FIG. 1) may detect the presence of the multiple USIM based operations. In another implementation, the UE is initially powered on with a first USIM based operation, and a second USIM based operation is later inserted into the UE. the UE (e.g., through multi-USIM processor 122 and USIM manager 134 in FIG. 1) may detect the second USIM based operation while the UE is operating with the first USIM based operation already registered with the current network.

In action 204, the UE may determine if the multi-USIM based operations belong to different networks/operators. In one implementation, the UE may check the operator IDs (e.g., PLMN IDs) associated with the USIM based operations in the UE to determine if the multi-USIM based operations belong to different networks/operators. For example, when the PLUM IDs of the USIM based operations are different, then the multiple USIM based operations belong to different networks/operators.

In action 206, when the multi-USIM based operations belong to different networks/operators, the UE may report the presence and support of multi-USIM based operations and their associated information to the networks/operators. the UE may perform a single USIM registration procedure using a current (or preferred) access network (e.g., 5G NR). the UE may receive a network indication of multi-USIM and multi-access/operator (e.g., PLMN) the UE support. the UE may start monitor other systems and attempt registrations. the UE may receive scheduling information for paging or receiving forwarding confirmation. the UE may also monitor other systems for paging according to received scheduling.

FIGS. 3-41 illustrate various methods to inform the gNB through signaling that the multi-USIM UE is busy, and may not answer pages until some later time: (1) only a MSG1 (e.g., "MSG1 Only") is sent that is generated per a pre-allocated set of values (e.g., the n-Tuple); (2) a MSG1 and an associated RRC message (e.g., "MSG1 and MSG3") are sent together using a reserved PRACH Preamble in the MSG1 and an associated MSG3; and (3) only an RRC message (e.g., "MSG3 Only") is sent with a new bit to indicate that the UE is busy. The term MSG1 is synonymous with the PRACH Preamble, which is defined in 3GPP specification TS 36.211, Msg2 is synonymous with the PRACH Response, which is defined in 3GPP specification TS 36.321, MSG3 is synonymous with the IE RRCConnectionRequest, which is defined in 3GPP specification TS 36.331 for LTE and TS 38.331 for 5G. The contents of 3GPP specification TS 36.211, TS 36.321, TS 36.331, and TS 38.331 are hereby incorporated by reference in the entirety.

In FIGS. 3-16, various implementations are provided to illustrate a "MSG1 Only" method, by which a UE signals to a gNB that the UE may not respond to paging messages until further notice from the UE (or timer expire), and that the gNB may know exactly which UE sent the signal, while the UE remains in RRC_INACTIVE state, by receiving from the UE a PRACH MSG1 that the UE generated from a specific set of variables and transmitted using a specific set of RF resources.

In general, a UE may inform the gNB of its state, or state transition, via RRC_CONNECTED mode/state signaling. However, as noted above, it may be desirable that the UE signal to the gNB its new state without having to enter into RRC_CONNECTED mode/state.

To begin the steps towards RRC_CONNECTED state while in RRC_IDLE or RRC_INACTIVE state, the UE may use the RACH procedure to signal to the gNB.

When a non-contention based RACH procedure is attempted (e.g., during handover) by the UE, the parameters used to generate and transmit the MSG1 are all deterministic as all the values associated with the parameters are selected by the gNB and sent to the UE to use via a RACHConfigDedicated message, and thus when the gNB receives that MSG1 generated and transmitted by the deterministic values, the gNB may know the identity of the UE that transmitted the MSG1.

When a contention based RACH procedure is attempted (e.g., initial access from RRC_IDLE state), the parameters used to generate and transmit the MSG1 are non-deterministic as the gNB only identifies a range of values associated with the parameters that are sent to the UE via RACH-ConfigCommon messages, and the UE makes a random selection from that range of values, and thus when the gNB receives that MSG1 generated and transmitted by non-deterministic values, the gNB may not know the identity of the UE that transmitted it.

By allowing the gNB to provide to the UE a deterministic set of parameters as found in the RACHConfigDedicated message and extending that set to other parameters sets such as PRACH-ConfigIndex and PRACH-Frequency-Offset and ra-RACH-MaskIndex, the gNB may identify and reserve a unique set of values that creates a deterministic MSG1 that is uniquely assigned to a UE in both time and frequency resources while the UE is in RRC_INACTIVE state. In other words, if the gNB selects a specific value for each parameter that a UE may use when generating and transmitting the MSG1, and if the gNB receives a MSG1 that is generated and transmitted using the specific values for each parameter as assigned by the gNB to a UE, and if the gNB has not assigned the specific value for each parameter to any other UE that is in RRC_INACTIVE state, the gNB may know exactly which UE sent the MSG1.

The relationship between a UE and the set of deterministic values that a gNB has assigned to it to generate and transmit a MSG1 are only valid while the UE is in RRC_INACTIVE state, as it is not necessary in RRC_CONNECTED state, and in RRC_IDLE state there is no context maintained between the UE and the gNB. FIGS. 3-10 illustrate two implementations by which a UE may determine to send a MSG1 (generated and transmitted using the specific assigned variables) to the gNB to indicate that the UE is busy.

FIGS. 3-7, 11, 12, and 13 illustrate a first implementation of the first example method (e.g., a MSG1 only method).

Figure 11:
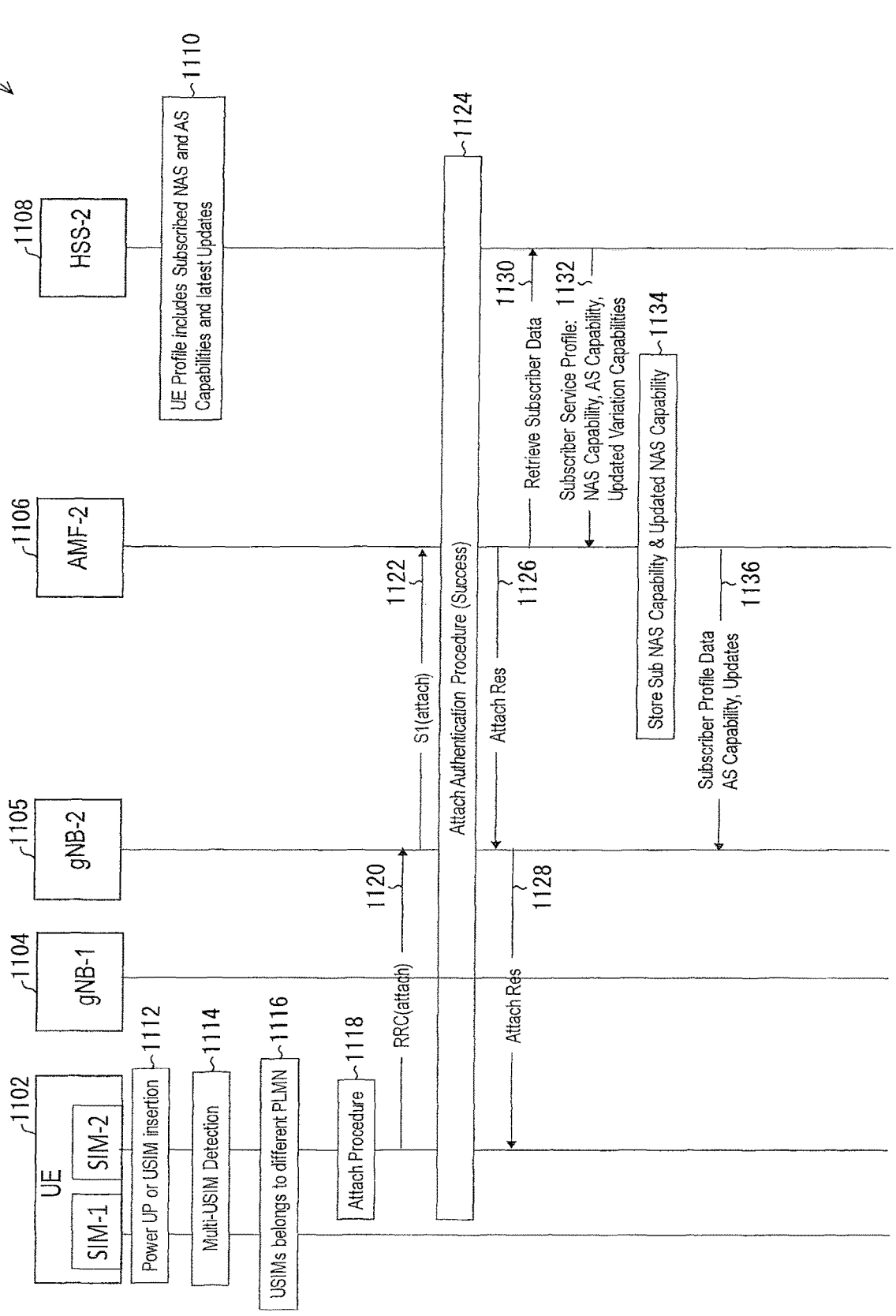
FIG. 11 is a signaling sequence diagram for schematically illustrating a method of reporting a multi-USIM presence in a UE and capabilities of the multiple USIMs to a wireless communication network through an access registration procedure according to the first implementation of the "MSG1 Only" method, in accordance with example implementations of the present disclosure.
Figure 12:
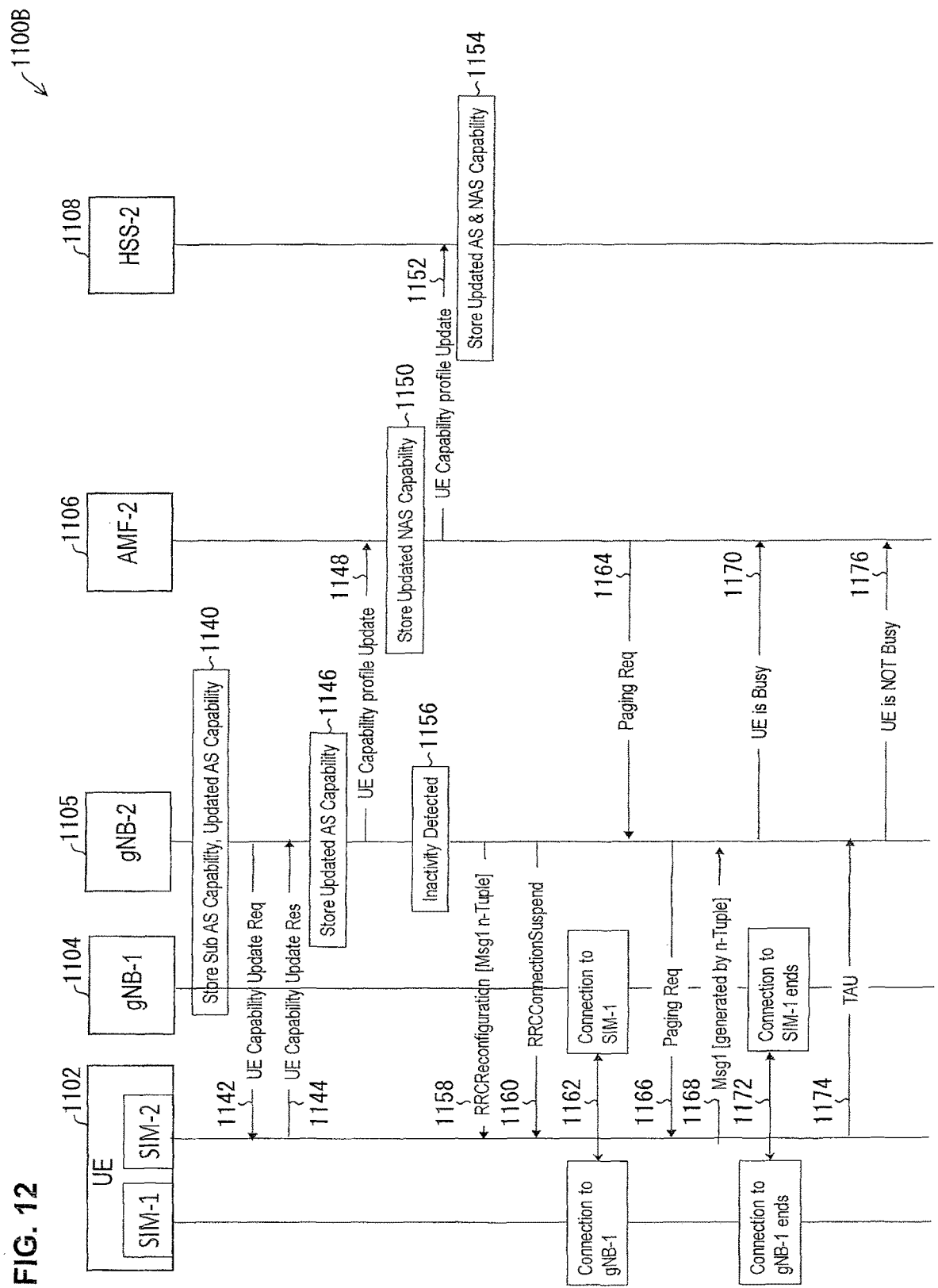
FIG. 12 is a continuation of the signaling sequence diagram in FIG. 11 and further illustrates the UE signaling the busy status to the second base station according to the first implementation of the "MSG1 Only" method, in accordance with example implementations of the present disclosure.

As shown in FIGS. 3-7, a UE may signal to a gNB that the UE may not respond to paging messages until further notice or time-out, for example, through the following procedures: procedure 1.0 (in state diagram 310 in FIG. 3) in one or more actions 312, 314, 316, 318, and 320, procedure 1.2 (in state diagram 410 in FIG. 4) in one or more actions 412, 414, 416, 418, 420, 422, 424, 426, 428, 430, 432, and 434, procedure 1.3 (in state diagram 510 in FIG. 5) in one or more actions 512, 514, 516, 518, 520, 522, 524, 526, 528, 530, 532, and 534, procedure 1.4 (in state diagram 610 in FIG. 6) in one or more actions 612, 614, 616, 618, 620, 622, 624, 626, 628, and 630, and procedure 1.5 (in state diagram 710 in FIG. 7) in one or more actions 712, 714, 716, 718, 720, 722, 724, 726, 728, and 730. In one implementation, the UE described in FIGS. 3-7 may correspond to the multi-USIM UEs in FIGS. 11 and 12. Although the UEs in FIGS. 11 and 12 are each shown to include two USIM based operations (e.g., SIM-1 and SIM-2), it should be understood that they may each include and support more than two USIM based operations.

Figure 3:
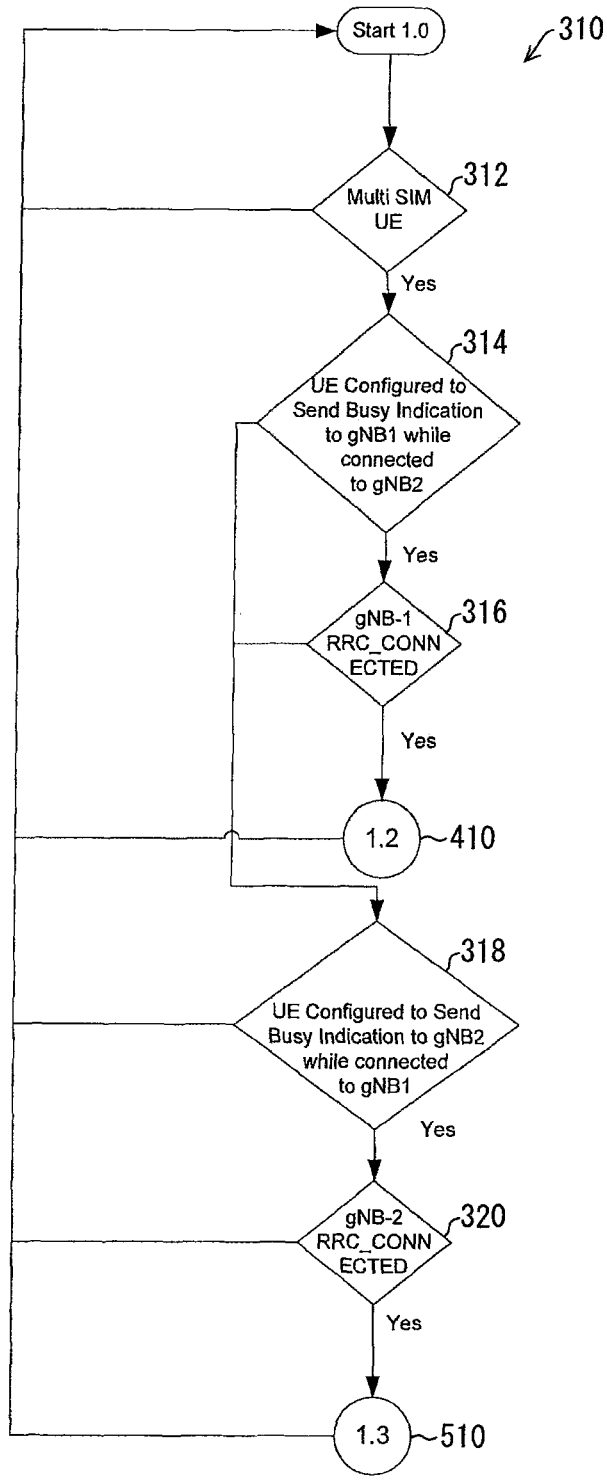
FIG. 3 is a flowchart diagram illustrating a method of a multi-USIM based operation UE signaling a busy status to base stations according to a first implementation of a "MSG1 Only" method, in accordance with example implementations of the present disclosure.
Figure 4:
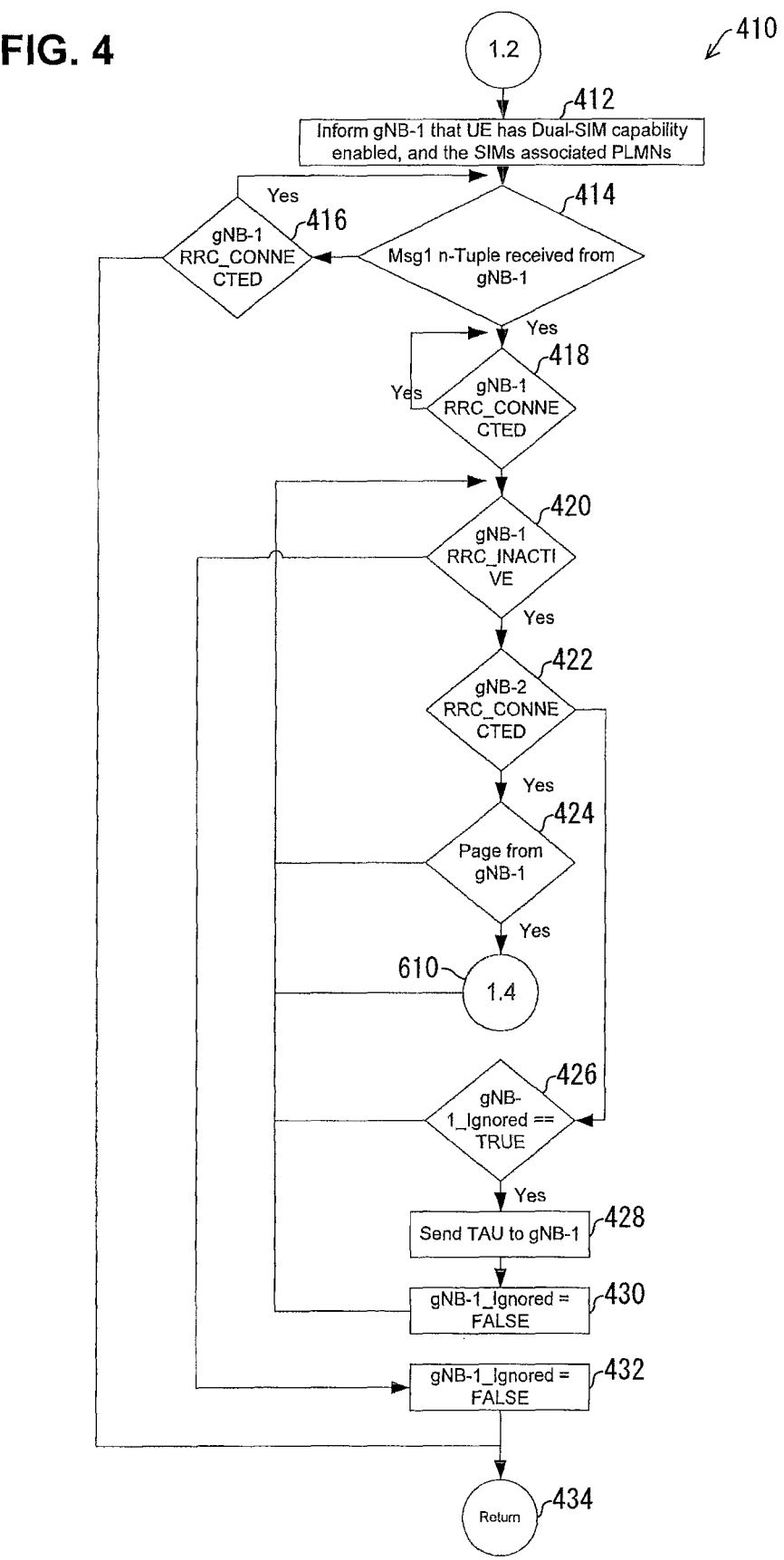
FIG. 4 is a flowchart diagram illustrating the method of the multi-USIM based operation UE signaling a busy status to a first base station according to the first implementation of the "MSG1 Only" method in FIG. 3, in accordance with example implementations of the present disclosure.
Figure 6:
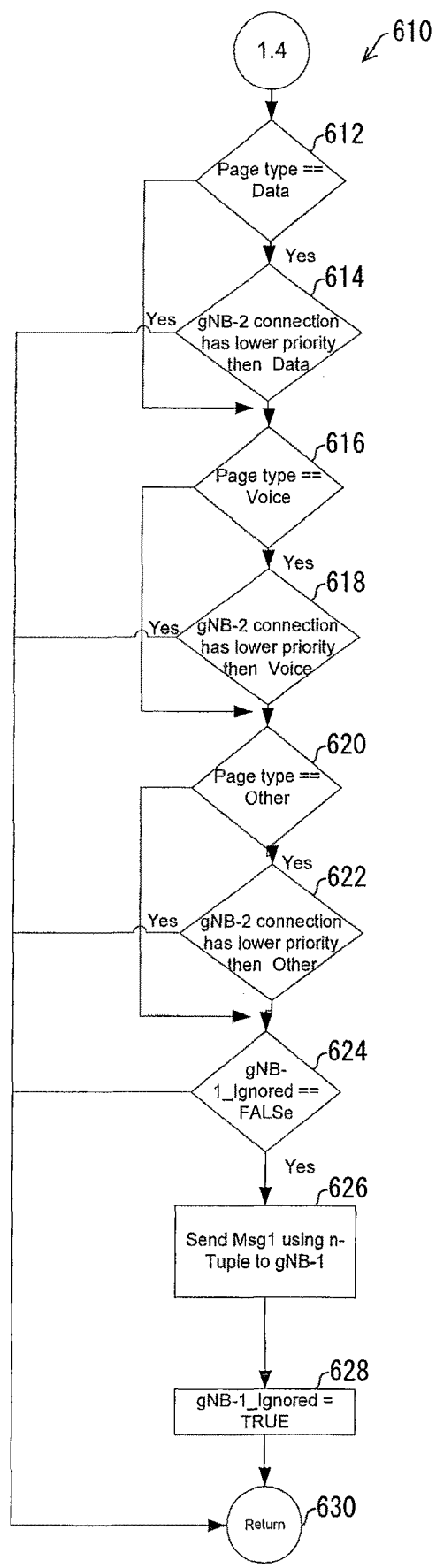
FIG. 6 is a flowchart diagram illustrating the method of the multi-USIM based operation UE signaling the busy status to the first base station according to the first implementation of the "MSG1 Only" method in FIG. 4, in accordance with example implementations of the present disclosure.

FIGS. 3, 4, and 6 illustrate a multi-USIM based operation UE signaling a busy status to a first gNB while connected to a second gNB.

FIG. 3 is a flowchart diagram illustrating a method of a multi-USIM based operation UE signaling a busy status to base stations according to a first implementation of a "MSG1 Only" method, in accordance with example implementations of the present disclosure.

FIG. 4 is a flowchart diagram illustrating the method of the multi-USIM based operation UE signaling a busy status to a first base station according to the first implementation of the "MSG1 Only" method in FIG. 3, in accordance with example implementations of the present disclosure.

FIG. 6 is a flowchart diagram illustrating the method of the multi-USIM based operation UE signaling the busy status to the first base station according to the first implementation of the "MSG1 Only" method in FIG. 4, in accordance with example implementations of the present disclosure.

Referring to FIG. 3, in action 312, the UE may begin by determining if the UE is configured with two active SIM applications. If yes, the state diagram 310 may proceed to action 314. Otherwise, the state diagram 310 may return to the start.

In action 314, the UE may determine if the UE has been configured to send to the first gNB a busy indication while the UE is in RRC_CONNECTED state with the second gNB. If yes, the state diagram 310 may proceed to action 316. Otherwise, the state diagram 310 may proceed to action 318.

In action 316, the UE may determine if the UE has established an RRC connection (e.g., RRC_CONNECTED state) with the first gNB. If the UE is in RRC_CONNECTED state with the first gNB, the state diagram 310 may proceed to procedure 1.2 (in state diagram 410) in FIG. 4. If the UE is not in RRC_CONNECTED state with the first gNB, the state diagram 310 may proceed to action 318.

Referring to FIG. 4, in action 412, the UE may send information to the first gNB about the dual SIM capabilities of the UE and the SIMs associated Public Land Mobile Networks (PLMNs).

In action 414, the UE may wait for the first gNB to send an n-Tuple which describes a MSG1 that is uniquely allocated to this UE. The n-Tuple is for generating and transmitting a MSG1 that indicates the UE may not answer page from the first gNB. The n-Tuple may include a set of specific values for n parameters. In one implementation, the n-Tuple may include four parameters (e.g., n=4): ra-PreambleIndex, ra-PRACH-MaskIndex, PRACH-ConfigIndex, and prach-FreqOffset. In another implementation, the n-Tuple may include less than four parameters (e.g., n=2 or n=3). In yet another implementation, the n-Tuple may include more than four parameters (e.g., n>4).

In action 416, if the UE does not receive the n-Tuple from the first gNB, the UE may check again if the UE is in RRC_CONNECTED state with the first gNB. If the UE is in RRC_CONNECTED state with the first gNB, the method may return to action 414. Otherwise, the state diagram may return from action 416 to procedure 1.0 (in state diagram 310) in FIG. 3 via action 434.

In action 418, the UE may wait for RRC_CONNECTED state to terminate with the first gNB. If RRC_CONNECTED state is terminated with the first gNB, the UE may proceed to action 420. Otherwise, the UE may wait for RRC_CONNECTED state to terminate with the first gNB.

In actions 420, 422, and 424, the UE may wait until the following three respective conditions are TRUE: the UE is in RRC_INACTIVE state with the first gNB (e.g., action 420), the UE is in RRC_CONNECTED state with the second gNB (e.g., action 422), and the UE receives a paging message from the first gNB (e.g., action 424). If the above three conditions are TRUE, the state diagram 410 may proceed to procedure 1.4 (in state diagram 610) in FIG. 6.

In procedure 1.4 in FIG. 6, the UE may check if the service indicated by the page from the first gNB (e.g., Voice, Data, other) has a priority (that has been assigned by the user to the service of the first gNB) that is lower than the priority (that has been assigned by the user to the service of the second gNB) that is currently being provided by the connection to the second gNB via actions 612, 614, 616, 618, 620, and 622 in procedure 1.4 of FIG. 6.

In actions 612 through 622 of FIG. 6, if the current service (e.g., data, voice, or other services) provided by the second gNB has a higher priority than the service (e.g., data, voice, or other services) indicated by the page from the first gNB, then the UE may test the state of the local variable "gNB-1_Ignored" in action 624, and if the local variable "gNB-1_Ignored" is set to FALSE, the UE may send to the first gNB a MSG1 in action 626, to indicate that the UE may not answer pages from first gNB. The MSG1 is generated and transported per values in the n-Tuple provided by the first gNB to the UE. For example, the type of page(s) or service(s) (e.g., data, voice, or other services), in respective actions 612, 616, and 620, from the first gNB may be determined and may proceed respectively to actions 614, 618, and 622 if the type of service(s) is determined. In actions 614, 618, and 622, if the current service by the second gNB has a higher priority than any one or more of the determined services from first gNB, the state diagram may proceed to action 624 as describe above.

In action 628, after the UE sends the MSG1 using the n-Tuple to the first gNB, the UE may then set a local variable "gNB-1_Ignored" to TRUE, to track that a paging message from the first gNB has been ignored and that a MSG1 has been generated and transmitted per the n-Tuple to the first gNB. The state diagram may proceed to action 630.

In action 630, the UE may return to actions 420, 422, and 424 in FIG. 4 to wait again for the three conditions above to be TRUE.

In action 420, returning from action 630, if the UE exits RRC_INACTIVE state with the first gNB while, for example, waiting for the other two conditions above to be TRUE, the UE may return to action 434 after setting the local variable "gNB-1_Ignored" to FALSE in action 432.

In action 422, if the UE exits RRC_CONNECTED state with the second gNB while, for example, waiting for the other two conditions above to be TRUE, the UE may test the state of the local variable "gNB-1_Ignored" in action 426.

In action 426, if the local variable "gNB-1_Ignored" is set to TRUE, the UE may send to the first gNB a Targeting Area Update (TAU) message to indicate that the UE may again respond to paging messages from the first gNB in action 428.

In action 430, after sending the TAU message, the UE may set the local variable "gNB-1_Ignored" to FALSE and continues to wait for the three conditions above to be TRUE by returning to action 420.

In action 424, if the UE did not receive a page from the first gNB, the UE may return to action 420 and continue to wait for the three conditions above to be TRUE.

Figure 5:
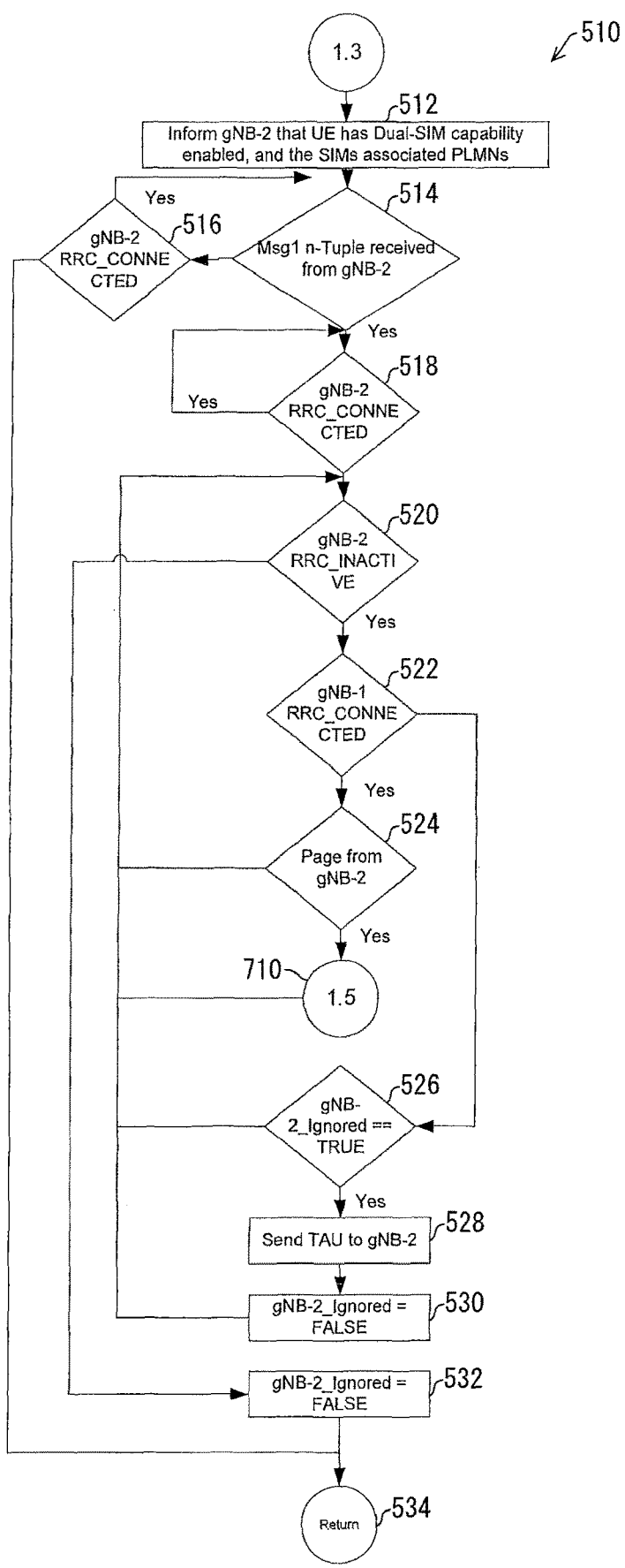
FIG. 5 is a flowchart diagram illustrating the method of the multi-USIM based operation UE signaling a busy status to a second base station according to the first implementation of the "MSG1 Only" method in FIG. 3, in accordance with example implementations of the present disclosure.
Figure 7:
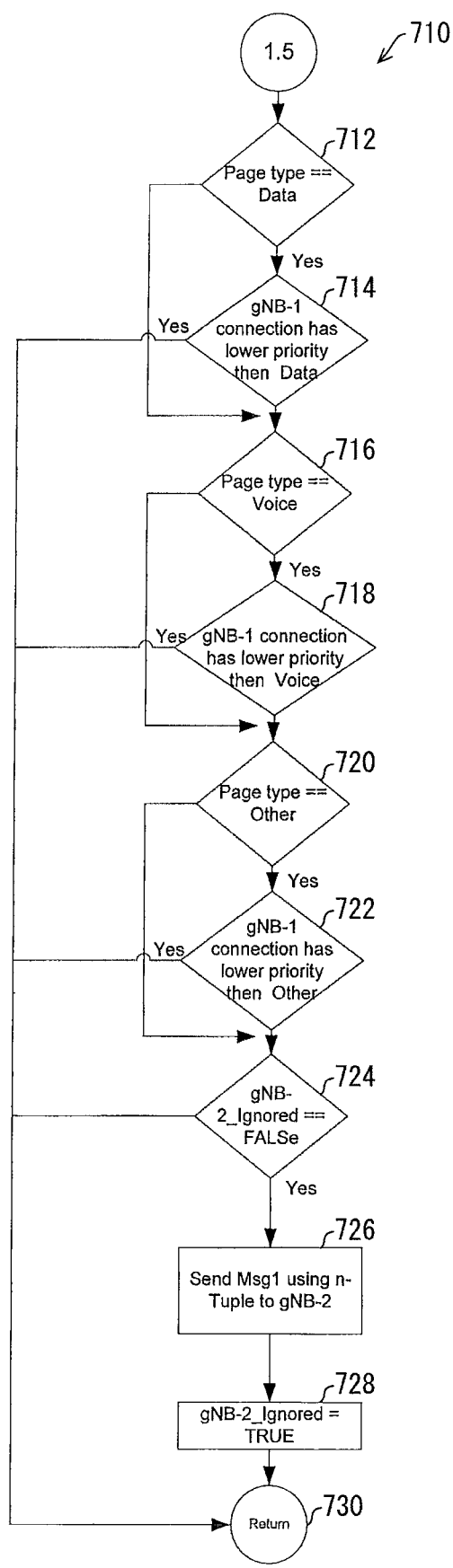
FIG. 7 is a flowchart diagram illustrating the method of the multi-USIM based operation UE signaling the busy status to the second base station according to the first implementation of the "MSG1 Only" method in FIG. 5, in accordance with example implementations of the present disclosure.

FIGS. 3, 5, and 7 illustrate the multi-USIM based operation UE signaling a busy status to the second gNB while connected to the first gNB.

FIG. 5 is a flowchart diagram illustrating the method of the multi-USIM based operation UE signaling a busy status to a second base station according to the first implementation of the "MSG1 Only" method in FIG. 3, in accordance with example implementations of the present disclosure.

FIG. 7 is a flowchart diagram illustrating the method of the multi-USIM based operation UE signaling the busy status to the second base station according to the first implementation of the "MSG1 Only" method in FIG. 5, in accordance with example implementations of the present disclosure.

Referring to FIG. 3, in action 312, the UE may begin by determining if the UE is configured with two active USIM applications. If yes, the state diagram 310 may proceed to action 314. Otherwise, the state diagram 310 may return to the start.

In action 314, the UE may determine if the UE has been configured to send to the first gNB a busy indication while the UE is in RRC_CONNECTED state with the second gNB. If the UE determines that the UE has not been configured to send to the first gNB a busy indication while the UE is in RRC_CONNECTED state with the second gNB, the state diagram may proceed to action 318.

In action 318, the UE may determine if the UE has been configured to send to the second gNB a busy indication while the UE is in RRC_CONNECTED state with the first gNB. If the UE has been configured to send to the second gNB a busy indication while the UE is in RRC_CONNECTED state with the first gNB, the state diagram 310 may proceed to action 320. If the UE has not been configured to send to the second gNB a busy indication while the UE is in RRC_CONNECTED state with the first gNB, the state diagram 310 may return to the start of procedure 1.0.

In action 320, the UE may determine if the UE is in RRC_CONNECTED state with the second gNB. If the UE is in RRC_CONNECTED state with the second gNB, the state diagram may proceed to procedure 1.3 (in state diagram 510) in FIG. 5. If the UE is not in RRC_CONNECTED state with the second gNB, the state diagram 310 may return to the start of procedure 1.0.

Referring to FIG. 5, in action 512, the UE may send information to the second gNB about the dual SIM capabilities of the UE and the SIMS associated PLMNs.

In action 514, the UE may wait for the second gNB to send an n-Tuple which describes a MSG1 that is uniquely allocated to this UE. The n-Tuple is for generating and transmitting a MSG1 that indicates the UE may not answer page from the second gNB. The n-Tuple may include a set of specific values for n parameters. In one implementation, the n-Tuple may include four parameters (e.g., n=4): ra-PreambleIndex, ra-PRACH-MaskIndex, PRACH-ConfigIndex, and prach-FreqOffset. In another implementation, the n-Tuple may include less than four parameters (e.g., n=2 or n=3). In yet another implementation, the n-Tuple may include more than four parameters (e.g., n>4).

In action 516, if the UE does not receive the n-Tuple from the second gNB, the UE may check again if the UE is in RRC_CONNECTED state with the second gNB. If the UE is in RRC_CONNECTED state with the second gNB, the method may return to action 514, otherwise, the UE may return to procedure 1.0 (in state diagram 310) in FIG. 3 via action 534.

In action 518, the UE may wait for RRC_CONNECTED state to terminate with the second gNB. If RRC_CONNECTED state is terminated with the second gNB, the UE may proceed to action 520. Otherwise, the UE may wait until RRC_CONNECTED state to terminate with the second gNB.

In actions 520, 522, and 524, the UE may wait until the following three respective conditions are TRUE: the UE is in RRC_INACTIVE state with the second gNB (e.g., action 520), the UE is in the RRC_Connected with the first gNB (e.g., action 522), and the UE receives a paging message from the second gNB (e.g., action 524). If the above three conditions are TRUE, the state diagram 510 may proceed to procedure 1.5 (in state diagram 710) in FIG. 7.

In procedure 1.5 in FIG. 7, the UE may check if the service indicated by the page from the second gNB (e.g., Voice, Data, other) has a priority (that has been assigned by the user to the service of the second gNB) that is lower than the priority (that has been assigned by the user to the service of the first gNB) that is currently being provided by the connection to the first gNB via actions 712, 714, 716, 718, 720, and 722 in procedure 1.5 (in state diagram 710) of FIG. 7.

In actions 712 through 722 of FIG. 7, if the current service (e.g., data, voice, or other services) provided by the first gNB has a higher priority than the service (e.g., data, voice, or other services) indicated by the page from the second gNB, the UE may test the state of the local variable "gNB-2_Ignored" as shown in action 724, and if the local variable "gNB-2_Ignored" is set to FALSE, the UE may send to the second gNB a MSG1 in action 726, to indicate that the UE may not answer pages from the second gNB. The MSG1 is generated and transported per values in the n-Tuple provided by the second gNB to the UE. For example, the type of page(s) or service(s) (e.g., data, voice, or other services), in respective actions 712, 716, and 720, from the second gNB may be determined and may proceed respectively to actions 714, 718, and 722 if the type of service(s) is determined. In actions 714, 718, and 722, if the current service by the first gNB has a higher priority than any one or more of the determined services from the second gNB, the state diagram may proceed to action 724 as describe above.

In action 728, after the UE sends the MSG1 using n-Tuple to the second gNB, the UE may then set a local variable "gNB-2_Ignored" to TRUE, to track that a paging message from the second gNB has been ignored and that a MSG1 has been generated and transmitted per the n-Tuple to the second gNB. The state diagram may proceed to action 730.

In action 730, the UE may return to actions 520, 522, and 524 in FIG. 5 to wait again for the three conditions above to be TRUE.

In action 520, returning from action 730, if the UE exits RRC_INACTIVE state with the second gNB while, for example, waiting for the other two conditions above to be TRUE, the UE may return to action 534 after setting the local variable "gNB-2_Ignored" to FALSE in action 532.

In action 522, if the UE exits RRC_CONNECTED state with the first gNB while, for example, waiting for the other two conditions above to be TRUE, the UE may test the state of the local variable "gNB-2_Ignored" in action 526.

In action 526, if the local variable "gNB-2_Ignored" is set to TRUE, the UE may send to the second gNB a Targeting Area Update (TAU) message to indicate that the UE may again respond to paging messages from the second gNB in action 528. The state diagram may proceed to action 530.

In action 530, after sending the TAU message, the UE may set the local variable "gNB-2_Ignored" to FALSE and continues to wait for the three conditions above to be TRUE by returning to action 520.

In action 524, if the UE did not receive a page from the second gNB, the UE may return to action 520 and continue to wait for the three conditions above to be TRUE.

FIGS. 5 and 7 are respectively similar to FIGS. 4 and 6 with the differences that the UE in FIGS. 5 and 7 sends the MSG1 to the second gNB when the UE receives an n-Tuple from the second gNB, and the UE receives a page from the second gNB while in RRC_CONNECTED state with the first gNB when the UE is in RRC_INACTIVE state with the second gNB.

FIGS. 11 and 12 further exemplify the first implementation of the "MSG1 Only" method.

FIG. 11 is a signaling sequence diagram for schematically illustrating a method of reporting a multi-USIM presence in a UE and capabilities of the multiple USIMs to a wireless communication network through an access registration procedure according to the first implementation of the "MSG1 Only" method, in accordance with example implementations of the present disclosure.

FIG. 12 is a continuation of the signaling sequence diagram in FIG. 11 and further illustrates the UE signaling the busy status to the second base station according to the first implementation of the "MSG1 Only" method, in accordance with example implementations of the present disclosure.

As shown in FIG. 11, in diagram 1100A, UE 1102 may report or register the presence and capabilities of multi-USIM based operations associated with second SIM (e.g., SIM-2, hereinafter "USIM2") to second Home Subscriber Server (HSS-2) 1108 through second next generation NodeB (gNB-2) 1105 and second Access and Mobility Management Function (AMF-2) 1106, for example, through one or more of actions 1110, 1112, 1114, 1116, 1118, 1120, 1122, 1124, 1126, 1128, 1130, 1132, 1134, and 1136. In one implementation, UE 1102 described in diagram 1100A may correspond to multi-USIM UE 102 in FIG. 1. It should be noted that, in diagram 1100A, although UE 1102 is shown to include two USIM based operations (SIM-1/USIM1 and SIM-2/USIM2 based operations), UE 1102 may include and support more than two USIM based operations.

In action 1110, HSS-2 1108 may store the UE's profiles including Subscribed NAS and AS capabilities and latest updates.

In action 1112, UE 1102 may be powered on with two USIMs (e.g., SIM-1 and SIM-2) already in UE 1102, or with only one of the two USIMs inserted and the other USIM inserted after UE 1102 is powered on.

In action 1114, UE 1102 may detect a presence of multiple USIMs, and multi-USIM based operations. For example, when UE 1102 is powered on, UE 1102 (e.g., through multi-USIM processor 122 and USIM manager 134 in FIG. 1) may detect the presence of more than one USIM (e.g., SIM-1 and SIM-2, hereinafter "USIM1" and "USIM2"). In the present implementation, before UE 1102 is powered on, USIM-1 and USIM-2 are inserted into the USIM card slots of UE 1102, for example. Thus, upon being powered on, UE 1102 detects the presence of both USIM1 and USIM2 based operations.

In action 1116, UE 1102 may further determine if USIM1 and USIM2 based operations belong to different networks/operators (e.g., operator/PLMN A and operator/PLMN B in FIG. 1). In one implementation, UE 1102 may check the operator IDs (e.g., PLMN IDs) associated with USIM1 and USIM2 based operations to determine if the operator IDs are different. For example, each operator ID may include a mobile country code (MCC) and a mobile network code (MNC). When the MCC and MNC of USIM1 based operations do not match those of USIM2 based operations, UE 1102 may determine that USIM1 based operations and USIM2 based operations respectively belong to different networks/operators.

In action 1118, USIM2 in UE 1102 may initiate an attach procedure.

In action 1120, USIM2 in UE 1120 may send an attach request to gNB-2 1105 via an RRC message.

In action 1122, gNB-2 1105 may send the attach request to AMF-2 1106 via an S1 interface.

In action 1124, authentication procedures for USIM 2 may be performed. For example, a USIM processor (e.g., multi-USIM processor 122 in FIG. 1) of UE 1102 may process an authentication request, using RAND it received and its pre-shared secret key to generate authentication parameters through authentication calculation. USIM2 may send an authentication response of USIM2, including a Response (RES) to AMF-2 1106 and the RF associated with USIM2. If the RES of USIM2 from the UE 1102 matches the XRES AMF-2 1106 received from HSS-2 1108, then USIM2 is authenticated successfully. AMF-2 1106 may send a USIM2 authentication success message to HSS-2 1108. AMF-2 1106 may send a registration and authentication success message to USIM2 through the associated RF circuitry (e.g., RF2 in FIG. 1) of USIM2. USIM2 of UE 1102's registration and authentication are successful. For example, the Attach is complete for USIM2. For example, AMF-2 1106 may start managing USIM2 of UE 1102.

In action 1126, AMF-2 1106 may send an attach response to gNB-2 1105.

In action 1128, second gNB 1105 may send the attach response to USIM2 of UE 1102.

In action 1130, AMF-2 1106 may send a request to retrieve subscriber data.

In action 1132, HSS-2 1108 may send subscriber service profile including NAS capabilities, AS capabilities, and updated variation capabilities to AMF-2 1106.

In action 1134, AMF-2 1106 may store sub NAS capabilities and updated NAS capabilities.

In action 1136, AMF-2 1106 may send subscriber profile data AS capabilities and updates to gNB-2 1105.

As shown in FIG. 12, in diagram 1100B, UE 1102 may continue to report or register the presence and capabilities of multi-USIM based operations associated with second SIM (e.g., SIM-2, hereinafter "USIM2") to second Home Subscriber Server (HSS-2) 1108 through second next generation NodeB (gNB-2) 1105 and second Access and Mobility Management Function (AMF-2) 1106, for example, through one or more of actions 1140, 1142, 1144, 1146, 1148, 1150, 1152, and 1154. Subsequently, UE 1102 may signal to gNB-2 1105 that UE 1102 may not answer pages from gNB-2 1105, for example, through one or more actions 1156, 1158, 1160, 1162, 1164, 1166, 1168, 1170, 1172, 1174, and 1176. In one implementation, UE 1102 described in diagram 1100B may correspond to multi-USIM UE 102 in FIG. 1. It should be noted that, in diagram 1100B, although UE 1102 is shown to include two USIM based operations (SIM-1/USIM1 and SIM-2/USIM2 based operations), UE 1102 may include and support more than two USIM based operations.

In action 1140, gNB-2 1105 may store UE 1102's sub AS capabilities and update AS capabilities of UE 1102.

In action 1142, gNB-2 1105 may send a UE capability update request to USIM2 of UE 1102.

In action 1144, USIM2 of UE 1102 may send a UE capability update response to gNB-2 1105.

In action 1146, gNB-2 1105 may store the updated AS capabilities with multi-USIM based operation capabilities of UE 1102.

In action 1148, gNB-2 1105 may send a message to AMF-2 1106 to update UE 1102's multi-USIM capability profile.

In action 1150, AMF-2 1106 may store the updated NAS capabilities with multi-USIM based operation capabilities of UE 1102.

In action 1152, AMF-2 1106 may send a message to HSS-2 1108 to update UE 1102's multi-USIM capability profile.

In action 1154, HSS-2 1108 may update and store the updated AS and NAS capabilities of UE 1102.

In action 1156, gNB-2 1105 may detect USIM2 inactivity in UE 1102.

In action 1158, gNB-2 1105 may send MSG1 using an n-Tuple (via RRCReconfiguration message from gNB-2) to USIM2 of UE 1102.

In action 1160, UE 1102 may enter into RRC_INACTIVE state with gNB-2 (via RRCConnectionSuspend message from gNB-2).

In action 1162, UE 1102 may establish an RRC Connection between USIM1 of UE 1102 and gNB-1 1104.

In action 1164, AMF-2 1106 may send a paging request to gNB-2 1105.

In action 1166, gNB-2 1105 may send a paging request to USIM2 of UE 1102.

In action 1168, USIM2 of UE 1102 may send a MSG1 to gNB-2 1105 in response to the page that is generated and transmitted per variables of the n-Tuple received from gNB-2 1105.

In action 1170, gNB-2 1105 may send a message to AMF-2 1106 to indicate UE 1102 is busy and may not receive pages from gNB-2 1105.

In action 1172, RRC Connection between USIM1 of UE 1102 and gNB-1 1104 may end.

In action 1174, USIM2 of UE 1102 may send a TAU message to gNB-2 1105.

In action 1176, gNB-2 1105 may send a message to AMF-2 1106 to indicate UE 1102 is not busy and may receive pages from gNB-2 1105.

As described above, for example, one of the two gNBs (e.g., gNB-2 1105) may signal to UE 1102 an n-Tuple that contains a set of values that UE 1102 may use to generate and transmit a MSG1 to indicate to gNB-2 1105 that UE 1102 may not respond to pages from gNB-2 1105. gNB-2 1105 may send the n-Tuple as a new IE that is contained in an RRCConnectionReconfigruation Message. The new IE that contains the n-Tuple may, for example, be RACH-ConfigDedicatedBusy, and may have the structure as shown in FIG. 13. Thus, for example, if gNB-2 1105 were to assign to the IE RACH-ConfigDedicatedBusy the values of [63, 15, 63, 94] (e.g., the n-Tuple) and the values are mapped to ra-PreambleIndex, ra-PRACH-MaskIndex, prach-ConfigIndex, prach-FreqOffset respectively, and gNB-2 1105 sends that IE to UE 1102, and gNB-2 1105 has not assigned that same value set of values to any other UE that is in RRC_I-NACTIVE state with gNB-2 1105, and gNB-2 1105 subsequently receives a MSG1 that is generated and transmitted using the values of the IE sent to UE 1102, gNB-2 1105 may know exactly UE 1102 that sent the MSG1. If it is pre-arranged between UE 1102 and gNB-2 1105 that when such a MSG1 is generated and transmitted by UE 1102 (e.g., using the values of the n-Tuple) and received by gNB-2 1105, gNB-2 1105 may be made aware that UE 1102 may not respond to paging messages from the gNB (gNB-2 1105) until some further notice from UE 1102 (e.g., a TAU message from UE 1102) or a timer expires.

FIGS. 8-10 and 14-16 illustrate a second implementation of the "MSG1 Only" method.

Figure 8:
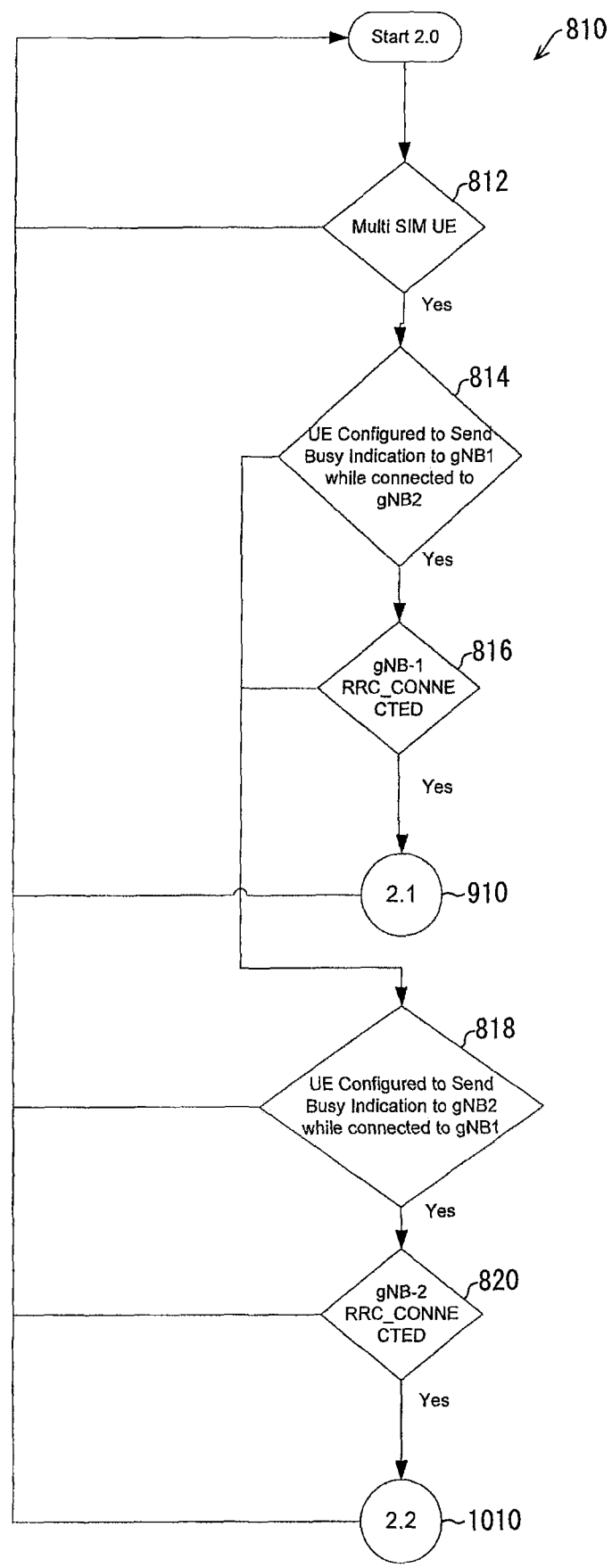
FIG. 8 is a flowchart diagram illustrating a method of a multi-USIM based operation UE signaling a busy status to base stations according to a second implementation of the "MSG1 Only" method, in accordance with example implementations of the present disclosure.
Figure 9:
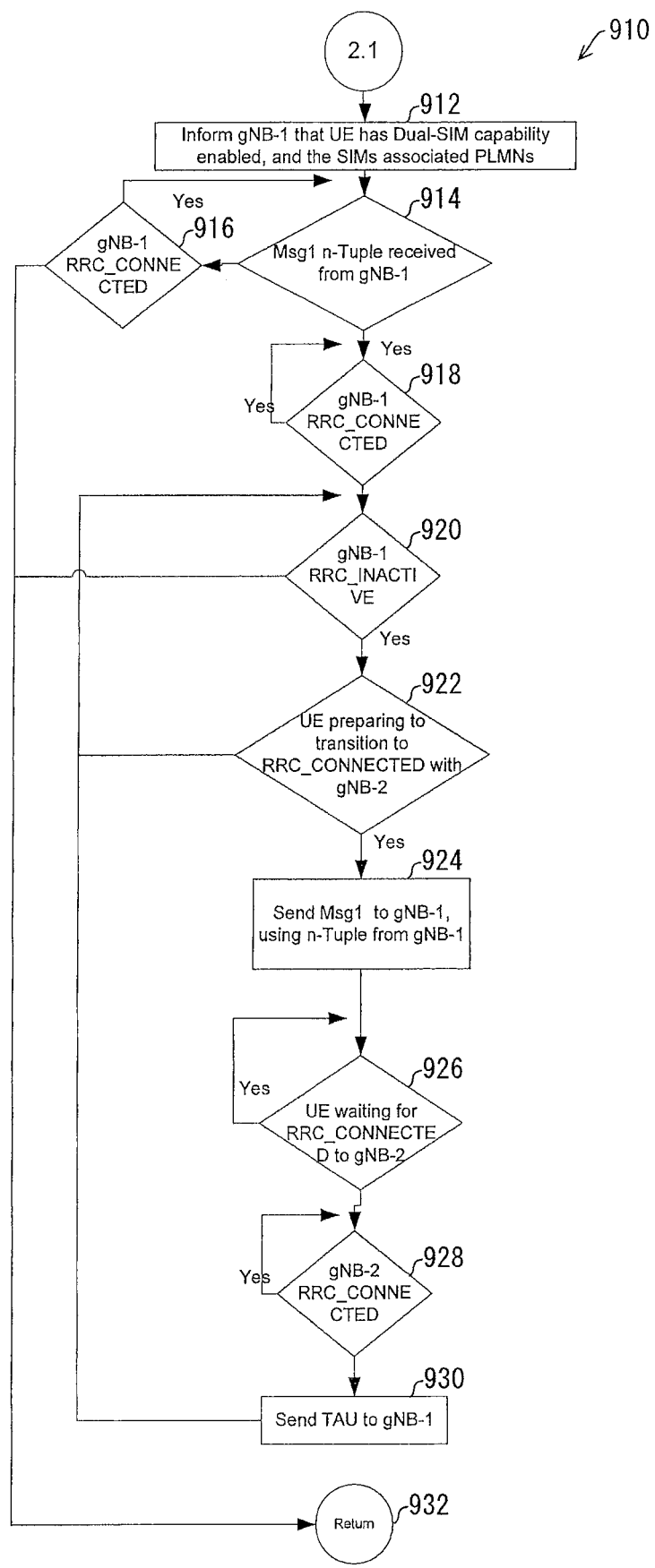
FIG. 9 is a flowchart diagram illustrating the method of the multi-USIM based operation UE signaling a busy status to a first base station according to the second implementation of the "MSG1 Only" method in FIG. 8, in accordance with example implementations of the present disclosure.
Figure 10:
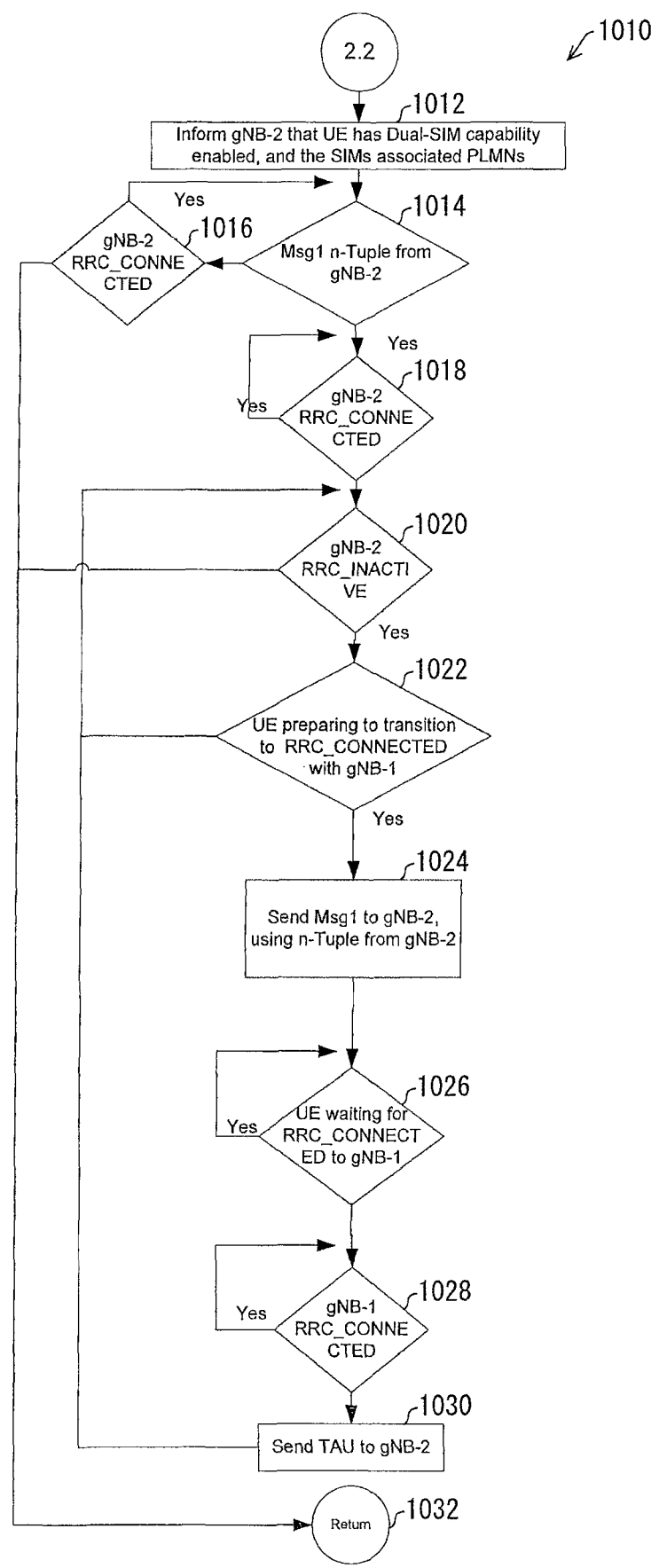
FIG. 10 is a flowchart diagram illustrating the method of the multi-USIM based operation UE signaling a busy status to a second base station according to the second implementation of the "MSG1 Only" method in FIG. 8, in accordance with example implementations of the present disclosure.
Figure 15:
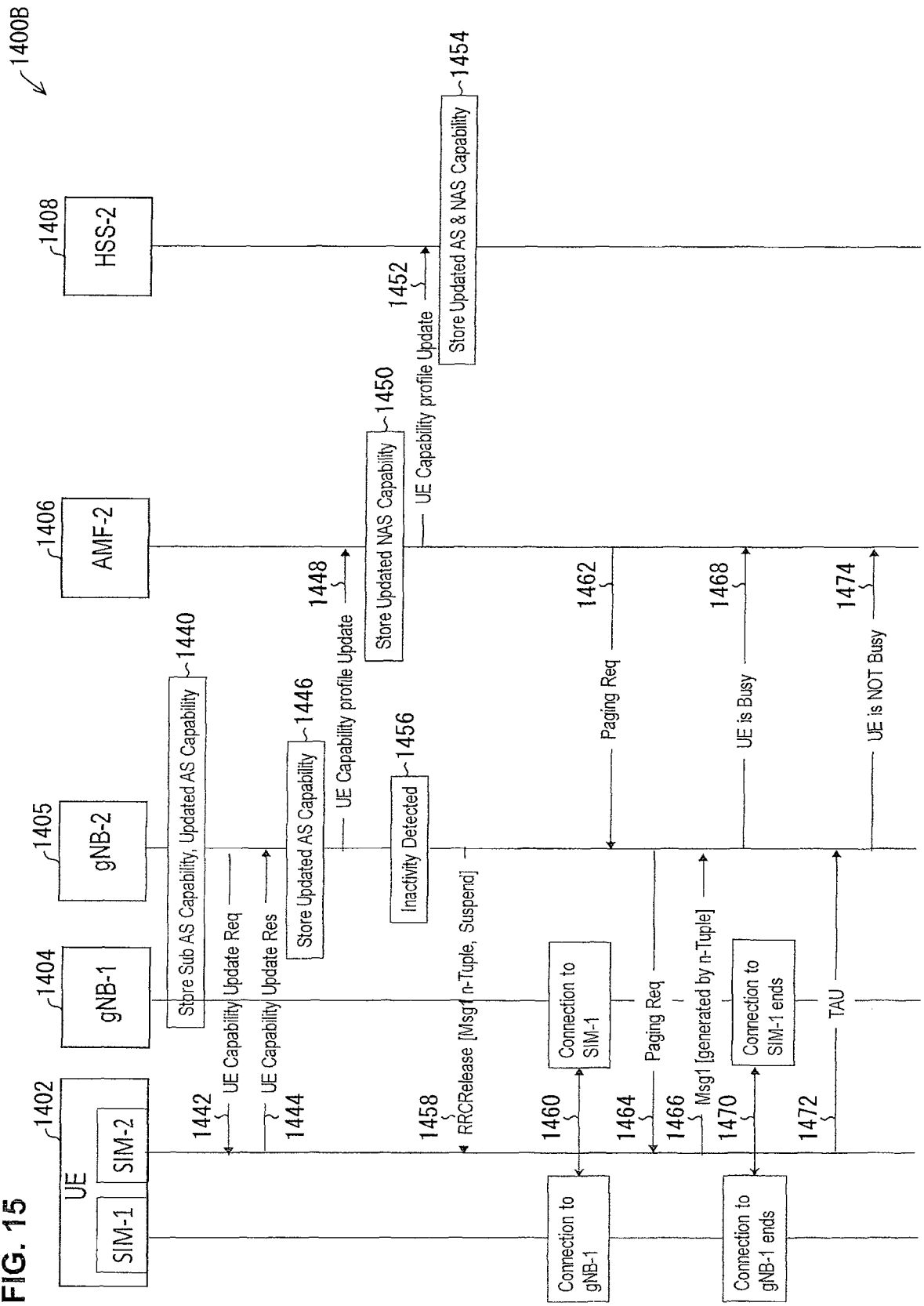
FIG. 15 is a continuation of the signaling sequence diagram in FIG. 14 and further illustrates the UE signaling a busy status to the second base station according to the second implementation of the "MSG1 Only" method, in accordance with example implementations of the present disclosure.

As shown in FIGS. 8-10, the UE may signal to a gNB that the UE may not respond to paging messages until further notice or time-out, for example, through the following procedures: procedure 2.0 (in state diagram 810 in FIG. 8) in one or more actions 812, 814, 816, 818, and 820, procedure 2.1 (in state diagram 910 in FIG. 9) in one or more actions 912, 914, 916, 918, 920, 922, 924, 926, 928, 930, and 932, and procedure 2.2 (in state diagram 1010 in FIG. 10) in one or more actions 1012, 1014, 1016, 1018, 1020, 1022, 1024, 1026, 1028, 1030, and 1032. In one implementation, the UE described in FIGS. 8-10 may correspond to the multi-USIM UEs in FIGS. 14 and 15. Although the UEs in FIGS. 14 and 15 are each shown to include two USIM based operations (e.g., SIM-1 and SIM-2), it should be understood that they may each include and support more than two USIM based operations.

FIGS. 8 and 9 illustrate a multi-USIM based operation UE signaling a busy status to a first gNB while connected to a second gNB.

FIG. 8 is a flowchart diagram illustrating a method of a multi-USIM based operation UE signaling a busy status to base stations according to a second implementation of the "MSG1 Only" method, in accordance with example implementations of the present disclosure.

FIG. 9 is a flowchart diagram illustrating the method of the multi-USIM based operation UE signaling a busy status to a first base station according to the second implementation of the "MSG1 Only" method in FIG. 8, in accordance with example implementations of the present disclosure.

In action 812 of FIG. 8, the UE may begin by determining if the UE is configured with two active SIM applications. If yes, the state diagram 810 may proceed to action 814. Otherwise, the state diagram 810 may return to the start.

In action 814, the UE may determine if the UE has been configured to send to the first gNB a busy indication while the UE is in RRC_CONNECTED state with the second gNB. If yes, the state diagram 810 may proceed to action 816. Otherwise, the state diagram 810 may proceed to action 818.

In action 816, the UE may determine if the UE is in RRC_CONNECTED state with the first gNB. If the UE is in RRC_CONNECTED state with the first gNB, the state diagram may proceed to procedure 2.1 (in state diagram 910) in FIG. 9. If the UE is not in RRC_CONNECTED state with the first gNB, the state diagram 810 may proceed to action 818.

Referring to FIG. 9, in action 912, the UE may send information to the first gNB about the dual SIM capabilities of the UE and the SIMS associated PLMNs.

In action 914, the UE may wait for the first gNB to send an n-Tuple that describes a MSG1 that is uniquely allocated to this UE. The n-Tuple is for generating and transmitting a MSG1 that indicates the UE may not answer page from the first gNB. The n-Tuple may include a set of specific values for n parameters. In one implementation, the n-Tuple may include four parameters (e.g., n=4): ra-PreambleIndex, ra-PRACH-MaskIndex, PRACH-ConfigIndex, and prach- FreqOffset. In another implementation, the n-Tuple may include less than four parameters (e.g., n=2 or n=3). In yet another implementation, the n-Tuple may include more than four parameters (e.g., n>4).

In action 916, if the UE does not receive the n-Tuple from the first gNB, the UE may check again if the UE is in RRC_CONNECTED state with the first gNB. If the UE is in RRC_CONNECTED state with the first gNB, the method may return to action 914. Otherwise, the UE may return to procedure 2.0 (in state diagram 810) in FIG. 8 via action 932.

In action 918, the UE may wait for RRC_CONNECTED state to terminate with the first gNB. If RRC_CONNECTED state is terminated with the first gNB, the UE may proceed to action 920. Otherwise, the UE may wait until RRC_CONNECTED state to terminate with the first gNB.

In actions 920 and 922, the UE may wait until the next two conditions are TRUE: the UE is in RRC_INACTIVE state with the first gNB (e.g., action 920), and the UE is about to attempt to establish an RRC connection with the second gNB (e.g., action 922). If the above two conditions are TRUE, the UE may send to the first gNB a MSG1 in action 924, to indicate that the UE may not answer pages from first gNB. The MSG1 is generated and transported to the first gNB per values in the n-Tuple provided by the first gNB to the UE.

In action 926, after the UE sends the MSG1 to the first gNB, the UE may wait for establishing the RRC connection with the second gNB.

In action 928, the UE may wait until the second gNB exits RRC_CONNECTED state with the second gNB.

In action 930, the UE may send to the first gNB a TAU message to indicate that it may again respond to paging messages from the first gNB. Any subsequent communications started by the UE that does not use the n-Tuple to generate the MSG1 may suffice in indicating that the UE may answer to pages. After sending the TAU message, the UE may again wait for the two conditions above to be TRUE by returning to action 920. In action 920, if the UE exits RRC_INACTIVE state with the first gNB while, for example, waiting for the other condition to be TRUE, the UE may return to procedure 2.0 (in state diagram 810) in FIG. 8 via action 932.

FIGS. 8 and 10 illustrate a multi-USIM based operation UE signaling a busy status to the second gNB while connected to the first gNB.

FIG. 10 is a flowchart diagram illustrating the method of the multi-USIM based operation UE signaling a busy status to a second base station according to the second implementation of the "MSG1 Only" method in FIG. 8, in accordance with example implementations of the present disclosure.

In action 812 of FIG. 8, the UE may begin by determining if the UE is configured with two active SIM applications. If yes, the state diagram 810 may proceed to action 814. Otherwise, the state diagram 810 may return to the start.

In action 814, the UE may determine if the UE has been configured to send to the first gNB a busy indication while the UE is in RRC_CONNECTED state with the second gNB. If the UE determines that the UE has not been configured to send to the first gNB the busy indication while the UE is in RRC_CONNECTED state with the second gNB, the state diagram 810 may proceed to action 818.

In action 818, the UE may determine if the UE has been configured to send to the second gNB the busy indication while the UE is in RRC_CONNECTED state with the first gNB. If the UE has been configured to send to the second gNB the busy indication while the UE is in RRC_CONNECTED state with the first gNB, the state diagram 810 may proceed to action 820. If the UE has not been configured to send to the second gNB the busy indication while the UE is in RRC_CONNECTED state with the first gNB, the state diagram 810 may return to the start of procedure 2.0.

In action 820, the UE may determine if the UE is in RRC_CONNECTED state with the second gNB. If the UE is in RRC_CONNECTED state with the second gNB, the state diagram may proceed to procedure 2.2 (in state diagram 1010) in FIG. 10. If the UE is not in RRC_CONNECTED state with the second gNB, the state diagram 810 may return to the start of procedure 2.0.

Referring to FIG. 10, in action 1012, the UE may send information to the second gNB about the dual SIM capabilities of the UE and the SIMS associated PLMNs.

In action 1014, the UE may wait for the second gNB to send an n-Tuple that describes a MSG1 which is uniquely allocated to this UE. The n-Tuple is for generating and transmitting a MSG1 that indicates the UE may not answer page from the second gNB. The n-Tuple may include a set of specific values for n parameters. In one implementation, the n-Tuple may include four parameters (e.g., n=4): ra-PreambleIndex, ra-PRACH-MaskIndex, PRACH-ConfigIndex, and prach-FreqOffset. In another implementation, the n-Tuple may include less than four parameters (e.g., n=2 or n=3). In yet another implementation, the n-Tuple may include more than four parameters (e.g., n>4).

In action 1016, if the UE does not receive the n-Tuple from the second gNB, the UE may check again if the UE is in RRC_CONNECTED state with the second gNB. If the UE is in RRC_CONNECTED state with the second gNB, the method may return to action 1014. Otherwise, the UE may return to procedure 2.0 (in state diagram 810) in FIG. 8 via action 1032.

In action 1018, the UE may wait for RRC_CONNECTED state to terminate with the second gNB. If RRC_CONNECTED state is terminated with the second gNB, the UE may proceed to action 1020. Otherwise, the UE may wait until RRC_CONNECTED state to terminate with the second gNB.

In actions 1020 and 1022, the UE may wait until the next two conditions are TRUE: the UE is in RRC_INACTIVE state with the second gNB (e.g., action 1020), and the UE is about to attempt to establish an RRC connection with the first gNB (e.g., action 1022). If the above two conditions are TRUE, the UE may send to the second gNB a MSG1 in action 1024, to indicate that the UE may not answer pages from the second gNB. The MSG1 is generated and transported to the second gNB per values in the n-Tuple provided by the second gNB to the UE.

In action 1026, after the UE sends the MSG1 to the second gNB, the UE may wait to finish its attempt to establish the RRC connection with the first gNB.

In action 1028, the UE may wait until the first gNB exits RRC_CONNECTED state with the first gNB.

In action 1030, the UE may send to the second gNB a TAU message to indicate that it may again respond to paging messages from the second gNB. Any subsequent communications started by the UE that does not use the n-Tuple to generate the MSG1 may suffice in indicating that the UE may answer to pages. After sending the TAU message, the UE may again wait for the two conditions above to be TRUE by returning to action 1020. In action 1020, if the UE exits RRC_INACTIVE state with the second gNB while, for example, waiting for the other condition to be TRUE, the UE may return to procedure 2.0 (in state diagram 810) in FIG. 8 via action 1032.

FIG. 9 is similar to FIG. 10 with the differences that the UE in FIG. 10 sends the MSG1 to the second gNB when it receives an n-Tuple from the second gNB and the UE attempts to establish an RRC connection with the first gNB (e.g., when the UE knows that it will be busy with the first gNB), while the UE is in RRC_INACTIVE state with the second gNB.

FIGS. 14 and 15 further exemplify the second implementation of the "MSG1 Only" method.

FIG. 14 is a signaling sequence diagram for schematically illustrating a method of reporting a multi-USIM presence in a UE and capabilities of the multiple USIMs to a wireless communication network through an access registration procedure according to the second implementation of the "MSG1 Only" method, in accordance with example implementations of the present disclosure.

In the present implementation, actions 1410, 1412, 1414, 1416, 1418, 1420, 1422, 1424, 1426, 1428, 1430, 1432, 1434, and 1436 in diagram 1400A of FIG. 14 may be substantially similar to actions 1110, 1112, 1114, 1116, 1118, 1120, 1122, 1124, 1126, 1128, 1130, 1132, 1134, and 1136 in FIG. 11, respectively. Thus, the descriptions of actions 1410 through 1436 are omitted for brevity.

FIG. 15 is a continuation of the signaling sequence diagram in FIG. 14 and further illustrates the UE signaling a busy status to the second base station according to the second implementation of the "MSG1 Only" method, in accordance with example implementations of the present disclosure.

As shown in FIG. 15, in diagram 1400B, UE 1402 may signal to gNB-2 1405 that UE 1402 may not answer pages from gNB-2 1405, for example, through one or more actions 1440, 1442, 1444, 1446, 1448, 1450, 1452, 1454, 1456, 1458, 1460, 1462, 1464, 1466, 1468, 1470, 1472, and 1474. In one implementation, UE 1402 described in diagram 1400B may correspond to multi-USIM UE 102 in FIG. 1. It should be noted that, in diagram 1400B, although UE 1402 is shown to include two USIM based operations (SIM-1/USIM1 and SIM-2/USIM2 based operations), UE 1402 may include and support more than two USIM based operations.

In the present implementation, actions 1440, 1442, 1444, 1446, 1448, 1450, 1452, and 1454 in diagram 1400B of FIG. 15 may be substantially similar to actions 1140, 1142, 1144, 1146, 1148, 1150, 1152, and 1154 in FIG. 12, respectively. Thus, the descriptions of actions 1440 through 1454 are omitted for brevity.

In action 1456, gNB-2 1405 may detect USIM2 inactivity in UE 1402.

In action 1458, gNB-2 1405 may send a single message (RRCRelease message) including two messages (e.g., RRCReconfiguration and RRCConnectionSuspend) to reconfigure and release UE 1402. For example, UE 1402 may receive the n-Tuple from gNB-2 1405 and the command to enter into RRC_INACTIVE state with gNB-2 1405 (e.g., both the Preamble and suspend command are via RRCRelease message from gNB-2 1405).

In action 1460, UE 1402 may establish an RRC Connection between USIM1 of UE 1402 and gNB-1 1404.

In action 1462, AMF-2 1406 may send a paging request to gNB-2 1405.

In action 1464, gNB-2 1405 may send a paging request to USIM2 of UE 1402.

In action 1466, USIM2 of UE 1402 may send a MSG1 to gNB-2 1405 in response to the page that is generated and transmitted per variables of the n-Tuple received from gNB-2 1405.

In action 1468, gNB-2 1405 may send a message to AMF-2 1406 to indicate UE 1402 is busy and may not receive pages from gNB-2 1405.

In action 1470, RRC Connection between USIM1 of UE 1402 and gNB-1 1404 may end.

In action 1472, USIM2 of UE 1402 may send a TAU message to gNB-2 1405.

In action 1474, gNB-2 1405 may send a message to AMF-2 1406 to indicate UE 1402 is not busy and may receive pages from gNB-2 1405.

As described above, gNB-2 1405 may signal to UE 1402 the n-Tuple that contains a set of values that UE 1402 may use to generate and transmit a MSG1 to indicate to gNB-2 1405 that UE 1402 may not respond to pages from gNB-2 1405. gNB-2 1405 may send the n-Tuple as a new IE that is contained in an RRCRelease Message. The new IE that contains the n-Tuple may for example be call RACH-ConfigDedicatedBusy, and may have the structure as shown in FIG. 16. Thus, for example if gNB-2 1405 were to assign to the IE RACH-ConfigDedicatedBusy the values of [63, 15, 63, 94] (e.g., the n-Tuple) and the values are mapped to ra-PreambleIndex, ra-PRACH-MaskIndex, prach-ConfigIndex, prach-FreqOffset respectively, and gNB-2 1405 sends that IE to UE 1402, and gNB-2 1405 has not assigned that same value set of values to any other UE that is in RRC_INACTIVE state with gNB-2 1405, and gNB-2 1405 subsequently receives a MSG1 that is generated and transmitted using the values of the IE sent to UE 1402, gNB-2 1405 may know exactly UE 1402 that sent the MSG1. If it is pre-arranged between UE 1402 and gNB-2 1405 that when such a MSG1 is generated and transmitted by UE 1402 (e.g., using the values of the n-Tuple) and received by gNB-2 1405, gNB-2 1405 may be made aware that UE 1402 may not respond to paging messages from gNB-2 1405 until some further notice from UE 1402 (e.g., a TAU from UE 1402) or a timer expires.

In FIGS. 17-30, various implementations are provided to illustrate a "MSG1 and MSG3" method, by which a UE signals to a gNB that the UE may not respond to paging messages until further notice from the UE (or timer expire), and that the gNB may know exactly which UE sent the signal, while the UE remains in RRC_INACTIVE state, by receiving from the UE a PRACH MSG1 that the UE generated from a specific assigned RACH Preamble, and an associated RRC message (e.g., RACH MSG3).

In general, a UE may inform a gNB of its state, or state transition, via RRC_CONNECTED mode/state signaling. However, as noted above, it may be desirable that the UE signal to the gNB its new state without having to enter into RRC_CONNECTED mode/state.

To begin the steps towards RRC_CONNECTED state while in RRC_IDLE or RRC_INACTIVE state, the UE may use the RACH procedure to signal to the gNB.

When a non-contention based RACH procedure is attempted (e.g., during handover) by the UE, the parameters used to generate and transmit the MSG1 are all deterministic as all the values associated with the parameters are selected by the gNB and sent to the UE to use via a RACHConfigDedicated message, and thus when the gNB receives that MSG1 generated and transmitted by deterministic values, the gNB may know the identity of the UE that transmitted the MSG1.

When a contention based RACH procedure is attempted (e.g., initial access from RRC_IDLE state), the parameters used to generate and transmit the MSG1 are non-deterministic as the gNB only identifies a range of values associated with the parameters that are sent to the UE via RACH- ConfigCommon messages, and the UE makes a random selection from that range of values, and thus when the gNB receives that MSG1 generated and transmitted by non-deterministic values, the gNB may not know the identity of the UE that transmitted it.

By allowing the gNB to provide to the UE a deterministic parameter (e.g., 1 of the 64 possible RACH Preamble) as found in the RACHConfigDedicated message, the gNB may reserve the unique value that creates a deterministic MSG1, and as such that unique value may be assigned a specific meaning by the gNB. When the UE generates a MSG1 using that deterministic parameter, the UE may communicate to the gNB a specific state at the UE, if the UE and the gNB have previously agreed upon the association of "UE State" and the "specific meaning" of the unique value that creates a deterministic MSG1. However, the gNB may not know the exact identity of the UE that sent the MSG1, and thus the UE may also need to send another message (e.g., an RRC message). Thus, with the combination of MSG1 generated via a unique parameter (e.g., 1 of the 64 possible RACH Preamble) and an RRC message (to uniquely identify at the UE sending the MSG1 and RRC message, the UE may communicate its specific state to the gNB and the gNB may uniquely identify the UE. In one implementation, the RRC message may include RACH MSG3, which carries the temporary C-RNTI assigned in the previous MSG2 to associate it with the previous MSG1 received from the gNB, and the TMSI, to uniquely identify the UE.

The relationship between a UE and the deterministic value that the gNB has assigned to it to generate a MSG1 are only valid while the UE is in RRC_INACTIVE state, as it is not necessary in RRC_CONNECTED state, nor in RRC_IDLE state as there is no context maintained between the UE and the gNB. FIGS. 17-24 illustrate two implementations by which a UE may determine to send a MSG1 (generated using a specific assigned RACH Preamble variable) to the gNB to indicate that the UE is busy, and an associated RRC message to uniquely identify the UE to the gNB.

Figure 25:
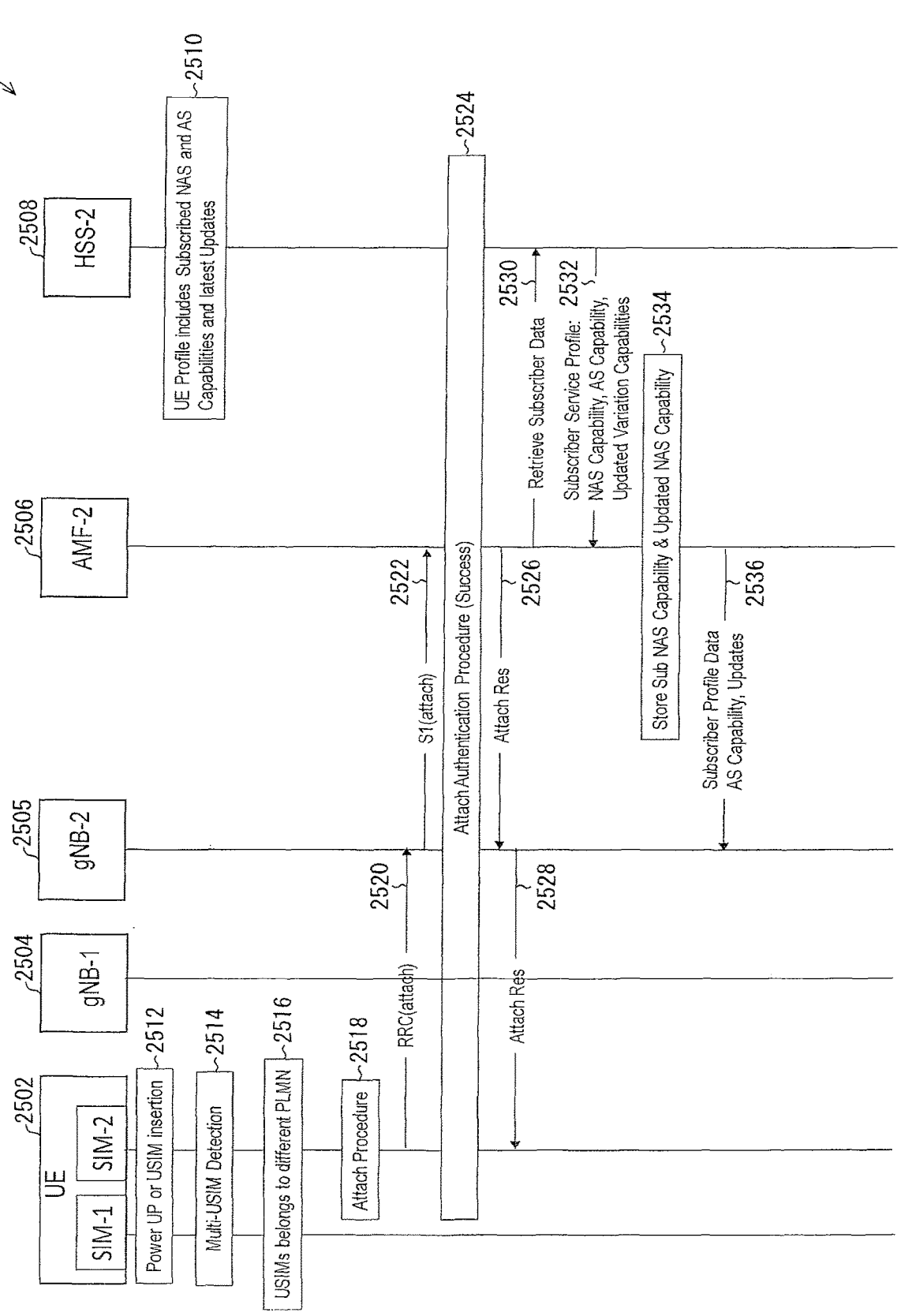
FIG. 25 is a signaling sequence diagram for schematically illustrating a method of reporting a multi-USIM presence in a UE and capabilities of the multiple USIMs to a wireless communication network through an access registration procedure according to the first implementation of the "MSG1 and MSG3" method, in accordance with example implementations of the present disclosure.
Figure 26:
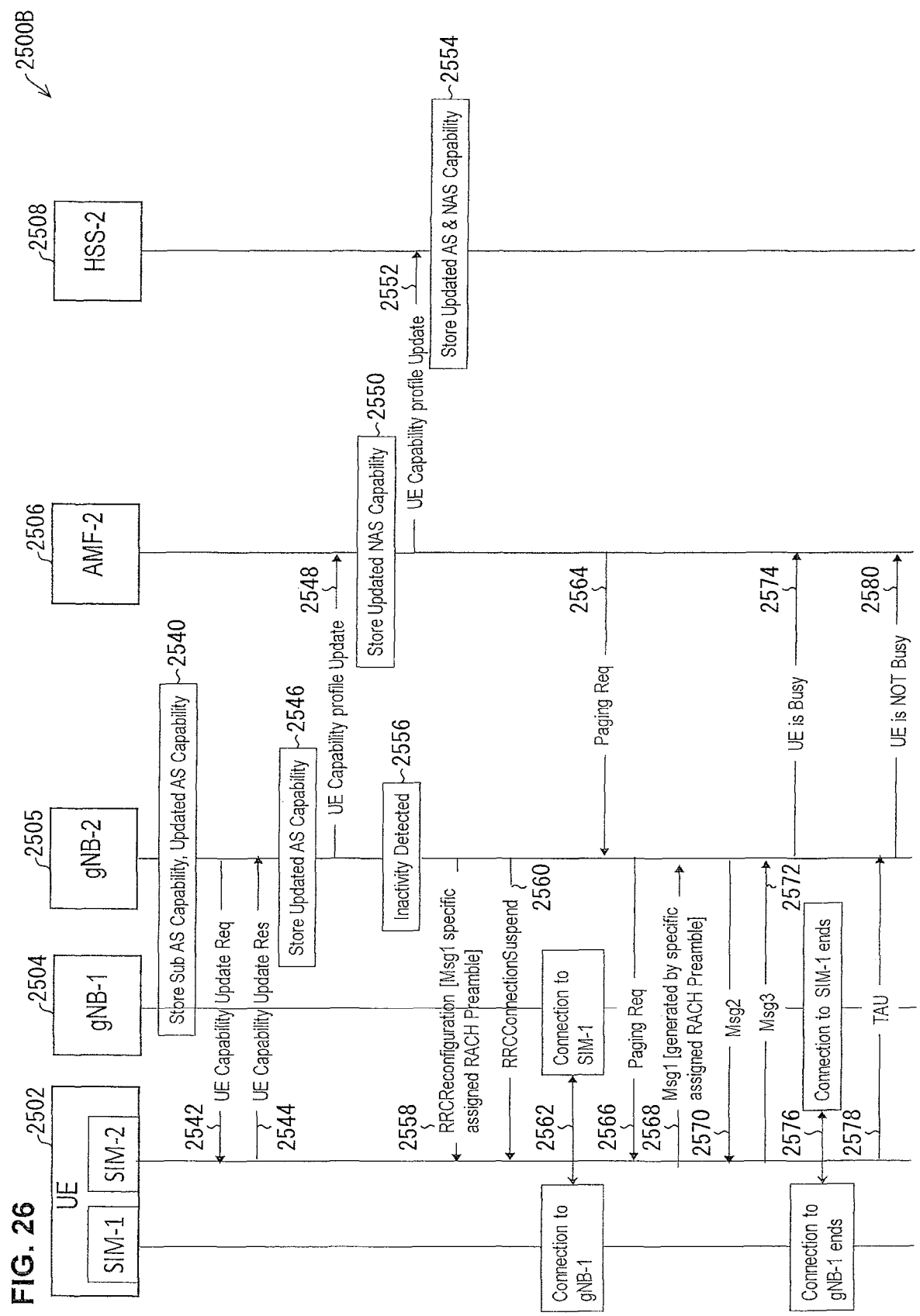
FIG. 26 is a continuation of the signaling sequence diagram in FIG. 25 and further illustrates the UE signaling a busy status to the second base station according to the first implementation of the "MSG1 and MSG3" method, in accordance with example implementations of the present disclosure.

As shown in FIGS. 17-21, the UE may signal to a gNB that the UE may not respond to paging messages until further notice or time-out, for example, through the following procedures: procedure 1.0 (in state diagram 1710 in FIG. 17) in one or more actions 1712, 1714, 1716, 1718, and 1720, procedure 1.2 (in state diagram 1810 in FIG. 18) in one or more actions 1812, 1814, 1816, 1818, 1820, 1822, 1824, 1826, 1828, 1830, 1832, and 1834, procedure 1.3 (in state diagram 1910 in FIG. 19) in one or more actions 1912, 1914, 1916, 1918, 1920, 1922, 1924, 1926, 1928, 1930, 1932, and 1934, procedure 1.4 (in state diagram 2010 in FIG. 20) in one or more actions 2012, 2014, 2016, 2018, 2020, 2022, 2024, 2026, 2028, 2030, and 2032, and procedure 1.5 (in state diagram 2110 in FIG. 21) in one or more actions 2112, 2114, 2116, 2118, 2120, 2122, 2124, 2126, 2128, 2130, and 2132. In one implementation, the UE described in FIGS. 17-21 may correspond to the multi-USIM UEs in FIGS. 25 and 26. Although the UEs in FIGS. 25 and 26 are each shown to include two USIM based operations (e.g., SIM-1 and SIM-2), it should be understood that they may each include and support more than two USIM based operations.

FIGS. 17-21 and 25-27 illustrate a first implementation of the "MSG1 and MSG3" method. Although various implementations described herein with reference to FIGS. 17-21 and 25-27 refer to an RRC message as a MSG3, it should be understood that MSG3 is merely a non-limiting example of an RRC message that can be used together with MSG1 to signal the UE's busy status.

Figure 17:
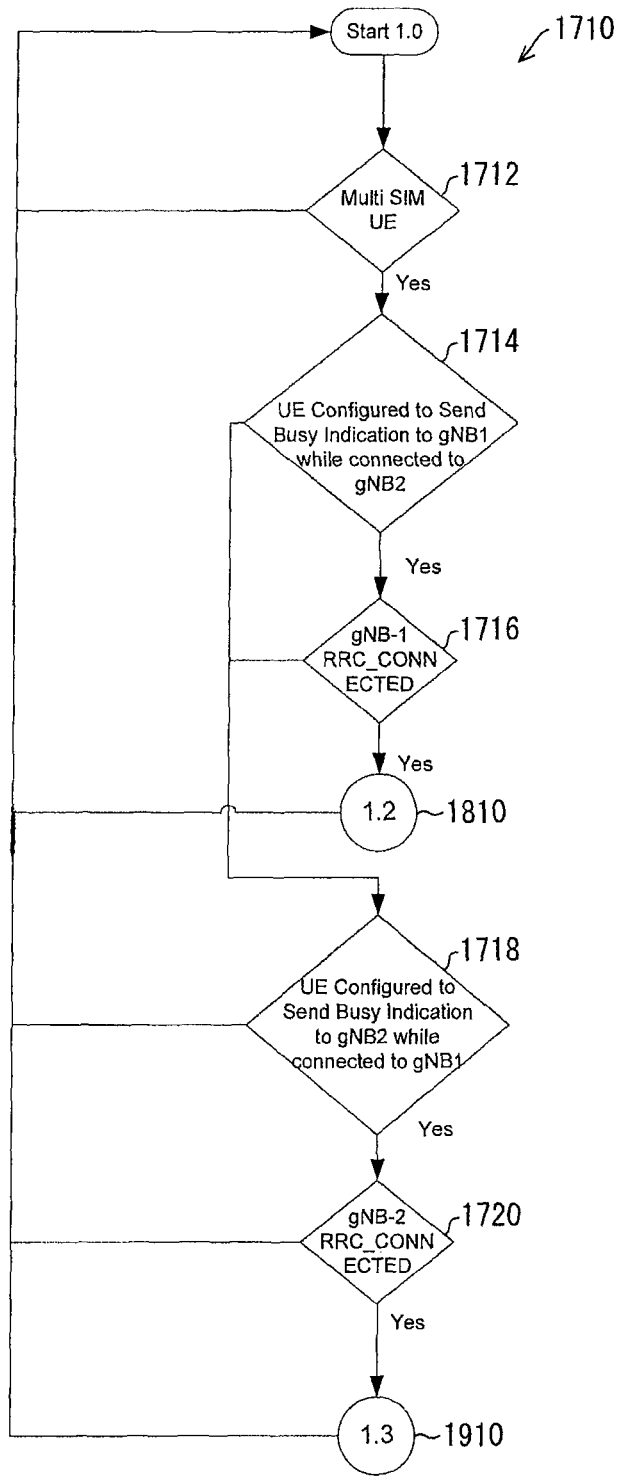
FIG. 17 is a flowchart diagram illustrating a method of a multi-USIM based operation UE signaling a busy status to base stations according to a first implementation of a "MSG1 and MSG3" method, in accordance with example implementations of the present disclosure.
Figure 18:
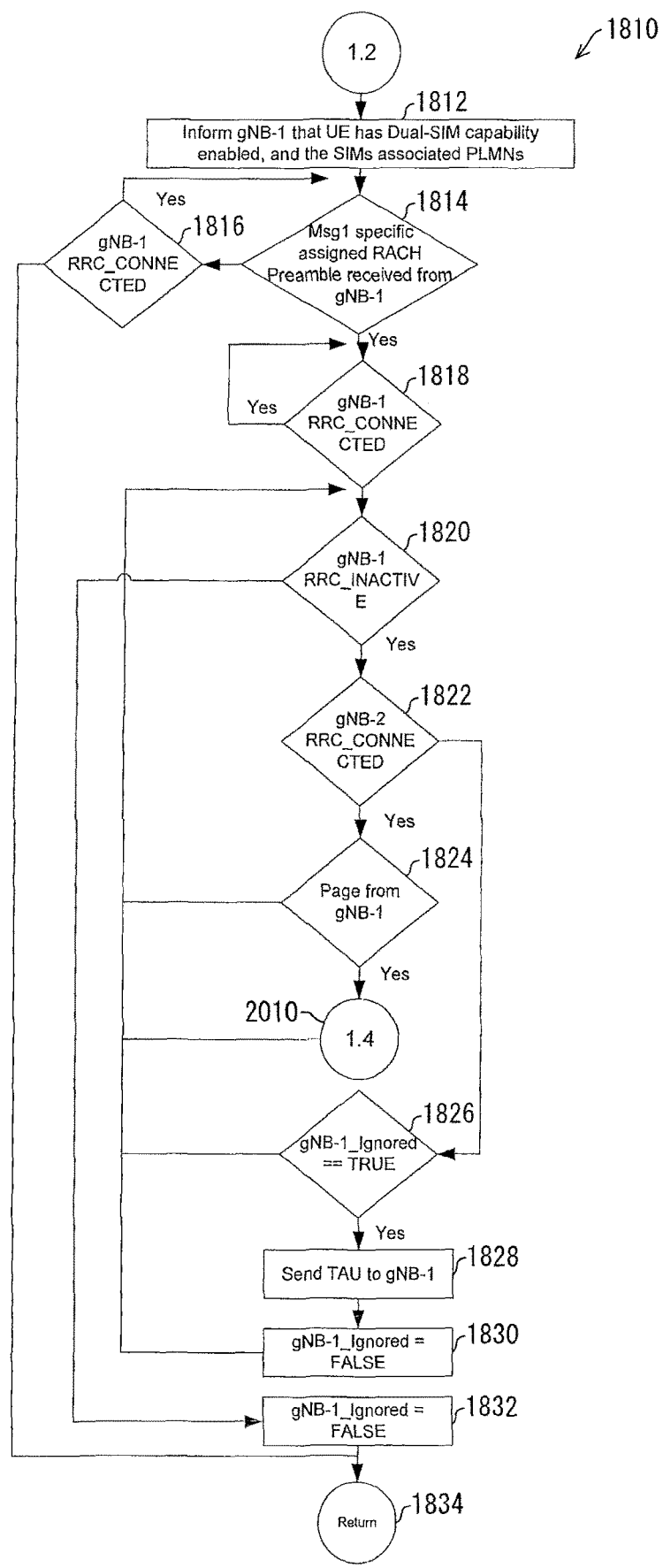
FIG. 18 is a flowchart diagram illustrating the method of the multi-USIM based operation UE signaling a busy status to a first base station according to the first implementation of the "MSG1 and MSG3" method in FIG. 17, in accordance with example implementations of the present disclosure.
Figure 20:
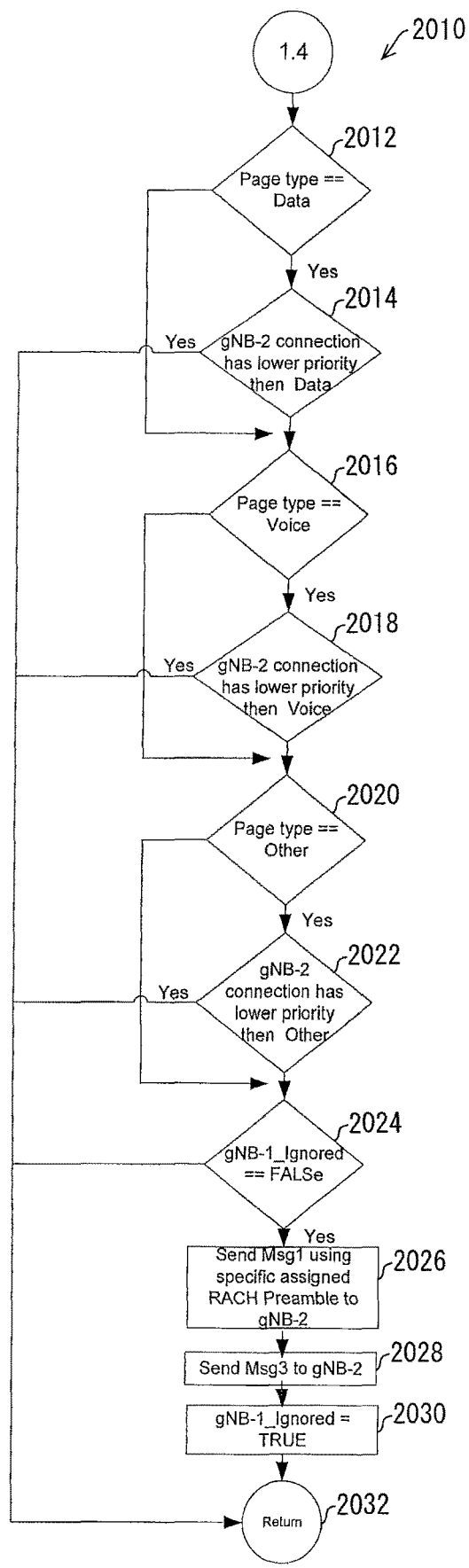
FIG. 20 is a flowchart diagram illustrating the method of the multi-USIM based operation UE signaling the busy status to the first base station according to the first implementation of the "MSG1 and MSG3" method in FIG. 18, in accordance with example implementations of the present disclosure.

FIGS. 17, 18, and 20 illustrate a multi-USIM based operation UE signaling a busy status to a first gNB while connected to a second gNB.

FIG. 17 is a flowchart diagram illustrating a method of a multi-USIM based operation UE signaling a busy status to base stations according to a first implementation of a "MSG1 and MSG3" method, in accordance with example implementations of the present disclosure.

FIG. 18 is a flowchart diagram illustrating the method of the multi-USIM based operation UE signaling a busy status to a first base station according to the first implementation of the "MSG1 and MSG3" method in FIG. 17, in accordance with example implementations of the present disclosure.

FIG. 20 is a flowchart diagram illustrating the method of the multi-USIM based operation UE signaling the busy status to the first base station according to the first implementation of the "MSG1 and MSG3" method in FIG. 18, in accordance with example implementations of the present disclosure.

In the present implementation, actions 1712, 1714, 1716, 1718, and 1720 in FIG. 17 may be substantially similar to actions 312, 314, 316, 318, and 320 in FIG. 3, respectively. Thus, the descriptions of actions 1712 through 1720 are omitted for brevity.

In the present implementation, actions 1812, 1816, 1818, 1820, 1822, 1824, 1826, 1828, 1830, 1832, and 1834 in FIG. 18 may be substantially similar to actions 412, 416, 418, 420, 422, 424, 426, 428, 430, 432, and 434 in FIG. 4, respectively. Thus, the descriptions of actions 1812, and 1816 through 1834 are omitted for brevity.

Action 1814 differs from action 414 of FIG. 4 in that the UE may wait for the first gNB to send a specific assigned RACH Preamble that describes a MSG1 that is uniquely assigned to a UE state (action 1814) instead of waiting for MSG1 using an n-Tuple (action 414).

In the present implementation, actions 2012, 2014, 2016, 2018, 2020, 2022, 2024, 2030, and 2032 in FIG. 20 may be substantially similar to actions 612, 614, 616, 618, 620, 622, 624, 628, and 630 in FIG. 6, respectively. Thus, the descriptions of actions 2012 through 2024, 2030, and 2032 are omitted for brevity.

Actions 2026 and 2028 differ from action 626 of FIG. 6 in that the UE in action 2026 and 2028 may send a MSG1 that is generated per the specific assigned RACH Preamble provided by the first gNB (action 2026) and a MSG3 (action 2028) to the UE instead of an n-Tuple (action 626).

Figure 19:
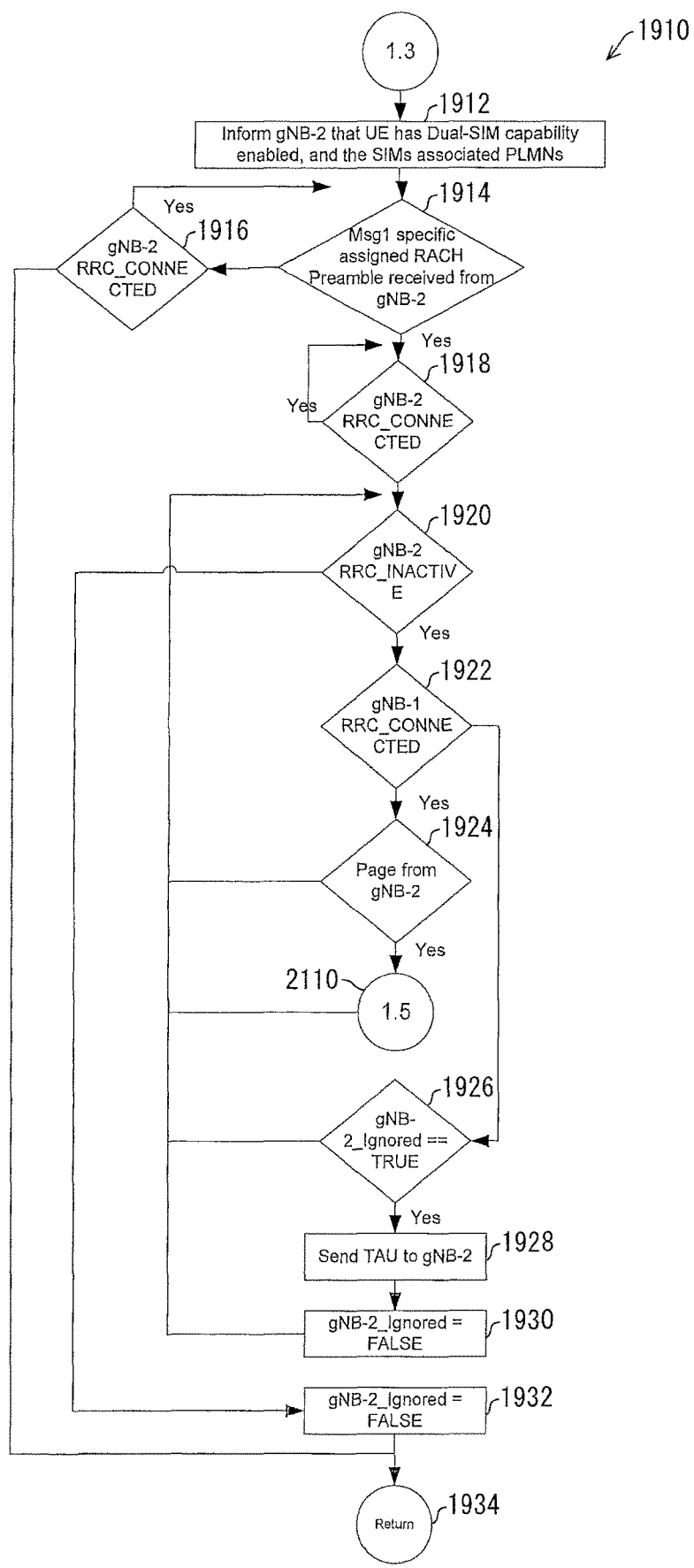
FIG. 19 is a flowchart diagram illustrating the method of the multi-USIM based operation UE signaling a busy status to a second base station according to the first implementation of the "MSG1 and MSG3" method in FIG. 17, in accordance with example implementations of the present disclosure.
Figure 21:
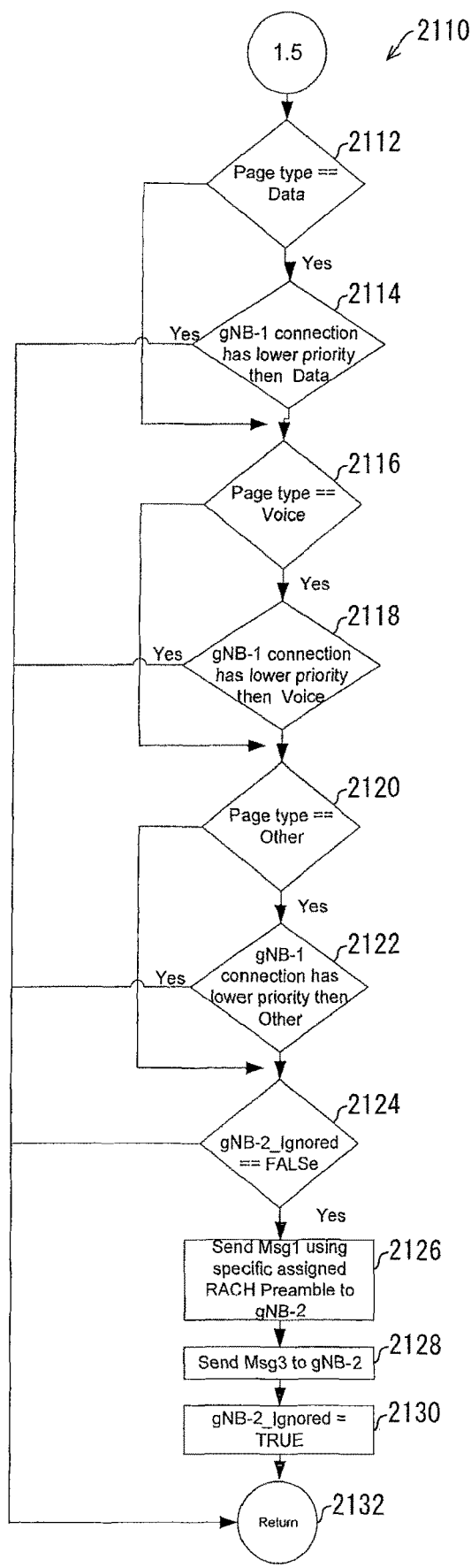
FIG. 21 is a flowchart diagram illustrating the method of the multi-USIM based operation UE signaling the busy status to the second base station according to the first implementation of the "MSG1 and MSG3" method in FIG. 19, in accordance with example implementations of the present disclosure.

FIGS. 17, 19, and 21 illustrate the multi-USIM based operation UE signaling a busy status to the second gNB while connected to the first gNB.

FIG. 19 is a flowchart diagram illustrating the method of the multi-USIM based operation UE signaling a busy status to a second base station according to the first implementation of the "MSG1 and MSG3" method in FIG. 17, in accordance with example implementations of the present disclosure.

FIG. 21 is a flowchart diagram illustrating the method of the multi-USIM based operation UE signaling the busy status to the second base station according to the first implementation of the "MSG1 and MSG3" method in FIG. 19, in accordance with example implementations of the present disclosure.

In the present implementation, actions 1912, 1916, 1918, 1920, 1922, 1924, 1926, 1928, 1930, 1932, and 1934 in FIG. 19 may be substantially similar to actions 512, 516, 518,

520, 522, 524, 526, 528, 530, 532, and 534 in FIG. 5, respectively. Thus, the descriptions of actions 1912, and 1916 through 1934 are omitted for brevity.

Action 1914 differs from action 514 of FIG. 5 in that the UE in action 1914 may wait for the second gNB to send a specific assigned RACH Preamble that describes a MSG1 that is uniquely assigned to a UE state (action 1914) instead of waiting for MSG1 using an n-Tuple (action 514).

In the present implementation, actions 2112, 2114, 2116, 2118, 2120, 2122, 2124, 2130, and 2132 in FIG. 21 may be substantially similar to actions 712, 714, 716, 718, 720, 722, 724, 728, and 730 in FIG. 7, respectively. Thus, the descriptions of actions 2112 through 2124, and 2128 through 2132 are omitted for brevity.

Actions 2126 and 2128 differ from action 726 of FIG. 7 in that the UE in action 2126 and 2128 may send a MSG1 that is generated per specific assigned RACH Preamble provided by the second gNB (action 2126) and a MSG3 (action 2128) to the UE instead of an n-Tuple (action 726).

FIGS. 19 and 21 are respectively similar to FIGS. 18 and 20 with the differences that the UE in FIGS. 19 and 21 may send the MSG1 and MSG3 to the second gNB when it receives a specific assigned RACH Preamble from the second gNB, and may receive a page from the second gNB while in RRC_CONNECTED state with the first gNB when the UE is in RRC_INACTIVE state with the second gNB.

FIGS. 25 and 26 further exemplify the first implementation of the "MSG1 and MSG3" method.

FIG. 25 is a signaling sequence diagram for schematically illustrating a method of reporting a multi-USIM presence in a UE and capabilities of the multiple USIMs to a wireless communication network through an access registration procedure according to the first implementation of the "MSG1 and MSG3" method, in accordance with example implementations of the present disclosure.

FIG. 26 is a continuation of the signaling sequence diagram in FIG. 25 and further illustrates the UE signaling a busy status to the second base station according to the first implementation of the "MSG1 and MSG3" method, in accordance with example implementations of the present disclosure.

In the present implementation, actions 2510, 2512, 2514, 2516, 2518, 2520, 2522, 2524, 2526, 2528, 2530, 2532, 2534, and 2536 in diagram 2500A of FIG. 25 may be substantially similar to actions 1110, 1112, 1114, 1116, 1118, 1120, 1122, 1124, 1126, 1128, 1130, 1132, 1134, and 1136 in diagram 1100A of FIG. 11, respectively. Thus, the descriptions of actions 2510 through 2536 are omitted for brevity.

In the present implementation, actions 2540, 2542, 2544, 2546, 2548, 2550, 2552, 2554, 2556, 2560, 2562, 2564, 2566, 2574, 2576, 2578, and 2580 in diagram 2500B of FIG. 26 may be substantially similar to actions 1140, 1142, 1144, 1146, 1148, 1150, 1152, 1154, 1156, 1160, 1162, 1164, 1166, 1170, 1172, 1174, and 1176 in diagram 1100B of FIG. 12, respectively. Thus, the descriptions of actions 2540 through 2556, 2560 through 2566, and 2574 through 2580 are omitted for brevity.

Action 2558 differs from action 1158 of FIG. 12 in that gNB-2 2505 in action 2558 may send MSG1 using specific assigned RACH Preamble (via RRCReconfiguration message from gNB-2 2505) to USIM2 of UE 2502. Actions 2568, 2570, 2572 differ from action 1168 of FIG. 12 in that USIM2 of UE 2502 may send a MSG1 to gNB-2 2505 in response to the page that is generated and transmitted per variables of the specific assigned RACH Preamble received from gNB-2 2505 (action 2568), gNB-2 2505 may send a Msg2 to USIM2 of UE 2502 (action 2570), and USIM2 of UE 2502 may send a MSG3 to gNB-2 2505 (action 2572).

In FIGS. 25 and 26, for example, one of the two gNBs (e.g., gNB-2 2505) may signal to UE 2502 a specific assigned RACH Preamble that UE 2502 may use to generate and transmit a MSG1 to indicate to gNB-2 2505 that UE 2502 may not respond to pages from gNB-2 2505. gNB-2 2505 may send that specific assigned RACH Preamble as a new IE that is contained in an RRCConnectionReconfigruation message. The new IE that contains the specific assigned RACH Preamble may, for example, be call RACH-ConfigDedicatedBusy, and may have the structure as shown in FIG. 27. Thus, for example if gNB-2 2505 were to assign to the IE RACH-ConfigDedicatedBusy the values of [63] (e.g., the specific assigned RACH Preamble), and the gNB-2 2505 sends that IE to UE 2502, (alternately the gNB-2 2505 could send this IE as part of a broadcast SIBx) and the gNB-2 2505 has reserved this specific PRACH Preamble for a specific meaning, and the gNB-2 2505 subsequently receives a MSG1 that is generated using the value of the IE sent to UE 2502, the gNB-2 2505 may know exactly the state of UE 2502 that sent the MSG1, and by receiving a subsequent related MSG3 from UE 2502, the gNB-2 2505 may know exact identify of UE 2502 that sent the MSG1. If it is pre-arranged between UE 2502 and the gNB-2 2505 that when such a MSG1 is generated and transmitted by UE 2502 (e.g., using the specific assigned RACH Preamble) and received by the gNB-2 2505, the gNB-2 2505 may be made aware that UE 2502 may not respond to paging messages from gNB-2 2505 until some further notice from UE 2502 (e.g., a TAU from UE 2502) or a timer expires.

FIGS. 22-24 and 28-30 illustrate a second implementation of the "MSG1 and MSG3" method. Although various implementations described herein with reference to FIGS. 22-24 and 28-30 refer to an RRC message as a MSG3, it should be understood that MSG3 is merely a non-limiting example of an RRC message that can be used together with MSG1 to signal the UE's busy status.

Figure 22:
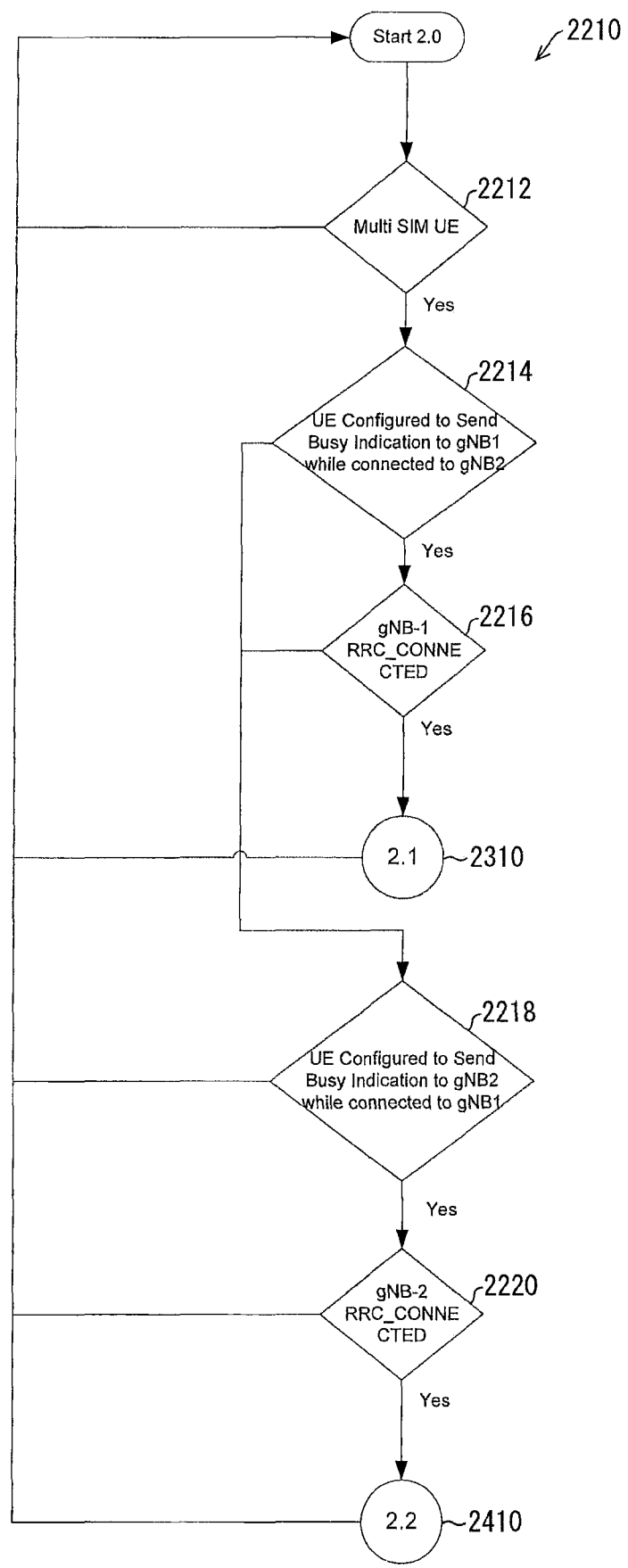
FIG. 22 is a flowchart diagram illustrating a method of a multi-USIM based operation UE signaling a busy status to base stations according to a second implementation of the "MSG1 and MSG3" method, in accordance with example implementations of the present disclosure.
Figure 23:
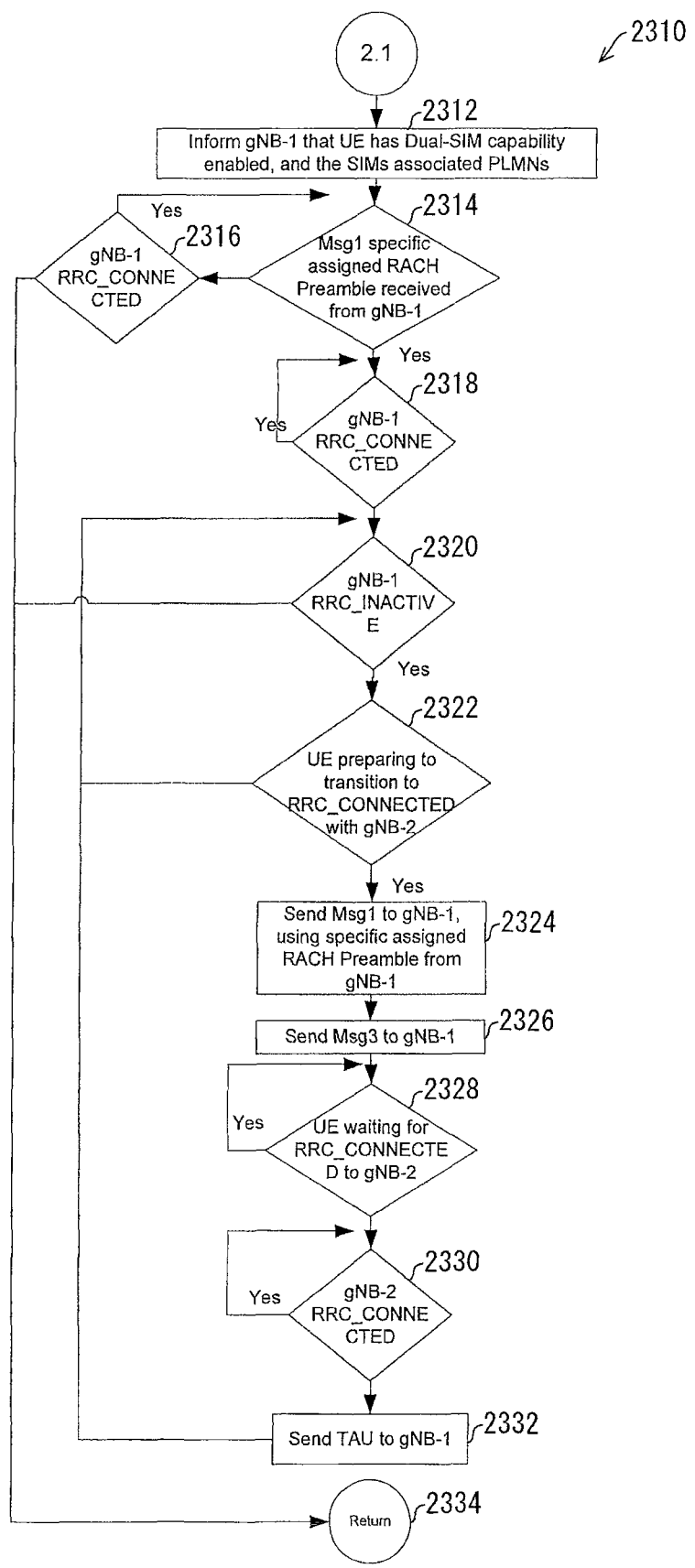
FIG. 23 is a flowchart diagram illustrating the method of the multi-USIM based operation UE signaling a busy status to a first base station according to the second implementation of the "MSG1 and MSG3" method in FIG. 22, in accordance with example implementations of the present disclosure.
Figure 24:
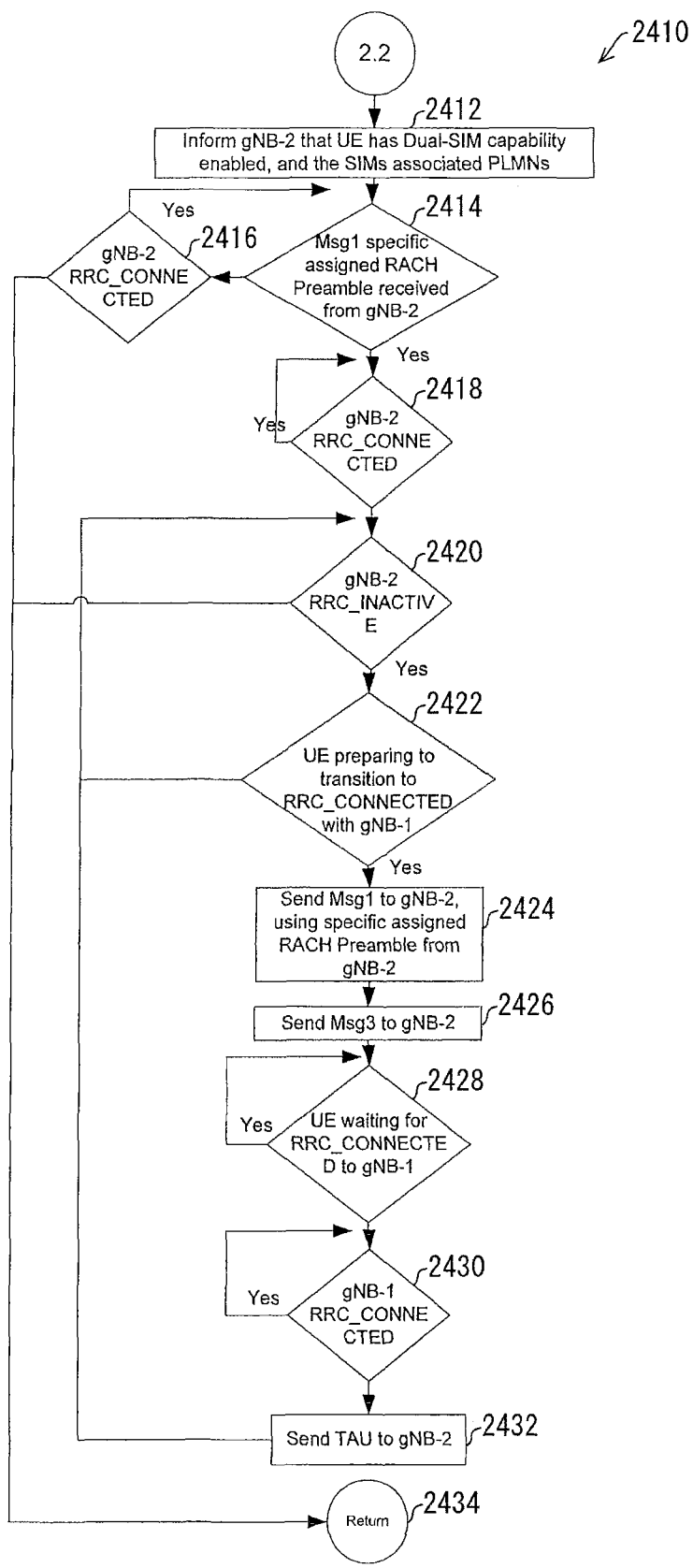
FIG. 24 is a flowchart diagram illustrating the method of a multi-USIM based operation UE signaling a busy status to a second base station according to the second implementation of the "MSG1 and MSG3" method in FIG. 22, in accordance with example implementations of the present disclosure.
Figure 28:
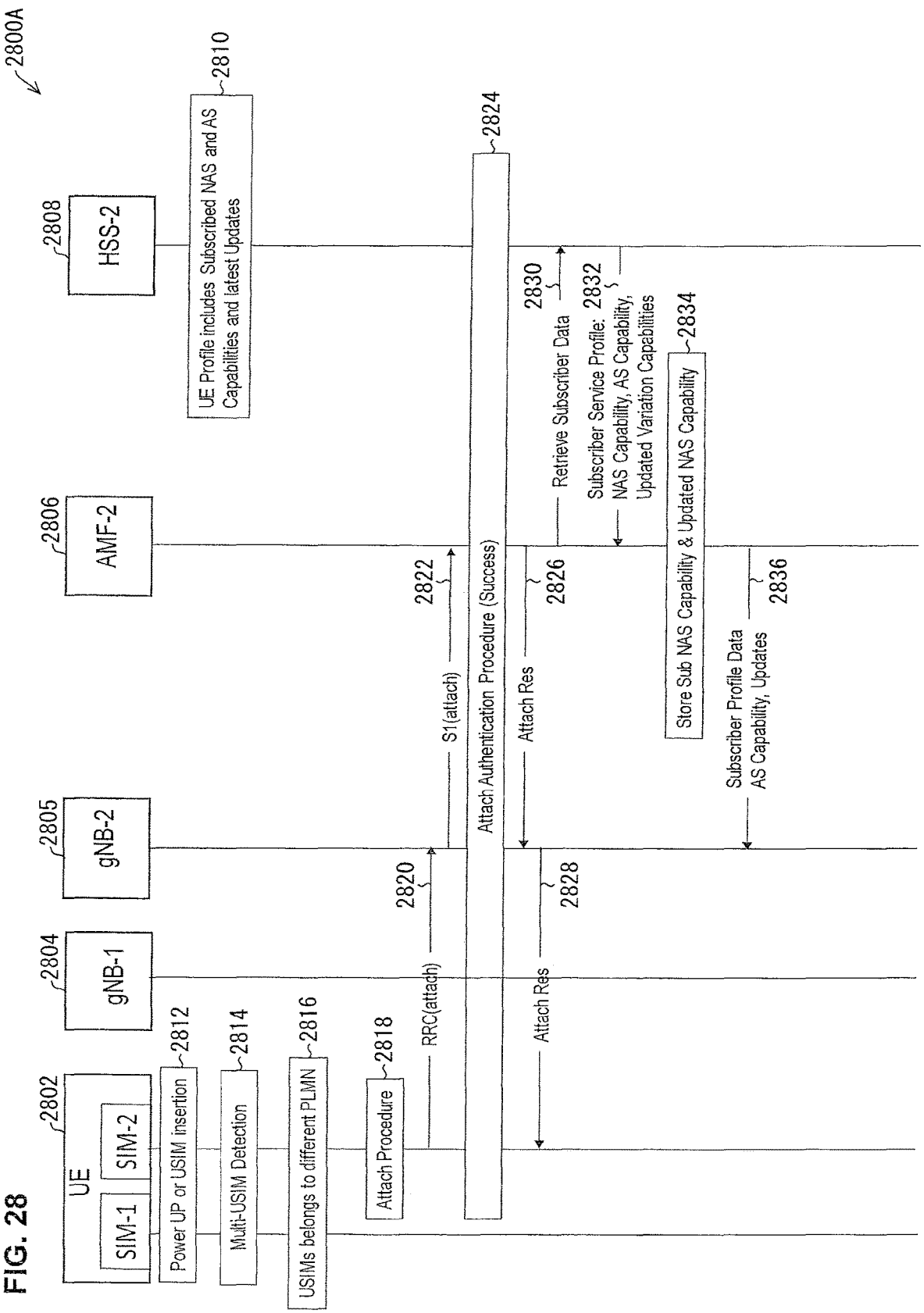
FIG. 28 is a signaling sequence diagram for schematically illustrating a method of reporting a multi-USIM presence in a UE and capabilities of the multiple USIMs to a wireless communication network through an access registration procedure according to the second implementation of the "MSG1 and MSG3" method, in accordance with example implementations of the present disclosure.
Figure 29:
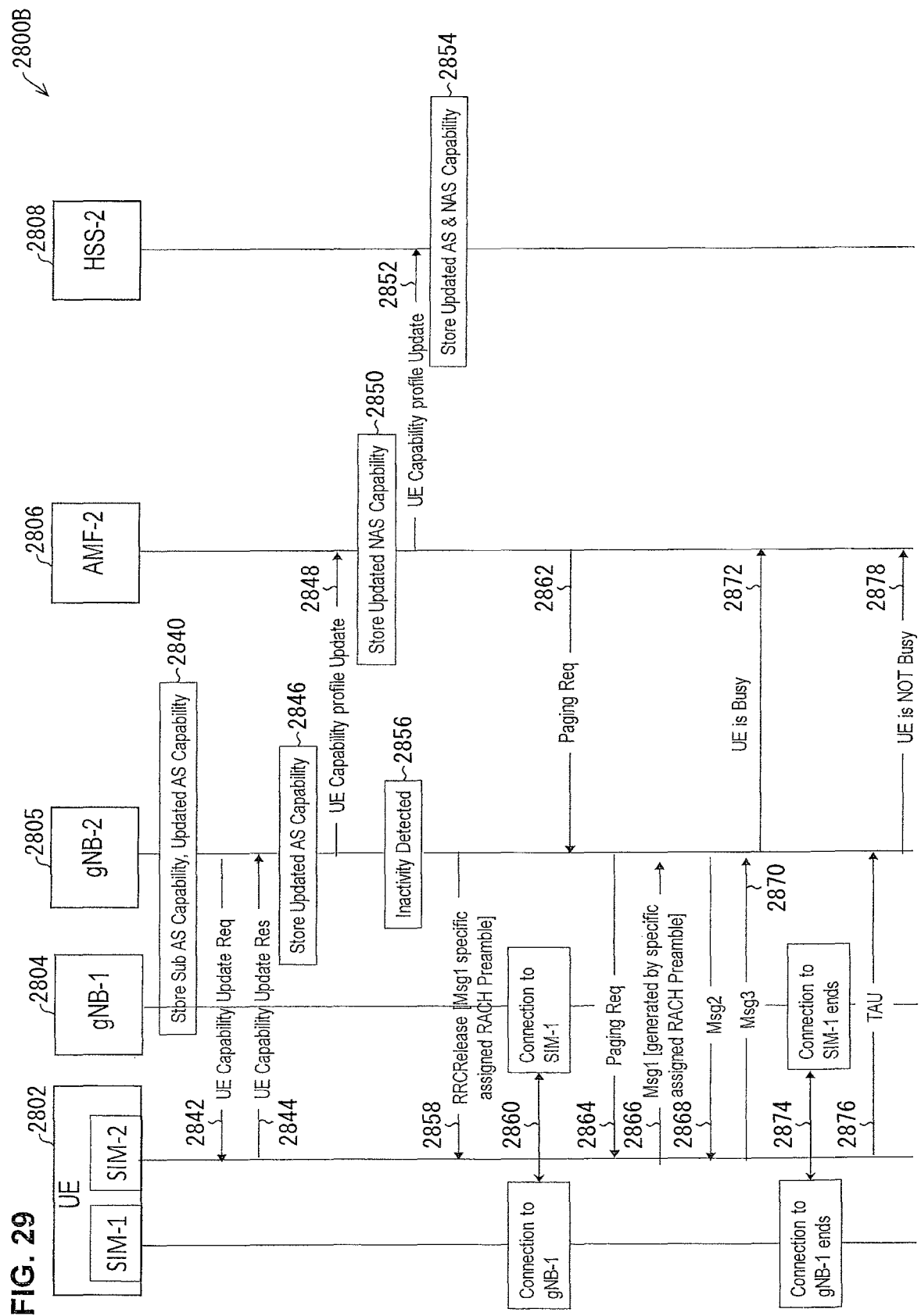
FIG. 29 is a continuation of the signaling sequence diagram in FIG. 28 and further illustrates the UE signaling a busy status to the second base station according to the second implementation of the "MSG1 and MSG3" method, in accordance with example implementations of the present disclosure.

As shown in FIGS. 22-24, the UE may signal to a gNB that the UE may not respond to paging messages until further notice or time-out, for example, through the following procedures: procedure 2.0 (in state diagram 2210 in FIG. 22) in one or more actions 2212, 2214, 2216, 2218, and 2220, procedure 2.1 (in state diagram 2310 in FIG. 23) in one or more actions 2312, 2314, 2316, 2318, 2320, 2322, 2324, 2326, 2328, 2330, 2332, and 2334, and procedure 2.2 (in state diagram 2410 in FIG. 24) in one or more actions 2412, 2414, 2416, 2418, 2420, 2422, 2424, 2426, 2428, 2430, 2432, and 2434. In one implementation, the UE described in FIGS. 22-24 may correspond to the multi-USIM UEs in FIGS. 28 and 29. Although the UEs in FIGS. 28 and 29 are each shown to include two USIM based operations (e.g., SIM-1 and SIM-2), it should be understood that they may each include and support more than two USIM based operations.

FIGS. 22 and 23 illustrate a multi-USIM based operation UE signaling a busy status to a first gNB while connected to a second gNB.

FIG. 22 is a flowchart diagram illustrating a method of a multi-USIM based operation UE signaling a busy status to base stations according to a second implementation of the "MSG1 and MSG3" method, in accordance with example implementations of the present disclosure.

FIG. 23 is a flowchart diagram illustrating the method of the multi-USIM based operation UE signaling a busy status to a first base station according to the second implementation of the "MSG1 and MSG3" method in FIG. 22, in accordance with example implementations of the present disclosure.

In the present implementation, actions 2212, 2214, 2216, 2218, and 2220 in FIG. 22 may be substantially similar to actions 812, 814, 816, 818, and 820 in FIG. 8, respectively. Thus, the descriptions of actions 2212 through 2220 are omitted for brevity.

In the present implementation, actions 2310, 2312, 2316, 2318, 2320, 2322, 2328, 2330, 2332, and 2334 in FIG. 23 may be substantially similar to actions 912, 916, 918, 920, 922, 926, 928, 930, and 932 in FIG. 9, respectively. Thus, the descriptions of actions 2310, 2312, 2316 through 2322, and 2328 through 2334 are omitted for brevity.

Action 2314 differs from action 914 of FIG. 9 in that the UE in 2314 may wait for the first gNB to send a specific assigned RACH Preamble that describes a MSG1 that is uniquely assigned to a UE state instead of waiting for MSG1 using an n-Tuple. Actions 2324 and 2326 differ from action 924 of FIG. 9 in that the UE may send to the first gNB a MSG1 using specific assigned RACH Preamble and a MSG3 instead of sending a MSG1 using n-Tuple to indicate that the UE may not answer pages from the first gNB if the UE is in RRC_INACTIVE state with the first gNB and the UE is about to attempt to establish an RRC connection with the second gNB.

FIGS. 22 and 24 illustrate a multi-USIM based operation UE signaling a busy status to the second gNB while connected to the first gNB.

FIG. 24 is a flowchart diagram illustrating the method of a multi-USIM based operation UE signaling a busy status to a second base station according to the second implementation of the "MSG1 and MSG3" method in FIG. 22, in accordance with example implementations of the present disclosure.

In the present implementation, actions 2410, 2412, 2416, 2418, 2420, 2422, 2428, 2430, 2432, and 2434 in FIG. 24 may be substantially similar to actions 1012, 1016, 1018, 1020, 1022, 1026, 1028, 1030, and 1032 in FIG. 10, respectively. Thus, the descriptions of actions 2410, 2412, 2416 through 2422, and 2428 through 2434 are omitted for brevity.

Action 2414 differs from action 1014 of FIG. 10 in that the UE in 2414 may wait for the second gNB to send a specific assigned RACH Preamble that describes a MSG1 which is uniquely assigned to a UE state instead of waiting for MSG1 using an n-Tuple. Actions 2424, 2426 differ from action 1024 of FIG. 10 in that the UE in actions 2424, 2426 may send to the second gNB a MSG1 using specific assigned RACH Preamble (actions 2424) and a MSG3 (actions 2426) instead of sending a MSG1 using n-tuple to indicate that the UE may not answer pages from the second gNB if the UE is in RRC_INACTIVE state with the second gNB and the UE is about to attempt to establish an RRC connection with the first gNB.

FIGS. 28 and 29 further exemplify the second implementation of the "MSG1 and MSG3" method.

FIG. 28 is a signaling sequence diagram for schematically illustrating a method of reporting a multi-USIM presence in a UE and capabilities of the multiple USIMs to a wireless communication network through an access registration procedure according to the second implementation of the "MSG1 and MSG3" method, in accordance with example implementations of the present disclosure. In the present implementation, actions 2810, 2812, 2814, 2816, 2818, 2820, 2822, 2824, 2826, 2828, 2830, 2832, 2834, and 2836 in diagram 2800A of FIG. 28 may be substantially similar to actions 1410, 1412, 1414, 1416, 1418, 1420, 1422, 1424, 1426, 1428, 1430, 1432, 1434, and 1436 in diagram 1400A of FIG. 14, respectively. Thus, the descriptions of actions 2810 through 2836 are omitted for brevity.

FIG. 29 is a continuation of the signaling sequence diagram in FIG. 28 and further illustrates the UE signaling a busy status to the second base station according to the second implementation of the "MSG1 and MSG3" method, in accordance with example implementations of the present disclosure. In the present implementation, actions 2840, 2842, 2844, 2846, 2848, 2850, 2852, 2854, 2856, 2860, 2862, 2864, 2872, 2874, 2876, and 2878 in diagram 2800B of FIG. 29 may be substantially similar to actions 1440, 1442, 1444, 1446, 1448, 1450, 1452, 1454, 1456, 1460, 1462, 1464, 1468, 1470, 1472, and 1474 in FIG. 15, respectively. Thus, the descriptions of actions 2840 through 2856, 2860 through 2864, and 2872 through 2878 are omitted for brevity.

Action 2858 differs from action 1458 of FIG. 15 in that gNB-2 2805 in action 2858 may, for example, send specific assigned RACH Preamble via an RRCReconfiguration message, instead of using a n-tuple, that is combined with an RRCConnectionSuspend message in a single message (e.g., RRCRelease message) to reconfigure and release UE 2802. Actions 2866, 2868, 2870 differ from action 1466 of FIG. 15 in that USIM2 of UE 2802 may send a MSG1 to gNB-2 2805 in response to the page that is generated and transmitted per variables of the specific assigned RACH Preamble received from gNB-2 2805 (action 2866), gNB-2 2805 may send a Msg2 to USIM2 of UE 2802 (action 2868), and USIM2 of UE 2802 may send a MSG3 to gNB-2 2805 (action 2870).

In FIGS. 28 and 29, for example, one of the two gNBs (e.g., gNB-2 2805) may signal to UE 2802 a specific assigned RACH Preamble that UE 2802 may use to generate and transmit a MSG1 to indicate to the gNB (e.g., gNB-2 2805) that the UE may not respond to pages from gNB-2 2805. gNB-2 2505 may send that specific assigned RACH Preamble as a new IE that is contained in an RRCConnectionReconfigruation Message. The new IE that contains the specific assigned RACH Preamble may for example be call RACH-ConfigDedicatedBusy, and may have the structure as shown in FIG. 30. Thus, for example if gNB-2 2805 were to assign to the IE RACH-ConfigDedicatedBusy the values of [63] (e.g., the specific assigned RACH Preamble), and gNB-2 2805 sends that IE to UE 2802, (alternately gNB-2 2505 could send this IE as part of a broadcast SIBx) and gNB-2 2805 has reserved this specific PRACH Preamble for a specific meaning, and gNB-2 2805 subsequently receives a MSG1 that is generated using the value of the IE sent to UE 2802, gNB-2 2805 may know exactly the state of UE 2802 that sent the MSG1, and by receiving a subsequent related MSG3 from UE 2802, gNB-2 2805 may know exact identify of UE 2802 that sent the MSG1. If it is pre-arranged between UE 2802 and gNB-2 2805 that when such a MSG1 is generated and transmitted by UE 2802 (e.g., using the specific assigned RACH Preamble) and received by gNB-2 2805, gNB-2 2805 may be made aware that UE 2802 may not respond to paging messages from gNB-2 2805 until some further notice from UE 2802 (e.g., a TAU from UE 2802) or a timer expires.

In FIGS. 31-41, various implementations are provided to illustrate a "MSG3 Only" method, by which a UE may signal to the gNB that the UE may not respond to paging messages until further notice from the UE (or timer expire), and that the gNB may know exactly which UE sent the signal.

In general, a UE may inform the gNB of its state, or state transition, via RRC_CONNECTED mode/state signaling. However, as noted above, it may be desirable that the UE signal to the gNB its new state without having to enter into RRC_CONNECTED mode/state.

To begin the steps towards RRC_CONNECTED state while in RRC_IDLE or RRC_INACTIVE state, the UE may use the RACH procedure to signal to the gNB.

By allowing an RRC message (e.g., a MSG3) to carry a new bit that indicates the UE may not respond to paging messages until further notice, the gNB may identify exactly which UE sent the RRC message and its associated busy state.

The relationship between a UE that sent the RRC message with the new bit to indicate that it may not respond to paging messages and the gNB that received the RRC message is while the UE is in RRC_INACTIVE or RRC_IDLE state, as it may not be necessary in RRC_CONNECTED state. FIGS. 31-38 provide two implementations by which a UE may determine to send an RRC message (indicating the UE may not respond to paging messages until further notice) to the gNB to indicate that the UE is busy.

Figure 39:
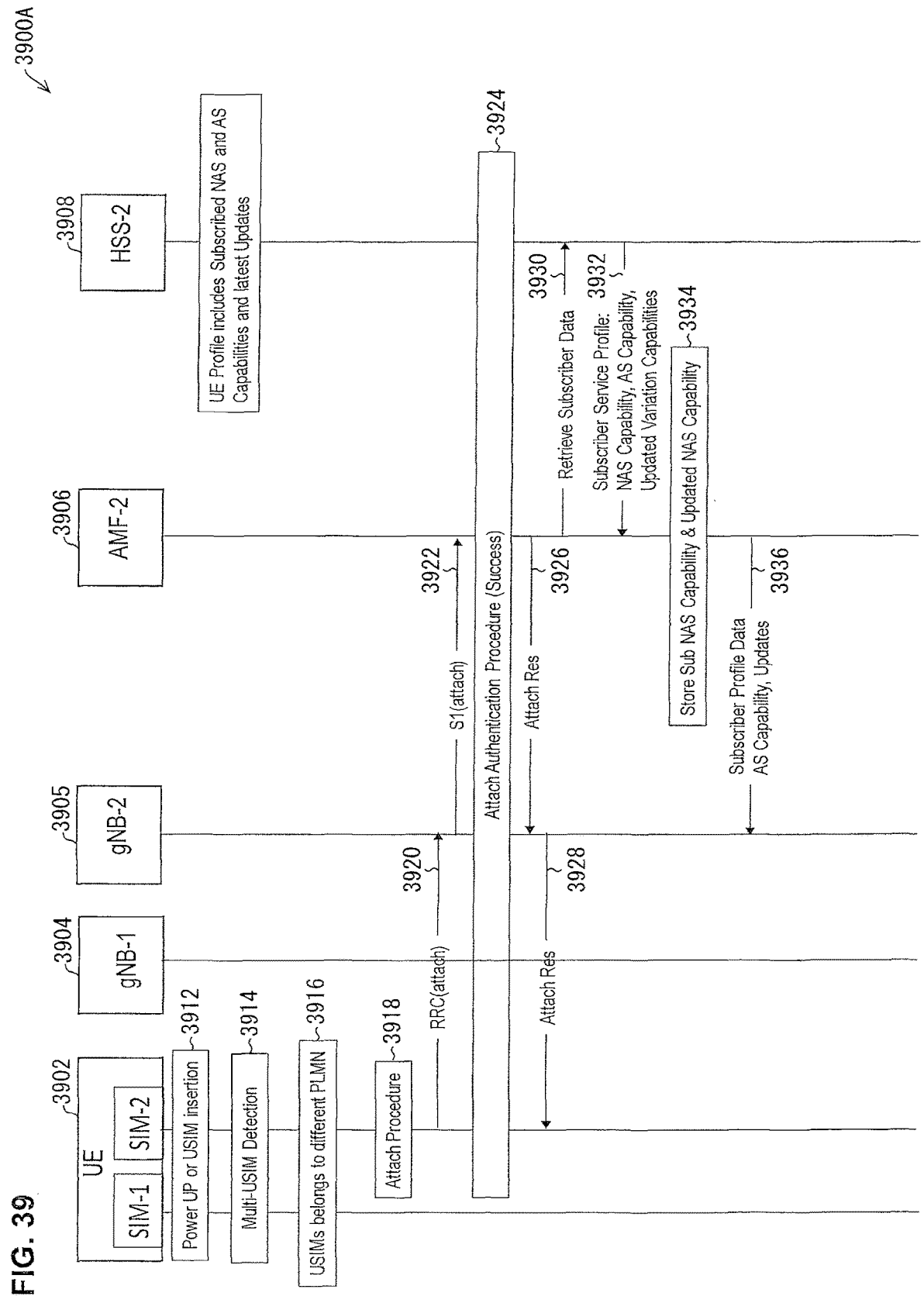
FIG. 39 is a signaling sequence diagram for schematically illustrating a method of reporting a multi-USIM presence in a UE and capabilities of the multiple USIMs to a wireless communication network through an access registration procedure according to the first and second implementations of the "MSG3 Only" method, in accordance with example implementations of the present disclosure.
Figure 40:
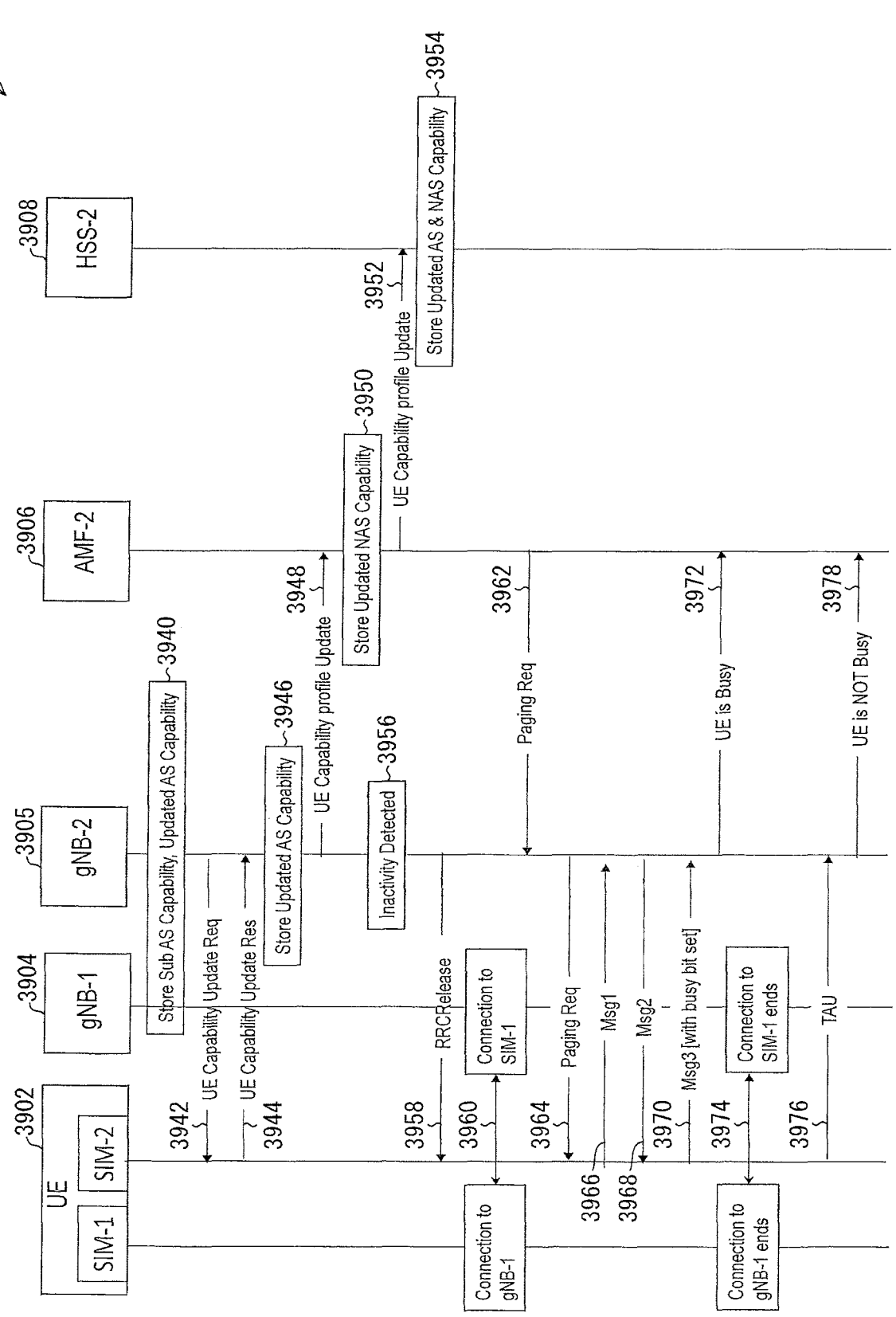
FIG. 40 is a continuation of the signaling sequence diagram in FIG. 39 and further illustrates the UE signaling a busy status to the second base station according to the first and second implementations of the "MSG3 Only" method, in accordance with example implementations of the present disclosure.

As shown in FIGS. 31-35, the UE may signal to a gNB that the UE may not respond to paging messages until further notice or time-out, for example, through the following procedures: procedure 1.0 (in state diagram 3110 in FIG. 31) in one or more actions 3112, 3114, 3116, 3118, and 3120, procedure 1.2 (in state diagram 3210 in FIG. 32) in one or more actions 3212, 3214, 3216, 3218, 3220, 3222, 3224, 3226, 3228, and 3230, procedure 1.3 (in state diagram 3310 in FIG. 33) in one or more actions 3312, 3314, 3316, 3318, 3320, 3322, 3324, 3326, 3328, and 3330, procedure 1.4 (in state diagram 3410 in FIG. 34) in one or more actions 3412, 3414, 3416, 3418, 3420, 3422, 3424, 3426, 3428, and 3430, and procedure 1.5 (in state diagram 3510 in FIG. 35) in one or more actions 3512, 3514, 3516, 3518, 3520, 3522, 3524, 3526, 3528, and 3530. In one implementation, the UE described in FIGS. 31-35 may correspond to the multi-USIM UEs in FIGS. 39 and 40. Although the UEs in FIGS. 39 and 40 are each shown to include two USIM based operations (e.g., SIM-1 and SIM-2), it should be understood that they may each include and support more than two USIM based operations.

FIGS. 31-35 and 39-41 illustrate a first implementation of the "MSG3 Only" method.

Although various implementations described herein with reference to FIGS. 31-35 and 39-41 refer to an RRC message as a MSG3, it should be understood that MSG3 is merely a non-limiting example of an RRC message that can be used to signal the UE's busy status.

Figure 31:
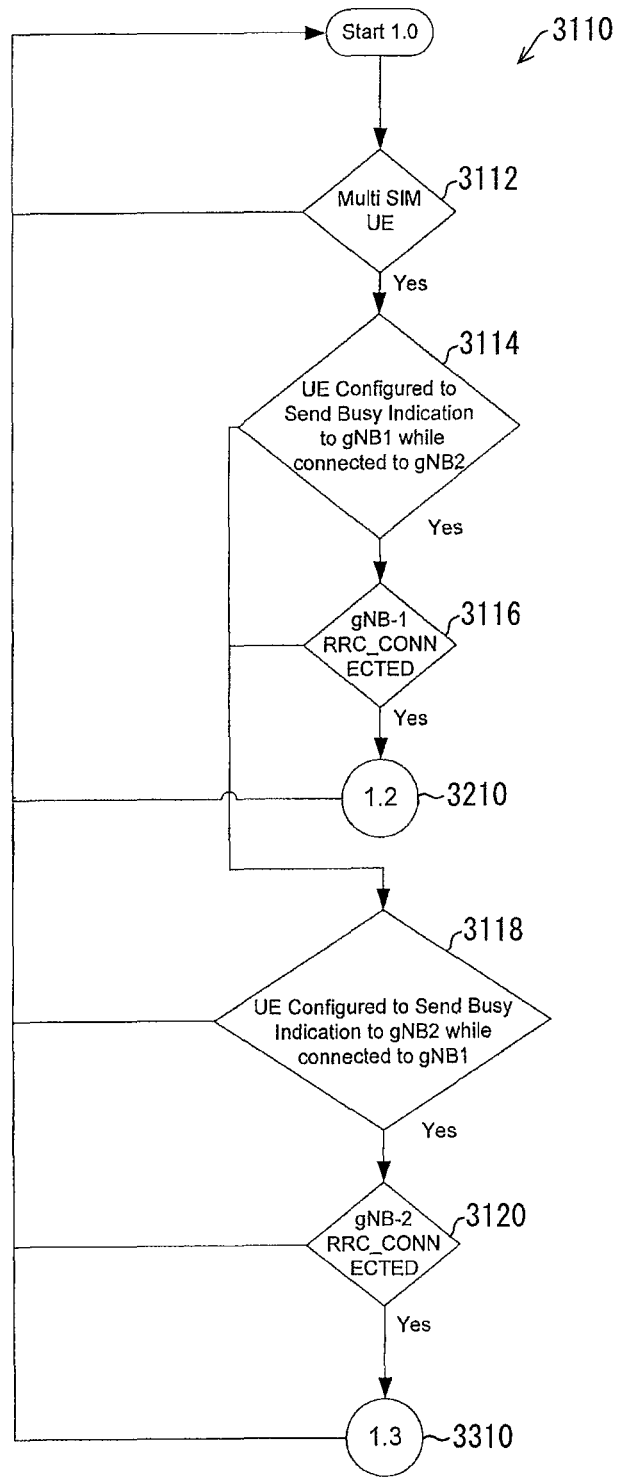
FIG. 31 is a flowchart diagram illustrating a method of a multi-USIM based operation UE signaling a busy status to base stations according to a first implementation of a "MSG3 Only" method, in accordance with example implementations of the present disclosure.
Figure 32:
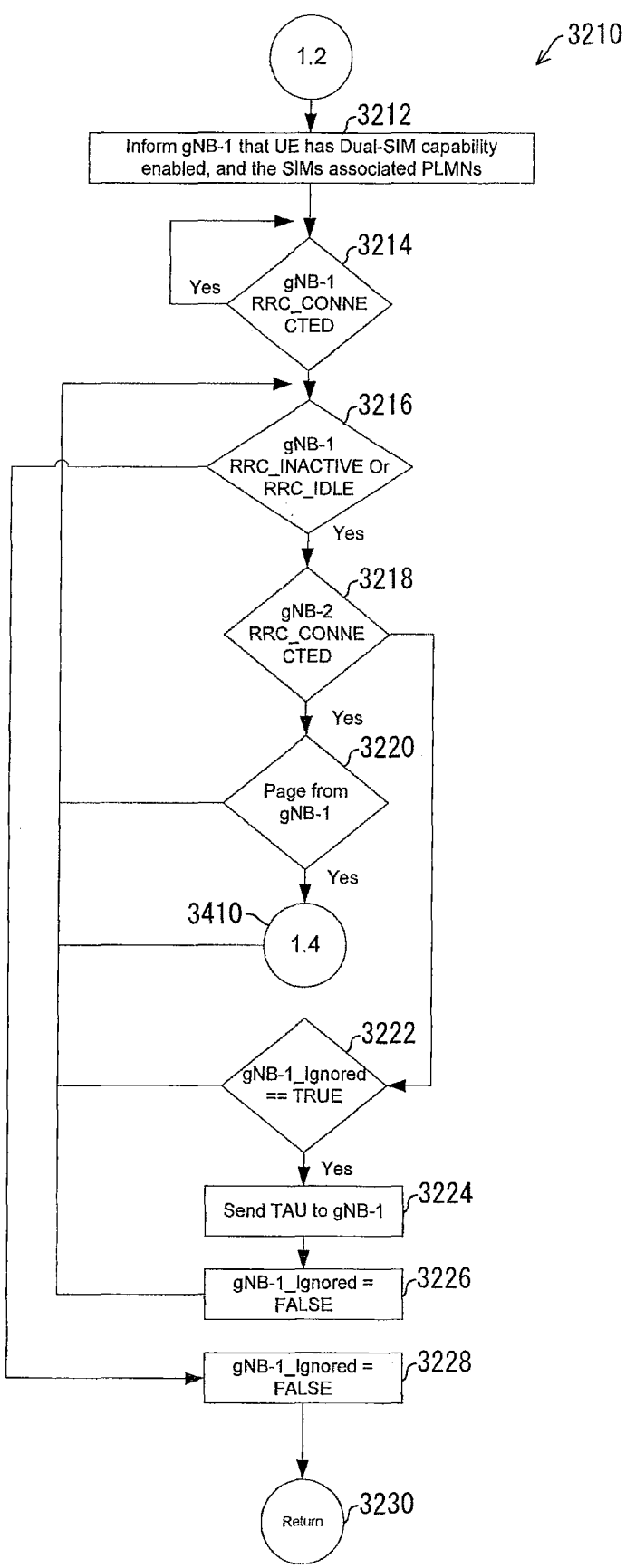
FIG. 32 is a flowchart diagram illustrating the method of the multi-USIM based operation UE signaling a busy status to a first base station according to the first implementation of the "MSG3 Only" method in FIG. 31, in accordance with example implementations of the present disclosure.
Figure 34:
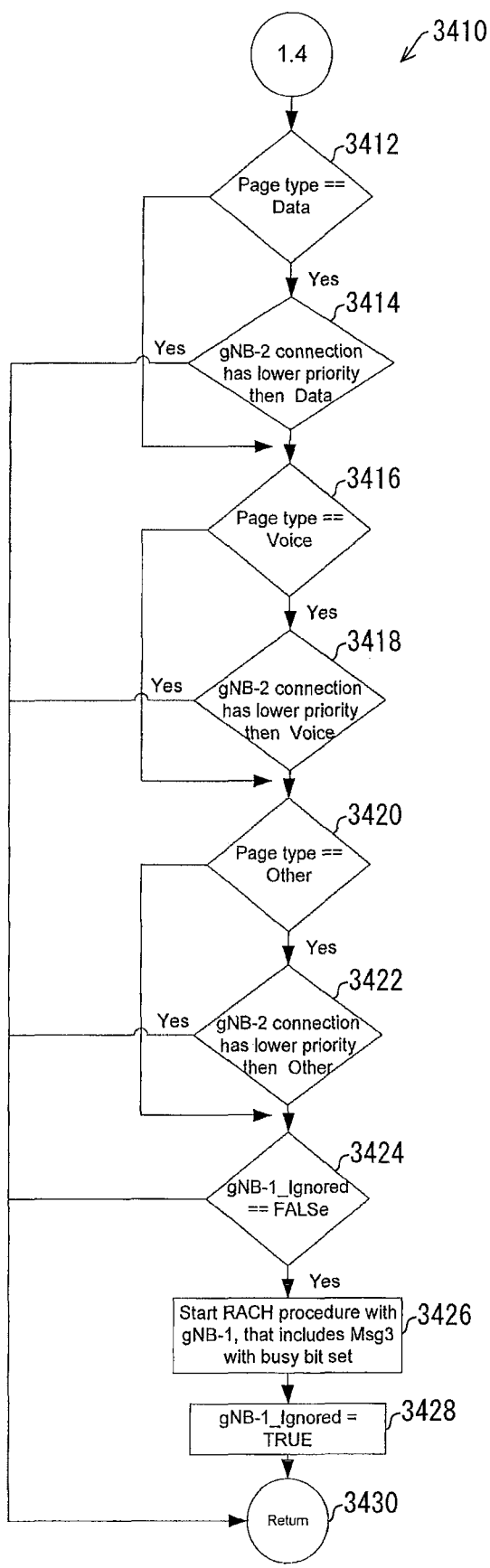
FIG. 34 is a flowchart diagram illustrating the method of the multi-USIM based operation UE signaling the busy status to the first base station according to the first implementation of the "MSG3 Only" method in FIG. 32, in accordance with example implementations of the present disclosure.

FIGS. 31, 32, and 34 illustrate a multi-USIM based operation UE signaling a busy status to a first gNB while connected to a second gNB.

FIG. 31 is a flowchart diagram illustrating a method of a multi-USIM based operation UE signaling a busy status to base stations according to a first implementation of a "MSG3 Only" method, in accordance with example implementations of the present disclosure.

FIG. 32 is a flowchart diagram illustrating the method of the multi-USIM based operation UE signaling a busy status to a first base station according to the first implementation of the "MSG3 Only" method in FIG. 31, in accordance with example implementations of the present disclosure.

FIG. 34 is a flowchart diagram illustrating the method of the multi-USIM based operation UE signaling the busy status to the first base station according to the first implementation of the "MSG3 Only" method in FIG. 32, in accordance with example implementations of the present disclosure.

In the present implementation, actions 3112, 3114, 3116, 3118, and 3120 in FIG. 31 may be substantially similar to actions 1712, 1714, 1716, 1718, and 1720 in FIG. 17, respectively. Thus, the descriptions of actions 3112 through 3120 are omitted for brevity.

In the present implementation, actions 3212, 3218, 3220, 3222, 3224, 3226, 3228, and 3230 in FIG. 32 may be substantially similar to 1812, 1822, 1824, 1826, 1828, 1830, 1832, and 1834 in FIG. 18, respectively. Thus, the descriptions of actions 3212, and 3218 through 3230 are omitted for brevity.

Actions 3214 and 3216 differ from actions 1814, 1816, 1818, and 1820 of FIG. 18 in that the UE in actions 3214 and 3216 may wait for the first gNB to be in RRC_INACTIVE or RRC_IDLE state with the UE (action 3216) after RRC_CONNECTED state is terminated between the UE and the first gNB (action 3214) instead of receiving a specific assigned RACH Preamble that describes a MSG1 that is uniquely assigned to a UE state (action 1814) and waiting for the first gNB to be in RRC_INACTIVE state with the UE (action 1820) after RRC_CONNECTED state is terminated between the UE and the first gNB (actions 1816 and 1818).

In the present implementation, actions 3412, 3414, 3416, 3418, 3420, 3422, 3424, 3428, and 3430 in FIG. 34 may be substantially similar to 2012, 2014, 2016, 2018, 2020, 2022, 2024, 2030, and 2032 in FIG. 20, respectively. Thus, the descriptions of actions 3412 through 3424, 3428, and 3430 are omitted for brevity.

Action 3426 differs from actions 2026 and 2028 of FIG. 20 in that the UE in action 3426 may start a RACH procedure with the first gNB, where the RACH procedure includes a MSG3 with a busy bit set. For example, the RACH procedure may start with a MSG1 (e.g., a PRACH preamble) from the UE to the first gNB, and followed by a MSG2 (e.g., a RACH Response (RAR)) from the first gNB to the UE. Thereafter, the UE may send the MSG3 (e.g., an RRC message, such as an RRC Connection request) with the busy bit set to the first gNB in order to indicate that the UE may not respond to paging messages until further notice (action 3426) instead of sending a specific assigned RACH Preamble that describes a MSG1 which is uniquely assigned to a UE state and a MSG3 (actions 2026 and 2028). The RACH procedure may also include a MSG4 (e.g., an RRC Connection Setup) from the first gNB to the UE.

Figure 33:
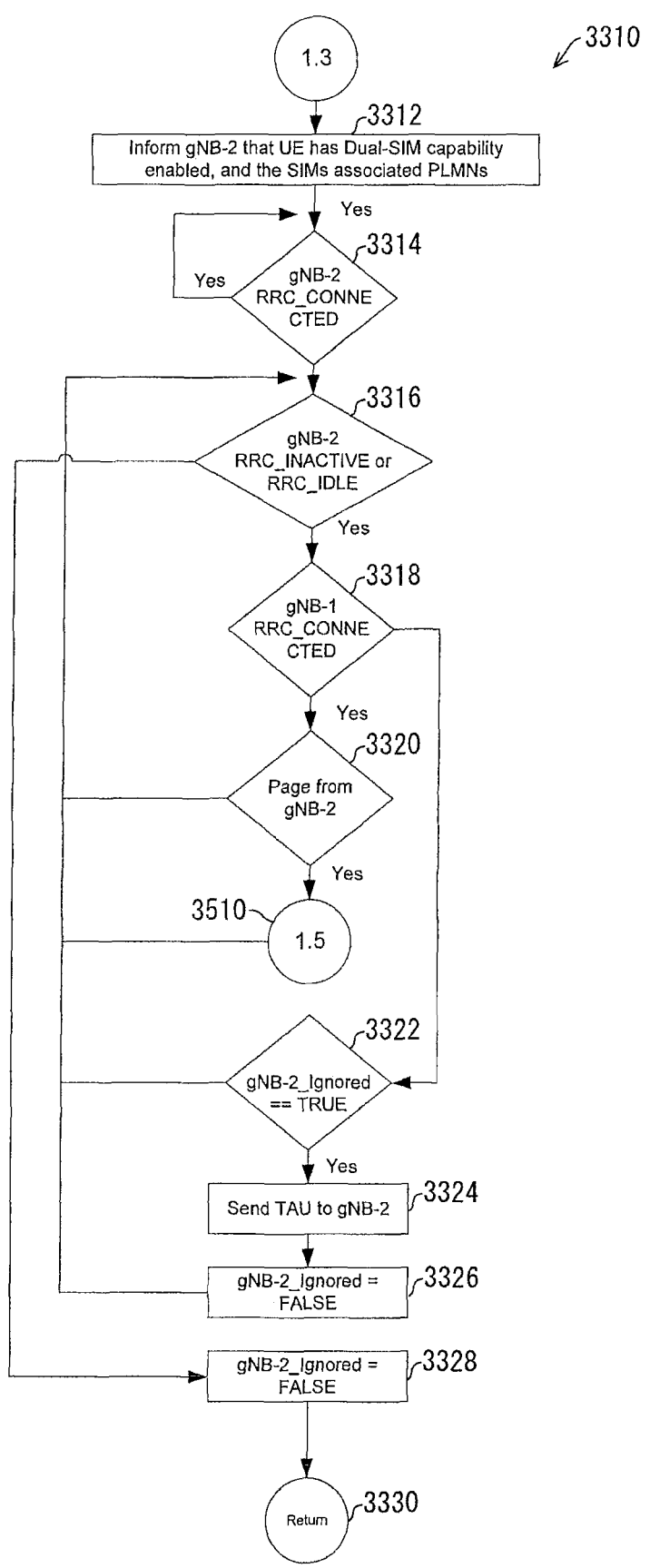
FIG. 33 is a flowchart diagram illustrating the method of the multi-USIM based operation UE signaling a busy status to a second base station according to the first implementation of the "MSG3 Only" method in FIG. 31, in accordance with example implementations of the present disclosure.
Figure 35:
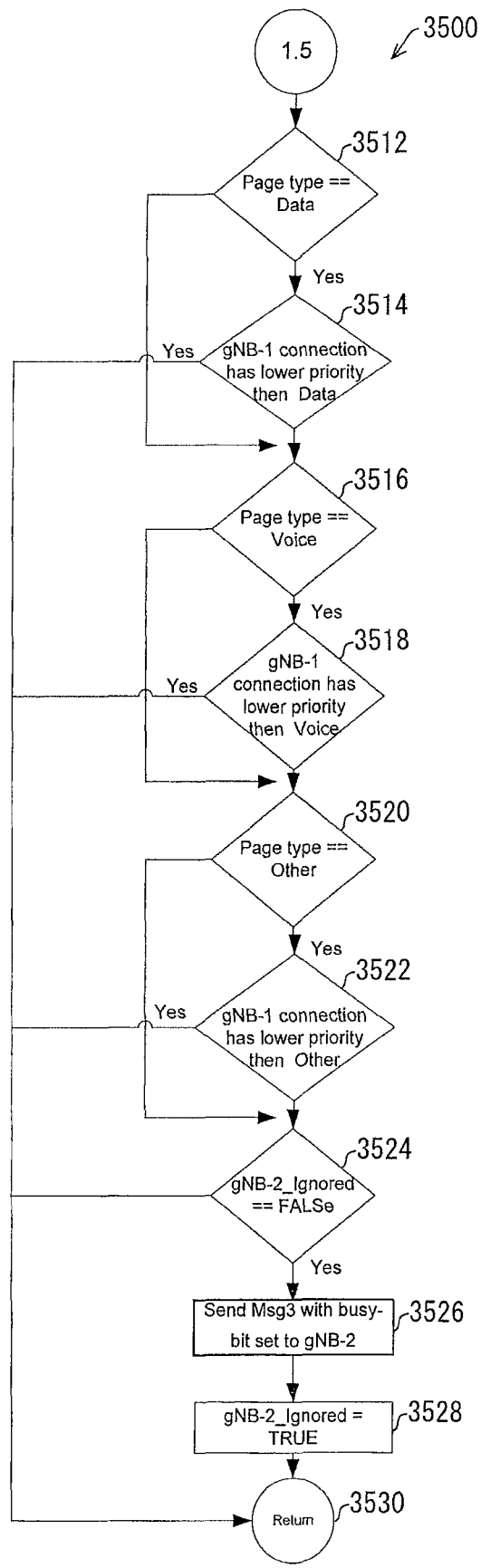
FIG. 35 is a flowchart diagram illustrating the method of the multi-USIM based operation UE signaling the busy status to the second base station according to the first implementation of the "MSG3 Only" method in FIG. 33, in accordance with example implementations of the present disclosure.

FIGS. 31, 33, and 35 illustrate the multi-USIM based operation UE signaling a busy status to the second gNB while connected to the first gNB.

FIG. 33 is a flowchart diagram illustrating the method of the multi-USIM based operation UE signaling a busy status to a second base station according to the first implementation of the "MSG3 Only" method in FIG. 31, in accordance with example implementations of the present disclosure.

FIG. 35 is a flowchart diagram illustrating the method of the multi-USIM based operation UE signaling the busy status to the second base station according to the first implementation of the "MSG3 Only" method in FIG. 33, in accordance with example implementations of the present disclosure.

In the present implementation, actions 3312, 3318, 3320, 3322, 3324, 3326, 3328, and 3330 in FIG. 33 may be substantially similar to actions 1912, 1922, 1924, 1926, 1928, 1930, 1932, and 1934 in FIG. 19, respectively. Thus, the descriptions of actions 3312, and 3318 through 3330 are omitted for brevity.

Actions 3314 and 3316 differ from actions 1914, 1916, 1918, and 1920 of FIG. 19 in that the UE in actions 3314 and 3316 may wait for the second gNB to be in RRC_INACTIVE or RRC_IDLE state with the UE (action 3316) after RRC_CONNECTED state is terminated between the UE and the second gNB (action 3314) instead of sending a specific assigned RACH Preamble that describes a MSG1 that is uniquely assigned to a UE state (action 1914) and waiting for the second gNB to be in RRC_INACTIVE state with the UE (action 1920) after RRC_CONNECTED state is terminated between the UE and the second gNB (actions 1916 and 1918).

In the present implementation, actions 3512, 3514, 3516, 3518, 3520, 3522, 3524, 3528, and 3530 in FIG. 35 may be substantially similar to actions 2112, 2114, 2116, 2118, 2120, 2122, 2124, 2130, and 2132 in FIG. 21, respectively. Thus, the descriptions of actions 3512 through 3524, 3528, and 3530 are omitted for brevity.

Action 3526 differs from actions 2126 and 2128 of FIG. 21 in that the UE in action 3526 may send a MSG3 with a Busy-Bit to the second gNB (action 3526) instead of sending a MSG1 using the specific assigned RACH Preamble (action 2126) and a MSG3 (action 2128) to the second gNB.

FIGS. 33 and 35 are respectively similar to FIGS. 32 and 34 with the differences that the UE in FIGS. 33 and 35 may send the MSG3 with a Busy-Bit to the second gNB when the UE receives a page from the second gNB while in RRC_CONNECTED state with the first gNB when the UE is in RRC_INACTIVE or RRC_IDLE state with the second gNB.

FIGS. 39 and 40 further exemplify the first implementation of the "MSG3 Only" method.

FIG. 39 is a signaling sequence diagram for schematically illustrating a method of reporting a multi-USIM presence in a UE and capabilities of the multiple USIMs to a wireless communication network through an access registration procedure according to the first and second implementations of the "MSG3 Only" method, in accordance with example implementations of the present disclosure.

FIG. 40 is a continuation of the signaling sequence diagram in FIG. 39 and further illustrates the UE signaling a busy status to the second base station according to the first and second implementations of the "MSG3 Only" method, in accordance with example implementations of the present disclosure.

In the present implementation, actions 3910, 3912, 3914, 3916, 3918, 3920, 3922, 3924, 3926, 3928, 3930, 3932, 3934, and 3936 in diagram 3900A of FIG. 39 may be substantially similar to actions 2510, 2512, 2514, 2516, 2518, 2520, 2522, 2524, 2526, 2528, 2530, 2532, 2534, and 2536 in diagram 2500A of FIG. 25, respectively. Thus, the descriptions of actions 3910 through 3936 are omitted for brevity.

In the present implementation, actions 3940, 3942, 3944, 3946, 3948, 3950, 3952, 3954, 3956, 3960, 3962, 3964, 3972, 3974, 3976, and 3978 in diagram 3900B of FIG. 40 may be substantially similar to actions 2540, 2542, 2544, 2546, 2548, 2550, 2552, 2554, 2556, 2562, 2564, 2566, 2574, 2576, 2578, and 2580 in diagram 2500B of FIG. 26, respectively. Thus, the descriptions of actions 3940 through 3956, 3960 through 3964, and 3972 through 3978 are omitted for brevity.

Action 3958 differs from actions 2558 and 2560 of FIG. 26 in that gNB-2 3905 in action 3958 may send an RRC Release message to USIM2 of UE 3902. Actions 3966, 3968, and 3970 differ from 2568, 2570, and 2572 of FIG. 26 in that USIM2 of UE 3902 may send a MSG1 to gNB-2 3905 in response to the page received from gNB-2 3905 (action 3966), gNB-2 3905 may send a Msg2 to USIM2 of UE 3902 (action 3968), and USIM2 of UE 3902 may send a MSG3 with a Busy-Bit to gNB-2 3905 (action 3970).

In FIGS. 39 and 40, UE 3902 may execute a PRACH procedure with a gNB (e.g., gNB-2 3905) such that the MSG3 associated with that RACH procedure carries a Busy-Bit to indicate that UE 3902 may not respond to paging messages until further notice. The new MSG3 (e.g., RRCConnectionRequest) that carries the Busy-Bit may for example have the structure as shown in FIG. 41. Thus, for example if gNB-2 3905 were to receive the IE RRCConnectionRequest with the EstablishmentCause set to Busy-Bit, gNB-2 3905 may know exactly UE 3902 sends the MSG3. Moreover, when the MSG3 is transmitted by UE 3902 and received by gNB-2 3905, gNB-2 3905 may be made aware that UE 3902 may not respond to paging messages from gNB-2 3905 until some further notice from the UE3902 (e.g., a TAU from UE 3092) or a timer expires.

Figure 36:
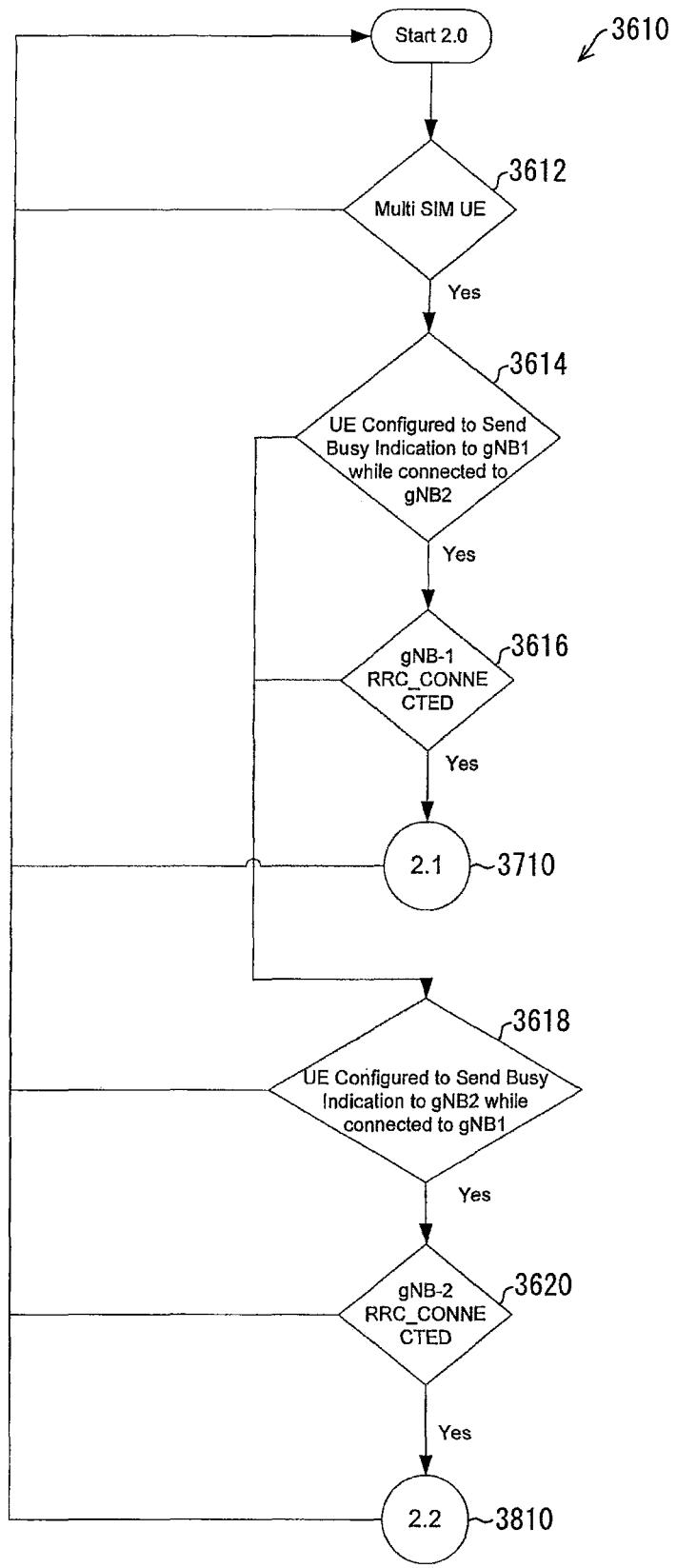
FIG. 36 is a flowchart diagram illustrating a method of a multi-USIM based operation UE signaling a busy status to base stations according to a second implementation of the "MSG3 Only" method, in accordance with example implementations of the present disclosure.
Figure 37:
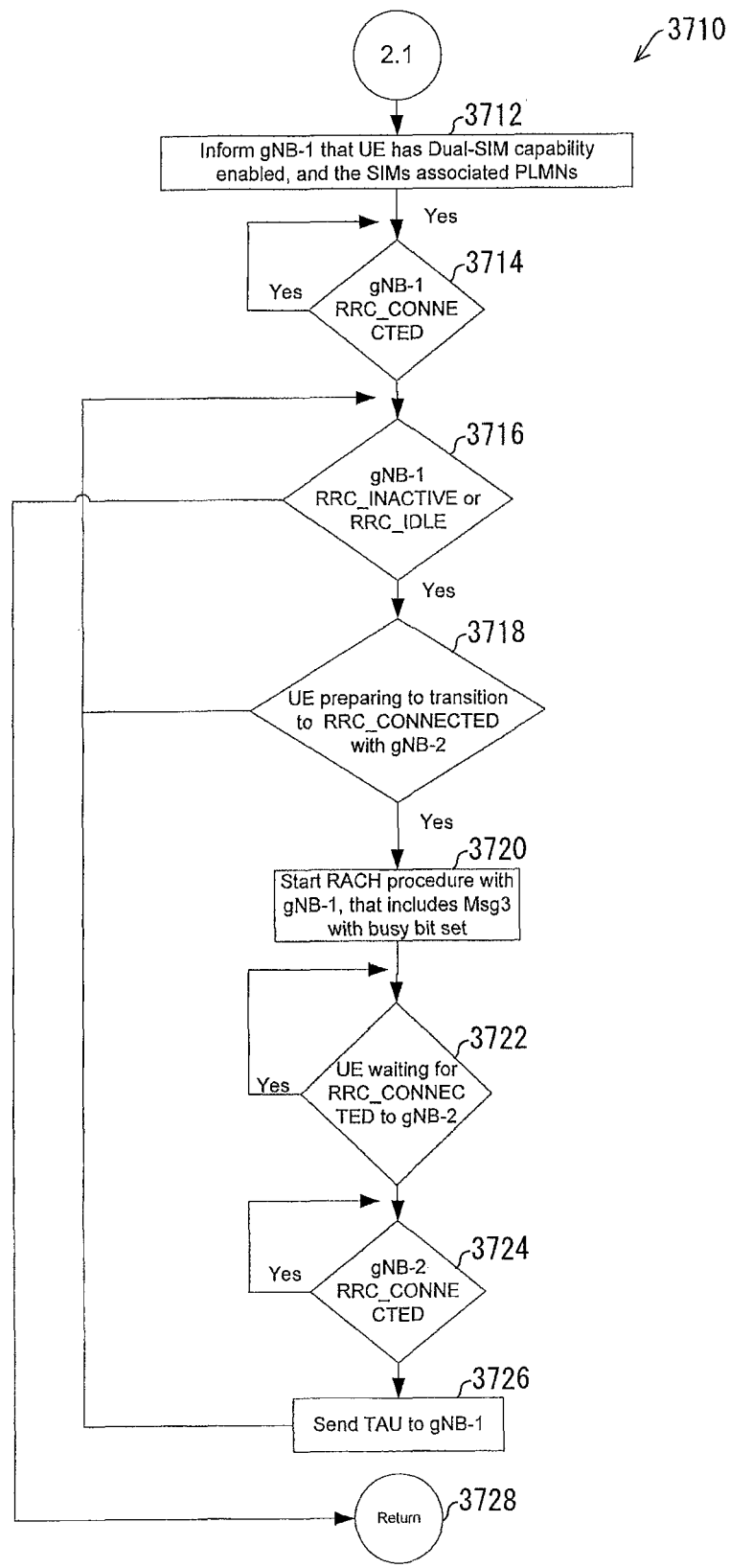
FIG. 37 is a flowchart diagram illustrating the method of the multi-USIM based operation UE signaling a busy status to a first base station according to the second implementation of the "MSG3 Only" method in FIG. 36, in accordance with example implementations of the present disclosure.
Figure 38:
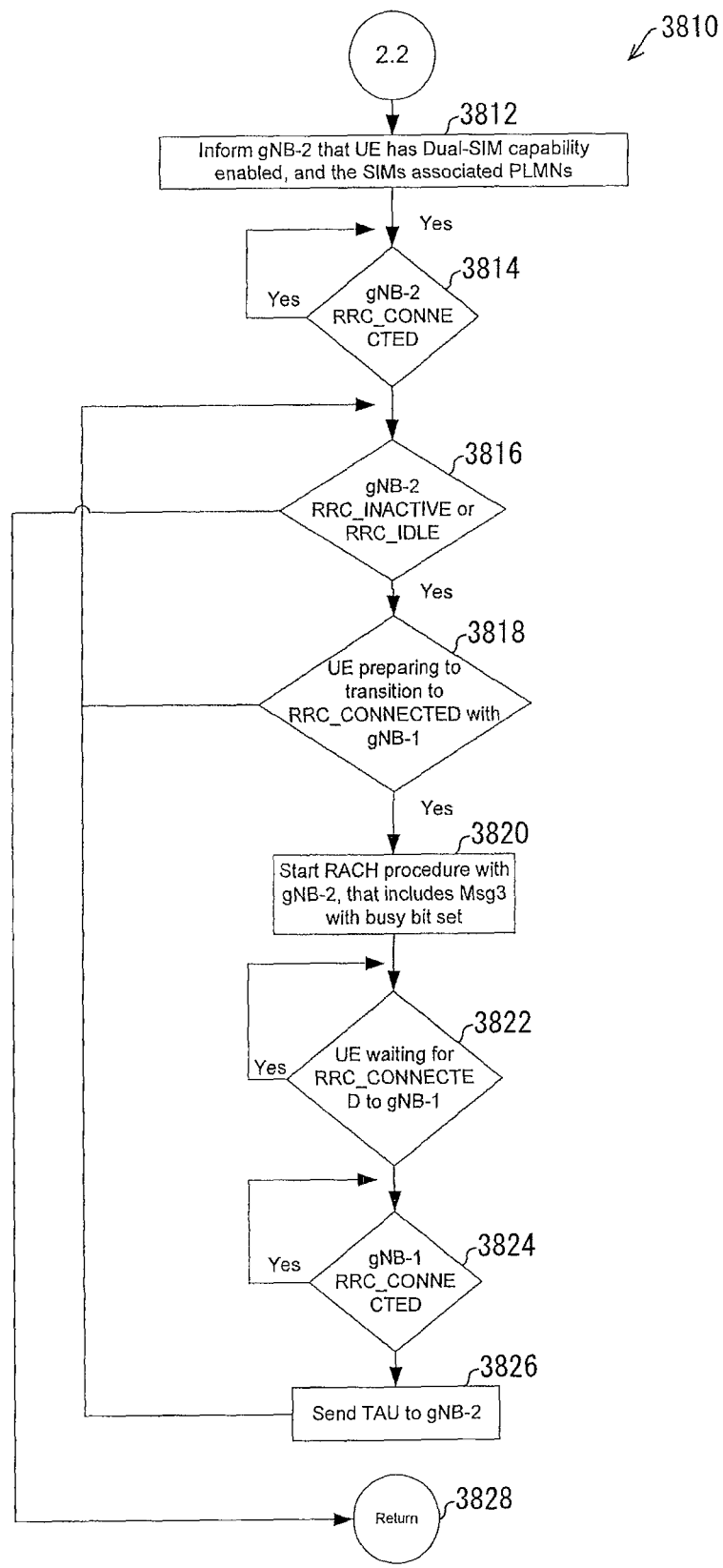
FIG. 38 is a flowchart diagram illustrating the method of the multi-USIM based operation UE signaling a busy status to a second base station according to the second implementation of the "MSG3 Only" method in FIG. 36, in accordance with example implementations of the present disclosure.

FIG. 36-38 illustrate a second implementation of the "MSG3 Only" method. Although various implementations described herein with reference to FIGS. 36-38 refer to an RRC message as a MSG3, it should be understood that MSG3 is merely a non-limiting example of an RRC message that can be used to signal the UE's busy status.

As shown in FIGS. 36-38, the UE may signal to a gNB that the UE may not respond to paging messages until further notice or time-out, for example, through the following procedures: procedure 2.0 (in state diagram 3610 in FIG. 36) in one or more actions 3612, 3614, 3616, 3618, and 3620, procedure 2.1 (in state diagram 3710 in FIG. 37) in one or more actions 3712, 3714, 3716, 3718, 3720, 3722, 3724, 3726, and 3728, and procedure 2.2 (in state diagram 3810 in FIG. 38) in one or more actions 3812, 3814, 3816, 3818, 3820, 3822, 3824, 3826, and 3828.

FIGS. 36 and 37 illustrate the multi-USIM based operation UE signaling a busy status to the first gNB while connected to the second gNB.

FIG. 36 is a flowchart diagram illustrating a method of a multi-USIM based operation UE signaling a busy status to base stations according to a second implementation of the "MSG3 Only" method, in accordance with example implementations of the present disclosure.

FIG. 37 is a flowchart diagram illustrating the method of the multi-USIM based operation UE signaling a busy status to a first base station according to the second implementation of the "MSG3 Only" method in FIG. 36, in accordance with example implementations of the present disclosure.

In the present implementation, actions 3612, 3614, 3616, 3618, and 3620 in FIG. 36 may be substantially similar to actions 2212, 2214, 2216, 2218, and 2220 in FIG. 22, respectively. Thus, the descriptions of actions 3612 through 3620 are omitted for brevity.

In the present implementation, actions 3712, 3718, 3720, 3722, 3724, 3726, and 3728 in FIG. 37 may be substantially similar to actions 2312, 2322, 2324, 2326, and 2328 in FIG. 23, respectively. Thus, the descriptions of actions 3712, and 3718 through 3728 are omitted for brevity.

Actions 3714 and 3716 differ from actions 2314, 2316, 2318, and 2320 of FIG. 23 in that the UE in action 3714 and 3716 may wait for the first gNB to be in RRC_INACTIVE or RRC_IDLE state with the UE (action 3716) after RRC_CONNECTED state is terminated between the UE and the first gNB (action 3714) instead of receiving a specific assigned RACH Preamble that describes a MSG1 that is uniquely assigned to a UE state (action 2314) and waiting for the first gNB to be in RRC_INACTIVE state with the UE (action 2320) after RRC_CONNECTED state is terminated between the UE and first gNB (actions 2316 and 2318).

FIGS. 36 and 38 illustrate the multi-USIM based operation UE signaling the busy status to the second gNB while connected to the first gNB.

FIG. 38 is a flowchart diagram illustrating the method of the multi-USIM based operation UE signaling a busy status to a second base station according to the second implementation of the "MSG3 Only" method in FIG. 36, in accordance with example implementations of the present disclosure.

In the present implementation, actions 3810, 3812, 3814, 3816, 3818, 3820, 3822, 3824, 3826, and 3828 in FIG. 38 may be substantially similar to actions 2410, 2412, 2414, 2416, 2418, 2420, 2422, 2424, 2426, 2428 2430, 2432 and 2434 in FIG. 24 with the exception of the actions 3814 and 3816 with respect to actions 2414, 2416, 2418, and 2420, and action 3820 with respect to 2424 and 2426. Thus, the descriptions of actions 3810, 3812, 3818, 3822, 3824, 3826, and 3828 are omitted for brevity.

Actions 3814 and 3816 differ from actions 2414, 2416, 2418, and 2420 of FIG. 24 in that the UE in 3814 and 3816 may wait for the second gNB to be in RRC_INACTIVE or RRC_IDLE state with the UE (action 3816) after RRC_CONNECTED state is terminated between the UE and the second gNB (action 3814) instead of receiving a specific assigned RACH Preamble that describes a MSG1 that is uniquely assigned to a UE state (action 2414) and waiting for the second gNB to be in RRC_INACTIVE state with the UE (action 2420) after RRC_CONNECTED state is terminated between the UE and the second gNB (actions 2416 and 2418).

Action 3820 differs from actions 2424 and 2426 of FIG. 24 in that the UE in action 3820 may start a RACH procedure with the second gNB, where the RACH procedure includes a MSG3 with a busy bit set, in order to indicate the UE may not respond to paging messages until further notice (action 3820) instead of sending a specific assigned RACH Preamble that describes a MSG1 which is uniquely assigned to a UE state and a MSG3 (actions 2424 and 2426).

Implementations of the present disclosure enable the network systems to be informed of the UE's multi-USIM capabilities, and provide signaling mechanisms between the UE and the network(s) to allow the UE to inform the networks that the UE is busy. As such, among other advantages, valuable network resources can be conserved when the network knows that the UE is busy.

<Summary>

In one example, a user equipment (UE) for supporting multiple-universal subscriber identity module (multi-USIM) operations among a first base station associated with a first network and a second base station associated with a second network, the UE comprising: one or more non-transitory computer-readable media having computer-executable instructions embodied thereon; at least one processor coupled to the one or more non-transitory computer-readable media, and configured to execute the computer-executable instructions to: transmit, through transmitting circuitry of the UE, a physical random access channel (PRACH) preamble to the second base station associated with the second network; wherein the PRACH preamble indicates to the second base station that the UE is not to begin a connection establishment procedure with the second network.

In one example, the UE, wherein the at least one processor is further configured to execute the computer-executable instructions to: detect, through receiving circuitry of the UE, a paging message from the second base station before transmitting the PRACH preamble to the second base station.

In one example, the UE, wherein the PRACH preamble indicates to the second base station that the UE is in a radio resource control (RRC) connected state with the first base station associated with the first network, when the paging message from the second base station is detected.

In one example, the UE, wherein the UE transmits the PRACH preamble to the second base station associated with the second network before establishing an RRC connection with the first station associated with the first network.

In one example, the UE, wherein the UE is attached to the second base station via an RRC_INACTIVE state when transmitting the PRACH preamble to the second base station.

In one example, the UE, wherein the PRACH preamble is generated from a plurality of parameters comprising a ra-PreambleIndex, ra-PRACH-MaskIndex, PRACH-ConfigIndex, and prach-FreqOffset.

In one example, the UE, wherein the PRACH preamble is generated from a plurality of parameters forming a specific set of values, the specific set of values is configured into the UE via a configuration message from the second base station.

In one example, the UE, wherein the PRACH preamble is generated from a plurality of parameters forming a specific set of values, the specific set of values is preconfigured into the UE at a time of manufacturing or provisioning.

In one example, a method by a user equipment (UE) supporting multiple-universal subscriber identity module (multi-USIM) operations among a first base station associated with a first network and a second base station associated with a second network, the method comprising: transmitting, by transmitting circuitry of the UE, a physical random access channel (PRACH) preamble to the second base station associated with the second network; wherein the PRACH preamble indicates to the second base station that the UE is not to begin a connection establishment procedure with the second network.

In one example, the method, further comprising: detecting, through receiving circuitry of the UE, a paging message from the second base station before transmitting the PRACH preamble to the second base station.

In one example, the method, wherein the PRACH preamble indicates to the second base station that the UE is in a radio resource control (RRC) connected state with the first base station associated with the first network, when the paging message from the second base station is detected.

In one example, the method, wherein the UE transmits the PRACH preamble to the second base station associated with the second network before establishing an RRC connection with the first station associated with the first network.

In one example, the method, wherein the UE is attached to the second base station via an RRC_INACTIVE state when transmitting the PRACH preamble to the second base station.

In one example, the method, wherein the PRACH preamble is generated from a plurality of parameters comprising a ra-PreambleIndex, ra-PRACH-MaskIndex, PRACH-ConfigIndex, and prach-FreqOffset.

In one example, the method, wherein the PRACH preamble is generated from a plurality of parameters forming a specific set of values, the specific set of values is configured into the UE via a configuration message from the second base station.

In one example, the method, wherein the PRACH preamble is generated from a plurality of parameters forming a specific set of values, the specific set of values is pre-configured into the UE at a time of manufacturing or provisioning.

In one example, a base station for communicating with a user equipment (UE) supporting multiple-universal subscriber identity module (multi-USIM) operations among one or more networks, the base station comprising: one or more non-transitory computer-readable media having computer-executable instructions embodied thereon; at least one processor coupled to the one or more non-transitory computer-readable media, and configured to execute the computer-executable instructions to: receive, through receiving circuitry of the base station, a physical random access channel (PRACH) preamble from the UE; wherein the PRACH preamble indicates to the base station that the UE is not to begin a connection establishment procedure with the network associated with the base station.

In one example, the base station, wherein the at least one processor is further configured to execute the computer-executable instructions to: transmit, through transmitting circuitry of the base station, a paging message to the UE before receiving the PRACH preamble from the UE.

In one example, the base station, wherein the PRACH preamble indicates to the base station that the UE is in a radio resource control (RRC) connected state with another base station associated with another network, when the paging message from the base station is detected by the UE.

In one example, the base station, wherein the base station receives the PRACH preamble from the UE before the UE establishes a connection with another base station associated with another network.

In one example, the base station, wherein the UE is attached to the base station via an RRC_INACTIVE state when the base station receives the PRACH preamble from the UE.

In one example, the base station, wherein the PRACH preamble is generated from a plurality of parameters comprising a ra-PreambleIndex, ra-PRACH-MaskIndex, PRACH-ConfigIndex, and prach-FreqOffset.

In one example, the base station, wherein the PRACH preamble is generated from a plurality of parameters forming a specific set of values, the specific set of values is configured into the UE via a configuration message from the base station.

In one example, the base station, wherein the PRACH preamble is generated from a plurality of parameters forming a specific set of values, the specific set of values is pre-configured into the UE at a time of manufacturing or provisioning.

In one example, a method by a base station for communicating with a user equipment (UE) supporting multiple-universal subscriber identity module (multi-USIM) operations among one or more networks, the method comprising: receiving, through receiving circuitry of the base station, a physical random access channel (PRACH) preamble from the UE; wherein the PRACH preamble indicates to the base station that the UE is not to begin a connection establishment procedure with the network associated with the base station.

In one example, the method, wherein the at least one processor is further configured to execute the computer-executable instructions to: transmit, through transmitting circuitry of the base station, a paging message to the UE before receiving the PRACH preamble from the UE.

In one example, the method, wherein the PRACH preamble indicates to the base station that the UE is in a radio resource control (RRC) connected state with another base station associated with another network, when the paging message from the base station is detected by the UE.

In one example, the method, wherein the base station receives the PRACH preamble from the UE before the UE establishes a connection with another base station associated with another network.

In one example, the method, wherein the UE is attached to the base station via an RRC_INACTIVE state when the base station receives the PRACH preamble from the UE.

In one example, the method, wherein the PRACH preamble is generated from a plurality of parameters comprising a ra-PreambleIndex, ra-PRACH-MaskIndex, PRACH-ConfigIndex, and prach-FreqOffset.

In one example, the method, wherein the PRACH preamble is generated from a plurality of parameters forming a specific set of values, the specific set of values is configured into the UE via a configuration message from the base station.

In one example, the method, wherein the PRACH preamble is generated from a plurality of parameters forming a specific set of values, the specific set of values is pre-configured into the UE at a time of manufacturing or provisioning.

In one example, a user equipment (UE) for supporting multiple-universal subscriber identity module (multi-USIM) operations among a first base station associated with a first network and a second base station associated with a second network, the UE comprising: one or more non-transitory computer-readable media having computer-executable instructions embodied thereon; at least one processor coupled to the one or more non-transitory computer-readable media, and configured to execute the computer-executable instructions to: transmit, through transmitting circuitry of the UE, a physical random access channel (PRACH) preamble to the second base station associated with the second network; transmit, through the transmitting circuitry of the UE, a radio resource control (RRC) message associated with the PRACH preamble to the second base station associated with the second network; wherein the PRACH preamble and the RRC message indicate to the second base station that the UE is not to begin a connection establishment procedure with the second network.

In one example, the UE, wherein the PRACH preamble comprises a random access preamble index (ra-PreambleIndex) indicating the UE's state of not available to begin a connection establishment procedure with the second network.

In one example, the UE, wherein the RRC message contains information for identifying the UE.

In one example, the UE, wherein the at least one processor is further configured to execute the computer-executable instructions to: detect, through receiving circuitry of the UE, a paging message from the second base station before transmitting the PRACH preamble to the second base station.

In one example, the UE, wherein the PRACH preamble indicates to the second base station that the UE is in an RRC_CONNECTED state with the first base station associated with the first network, when the paging message from the second base station is detected.

In one example, the UE, wherein the UE transmits the PRACH preamble to the second base station associated with the second network before establishing a connection with the first station associated with the first network.

In one example, the UE, wherein the UE is attached to the second base station via an RRC_INACTIVE state when transmitting the PRACH preamble to the second base station.

In one example, the UE, wherein the ra-PreambleIndex is configured into the UE via a configuration message from the second base station.

In one example, the UE, wherein the ra-PreambleIndex is pre-configured into the UE at a time of manufacturing or provisioning.

In one example, a method by a user equipment (UE) supporting multiple-universal subscriber identity module (multi-USIM) operations among a first base station associated with a first network and a second base station associated with a second network, the method comprising: transmitting, through transmitting circuitry of the UE, a physical random access channel (PRACH) preamble to the second base station associated with the second network; transmitting, through the transmitting circuitry of the UE, a radio resource control (RRC) message associated with the PRACH preamble to the second base station associated with the second network; wherein the PRACH preamble and the RRC message indicate to the second base station that the UE is not to begin a connection establishment procedure with the second network.

In one example, the method, wherein the PRACH preamble comprises a random access preamble index (ra-PreambleIndex) indicating the UE's state of not available to begin a connection establishment procedure with the second network.

In one example, the method, wherein the RRC message contains information for identifying the UE.

In one example, the method, further comprising: detecting, through receiving circuitry of the UE, a paging message from the second base station before transmitting the PRACH preamble to the second base station.

In one example, the method, wherein the PRACH preamble indicates to the second base station that the UE is in an RRC_CONNECTED state with the first base station associated with the first network, when the paging message from the second base station is detected.

In one example, the method, wherein the UE transmits the PRACH preamble to the second base station associated with the second network before establishing a connection with the first station associated with the first network.

In one example, the method, wherein the UE is attached to the second base station via an RRC_INACTIVE state when transmitting the PRACH preamble to the second base station.

In one example, the method, wherein the ra-PreambleIndex is configured into the UE via a configuration message from the second base station.

In one example, the method, wherein the ra-PreambleIndex is pre-configured into the UE at a time of manufacturing or provisioning.

In one example, a base station for communicating with a user equipment (UE) supporting multiple-universal subscriber identity module (multi-USIM) operations among one or more networks, the base station comprising: one or more non-transitory computer-readable media having computer-executable instructions embodied thereon; at least one processor coupled to the one or more non-transitory computer-readable media, and configured to execute the computer-executable instructions to: receive, through receiving circuitry of the base station, a physical random access channel (PRACH) preamble from the UE; receive, through the receiving circuitry, a radio resource control (RRC) message associated with the PRACH preamble from the UE; wherein the PRACH preamble and the RRC message indicate to the base station that the UE is not to begin a connection establishment procedure with the network associated with the base station.

In one example, the base station, wherein the PRACH preamble comprises a random access preamble index (ra-PreambleIndex) indicating the UE's state of not available to begin a connection establishment procedure with the network associated with the base station.

In one example, the base station, wherein the RRC message contains information for identifying the UE.

In one example, the base station, wherein the at least one processor is further configured to execute the computer-executable instructions to:

transmit, through transmitting circuitry of the base station, a paging message to the UE before receiving the PRACH preamble from the UE.

In one example, the base station, wherein the PRACH preamble indicates to the base station that the UE is in an RRC_CONNECTED state with another base station associated with another network, when the paging message from the base station is detected by the UE.

In one example, the base station, wherein the base station receives the PRACH preamble from the UE before the UE establishes a connection with another base station associated with another network.

In one example, the base station, wherein the UE is attached to the base station via an RRC_INACTIVE state when the base station receives the PRACH preamble from the UE.

In one example, the base station, wherein the ra-PreambleIndex is configured into the UE via a configuration message unicast to the UE from the base station.

In one example, the base station, wherein the ra-PreambleIndex is configured into the UE via a configuration message broadcast from the base station.

In one example, the base station, wherein the ra-PreambleIndex is pre-configured into the UE at a time of manufacturing or provisioning.

In one example, a method by a base station for communicating with a user equipment (UE) supporting multiple-universal subscriber identity module (multi-USIM) operations among one or more networks, the method comprising: receiving, through receiving circuitry of the base station, a physical random access channel (PRACH) preamble from the UE; receiving, through the receiving circuitry, a radio resource control (RRC) message associated with the PRACH preamble from the UE; wherein the PRACH preamble and the RRC message indicate to the base station that the UE is not to begin a connection establishment procedure with the network associated with the base station.

In one example, the method, wherein the PRACH preamble comprises a random access preamble index (ra-PreambleIndex) indicating the UE's state of not available to begin a connection establishment procedure with the network associated with the base station.

In one example, the method, wherein the RRC message contains information for identifying the UE.

In one example, the method, further comprising: transmitting, through transmitting circuitry of the base station, a paging message to the UE before receiving the PRACH preamble from the UE.

In one example, the method, wherein the PRACH preamble indicates to the base station that the UE is in an RRC_CONNECTED state with another base station associated with another network, when the paging message from the base station is detected by the UE.

In one example, the method, wherein the base station receives the PRACH preamble from the UE before the UE establishes a connection with another base station associated with another network.

In one example, the method, wherein the UE is attached to the base station via an RRC_INACTIVE state when the base station receives the PRACH preamble from the UE.

In one example, the method, wherein the ra-PreambleIndex is configured into the UE via a configuration message unicast to the UE from the base station.

In one example, the method, wherein the ra-PreambleIndex is configured into the UE via a configuration message broadcast from the base station.

In one example, the method, wherein the ra-PreambleIndex is pre-configured into the UE at a time of manufacturing or provisioning.

In one example, a user equipment (UE) for supporting multiple-universal subscriber identity module (multi-USIM) operations among a first base station associated with a first network and a second base station associated with a second network, the UE comprising: one or more non-transitory computer-readable media having computer-executable instructions embodied thereon; at least one processor coupled to the one or more non-transitory computer-readable media, and configured to execute the computer-executable instructions to: transmit, through transmitting circuitry of the UE, a radio resource control (RRC) message to a second base station associated with the second network; wherein the RRC message indicates to the second base station that the UE is not to begin a connection establishment procedure with the second network.

In one example, the UE, wherein the at least one processor is further configured to execute the computer-executable instructions to: detect, through receiving circuitry of the UE, a paging message from the second base station before transmitting the RRC message to the second base station.

In one example, the UE, wherein the RRC message indicates to the second base station that the UE is in an RRC_CONNECTED state with the first base station associated with the first network, when the paging message from the second base station is detected.

In one example, the UE, wherein the UE transmits the RRC message to the second base station associated with the second network before establishing a connection with the first station associated with the first network.

In one example, the UE, wherein the UE is attached to the second base station via an RRC_INACTIVE state or an RRC_IDLE state when transmitting the RRC message to the second base station.

In one example, a method by a user equipment (UE) for supporting multiple-universal subscriber identity module (multi-USIM) operations among a first base station associated with a first network and a second base station associated with a second network, the method comprising: transmitting, through transmitting circuitry of the UE, a radio resource control (RRC) message to the second base station associated with the second network; wherein the RRC message indicates to the second base station that the UE is not to begin a connection establishment procedure with the second network.

In one example, the method, further comprising: detecting, through receiving circuitry of the UE, a paging message from the second base station before transmitting the RRC message to the second base station.

In one example, the method, wherein the RRC message indicates to the second base station that the UE is in an RRC_CONNECTED state with the first base station associated with the first network, when the paging message from the second base station is detected.

In one example, the method, wherein the UE transmits the RRC message to the second base station associated with the second network before establishing a connection with the first station associated with the first network.

In one example, the method, wherein the UE is attached to the second base station via an RRC_INACTIVE state or an RRC_IDLE state when transmitting the RRC message to the second base station.

In one example, a base station for communicating with a user equipment (UE) supporting multiple-universal subscriber identity module (multi-USIM) operations among one or more networks, the base station comprising: one or more non-transitory computer-readable media having computer-executable instructions embodied thereon; at least one processor coupled to the one or more non-transitory computer-readable media, and configured to execute the computer-executable instructions to: receive, through receiving circuitry of the base station, a radio resource control (RRC) message from the UE; wherein the RRC message indicates to the base station that the UE is not to begin a connection establishment procedure with the network associated with the base station.

In one example, the base station, wherein the at least one processor is further configured to execute the computer-executable instructions to: transmit, through transmitting circuitry of the base station, a paging message to the UE before receiving the RRC message from the UE.

In one example, the base station, wherein the RRC message indicates to the base station that the UE is in an RRC_CONNECTED state with another base station associated with another network, when the paging message from the base station is detected by the UE.

In one example, the base station, wherein the base station receives the RRC message from the UE before the UE establishes a connection with another base station associated with another network.

In one example, the base station, wherein the UE is attached to the base station via an RRC_INACTIVE state or an RRC_IDLE state when the base station receives the RRC message from the UE.

In one example, a method by a base station for communicating with a user equipment (UE) supporting multiple-universal subscriber identity module (multi-USIM) operations among one or more networks, the method comprising: receiving, through receiving circuitry of the base station, a radio resource control (RRC) message from the UE; wherein the RRC message indicates to the base station that the UE is not to begin a connection establishment procedure with the network associated with the base station.

In one example, the method, further comprising: transmitting, through transmitting circuitry of the base station, a paging message to the UE before receiving the RRC message from the UE.

In one example, the method, wherein the RRC message indicates to the base station that the UE is in an RRC_CONNECTED state with another base station associated with another network, when the paging message from the base station is detected by the UE.

In one example, the method, wherein the base station receives the RRC message from the UE before the UE establishes a connection with another base station associated with another network.

In one example, the method, wherein the UE is attached to the base station via an RRC_INACTIVE state or an RRC_IDLE state when the base station receives the RRC message from the UE.

CROSS REFERENCE

This Nonprovisional application claims priority under 35 U.S.C. § 119 on provisional Application No. 62,888,310 on Aug. 16, 2019, the entire contents of which are hereby incorporated by reference.

What is claimed is:

1. A user equipment (UE) for supporting multiple-universal subscriber identity module (multi-USIM) operations among a first base station associated with a first network and a second base station associated with a second network, the UE comprising: one or more non-transitory computer-readable media having computer-executable instructions thereon; at least one processor coupled to the one or more non-transitory computer-readable media, and configured to execute the computer-executable instructions to: transmit, through transmitting circuitry of the UE, a physical random access channel (PRACH) preamble to the second base station associated with the second network; and detect, through receiving circuitry of the UE, a paging message from the second base station before transmitting the PRACH preamble to the second base station, wherein the PRACH preamble indicates to the second base station that the UE is not to begin a connection establishment procedure with the second network, and that the UE is in a radio resource control (RRC) connected state with the first base station associated with the first network when the paging message from the second base station is detected, and the UE transmits the PRACH preamble to the second base station associated with the second network before establishing an RRC connection with the first station associated with the first network.

2. The UE of claim 1, wherein the UE is attached to the second base station via an RRC_INACTIVE state when transmitting the PRACH preamble to the second base station.

3. A method by a user equipment (UE) supporting multiple-universal subscriber identity module (multi-USIM) operations among a first base station associated with a first network and a second base station associated with a second network, the method comprising: transmitting, by transmitting circuitry of the UE, a physical random access channel (PRACH) preamble to the second base station associated with the second network; and detecting, through receiving circuitry of the UE, a paging message from the second base station before transmitting the PRACH preamble to the second base station, wherein the PRACH preamble indicates to the second base station that the UE is not to begin a connection establishment procedure with the second network, and that the UE is in a radio resource control (RRC) connected state with the first base station associated with the first network when the paging message from the second base station is detected, and the UE transmits the PRACH preamble to the second base station associated with the second network before establishing an RRC connection with the first station associated with the first network.

4. A base station for communicating with a user equipment (UE) supporting multiple-universal subscriber identity module (multi-USIM) operations among one or more networks, the base station comprising:

one or more non-transitory computer-readable media having computer-executable instructions thereon; at least one processor coupled to the one or more non-transitory computer-readable media, and configured to execute the computer-executable instructions to: receive, through receiving circuitry of the base station, a physical random access channel (PRACH) preamble from the UE; and transmit, through transmitting circuitry of the base station, a paging message to the UE before receiving the PRACH preamble from the UE, wherein the PRACH preamble indicates to the base station that the UE is not to begin a connection establishment procedure with the network associated with the base station, and that the UE is in a radio resource control (RRC) connected state with another base station associated with another network when the paging message from the base station is detected by the UE, and the base station receives the PRACH preamble from the UE before the UE establishes a connection with another base station associated with another network.

5. The base station of claim 4, wherein the UE is attached to the base station via an RRC_INACTIVE state when the base station receives the PRACH preamble from the UE.

* * * * *